United States Patent
Gutmann et al.

(10) Patent No.: US 9,534,899 B2
(45) Date of Patent: Jan. 3, 2017

(54) RE-LOCALIZATION OF A ROBOT FOR SLAM

(71) Applicant: iRobot Corporation, Bedford, MA (US)

(72) Inventors: Jens-Steffen Gutmann, Pasadena, CA (US); Philip Fong, Los Angeles, CA (US); Mario E. Munich, Sierra Madre, CA (US)

(73) Assignee: iRobot Corporation, Bedford, MA (US)

( * ) Notice: Subject to any disclaimer, the term of this patent is extended or adjusted under 35 U.S.C. 154(b) by 550 days.

(21) Appl. No.: 13/673,928

(22) Filed: Nov. 9, 2012

(65) Prior Publication Data
US 2013/0138247 A1 May 30, 2013

Related U.S. Application Data

(60) Provisional application No. 61/558,831, filed on Nov. 11, 2011.

(51) Int. Cl.
*G05B 19/04* (2006.01)
*G05B 19/18* (2006.01)
(Continued)

(52) U.S. Cl.
CPC .............. *G01C 21/12* (2013.01); *G01S 17/06* (2013.01); *G05D 1/028* (2013.01); *G05D 1/0231* (2013.01);
(Continued)

(58) Field of Classification Search
CPC ....... G01C 21/12; G01S 17/06; G05D 1/0274; G05D 2201/0207
(Continued)

(56) References Cited

U.S. PATENT DOCUMENTS 4,815,840 A  3/1989  Benayad-Cherif et al.
4,817,000 A  3/1989  Eberhardt
(Continued)

OTHER PUBLICATIONS

Korean Intellectual Property Office; Notification of Transmittal of the International Search Report and the Written Opinion of the International Searching Authority, or the Declaration / International Search Report / Written Opinion of the International Searching Authority; Seo-gu, Daejeon Metropolitan City, Republic of Korea; Mar. 18, 2013.

(Continued)

*Primary Examiner* — Khoi Tran
*Assistant Examiner* — Jorge Peche
(74) *Attorney, Agent, or Firm* — Myers Bigel, P.A.

(57) ABSTRACT

Vector Field SLAM is a method for localizing a mobile robot in an unknown environment from continuous signals such as WiFi or active beacons. Disclosed is a technique for localizing a robot in relatively large and/or disparate areas. This is achieved by using and managing more signal sources for covering the larger area. One feature analyzes the complexity of Vector Field SLAM with respect to area size and number of signals and then describe an approximation that decouples the localization map in order to keep memory and run-time requirements low. A tracking method for re-localizing the robot in the areas already mapped is also disclosed. This allows to resume the robot after is has been paused or kidnapped, such as picked up and moved by a user. Embodiments of the invention can comprise commercial low-cost products including robots for the autonomous cleaning of floors.

38 Claims, 44 Drawing Sheets

(51) Int. Cl.
*G01C 21/12* (2006.01)
*G05D 1/02* (2006.01)
*G01S 17/06* (2006.01)

(52) U.S. Cl.
CPC .......... *G05D 1/0234* (2013.01); *G05D 1/0274* (2013.01); *G05D 1/0272* (2013.01); *G05D 2201/0203* (2013.01); *G05D 2201/0207* (2013.01); *Y10S 901/01* (2013.01); *Y10S 901/47* (2013.01)

(58) Field of Classification Search
USPC ....... 700/245, 253, 250; 901/1, 47; 701/450, 701/494, 495
See application file for complete search history.

(56) References Cited

U.S. PATENT DOCUMENTS

| | | | |
|---|---|---|---|
| 5,634,237 A * | 6/1997 | Paranjpe | A47L 11/4011 15/319 |
| 5,652,489 A * | 7/1997 | Kawakami | G05D 1/0242 318/568.12 |
| 5,987,378 A | 11/1999 | Schipper et al. | |
| 6,299,699 B1 | 10/2001 | Porat et al. | |
| 6,430,471 B1 * | 8/2002 | Kintou | H04L 29/06 180/169 |
| 6,463,368 B1 | 10/2002 | Feiten et al. | |
| 6,687,571 B1 | 2/2004 | Byrne et al. | |
| 6,742,613 B2 | 6/2004 | Erlich et al. | |
| 7,015,831 B2 * | 3/2006 | Karlsson | G01C 21/12 318/568.11 |
| 7,135,992 B2 * | 11/2006 | Karlsson | G01C 21/12 318/568.11 |
| 7,145,478 B2 * | 12/2006 | Goncalves | G01C 21/12 318/568.11 |
| 7,162,338 B2 * | 1/2007 | Goncalves | G01C 21/12 700/253 |
| 7,177,737 B2 * | 2/2007 | Karlsson | G01C 21/12 340/995.24 |
| 7,211,980 B1 * | 5/2007 | Bruemmer | G05D 1/0214 318/567 |
| 7,225,552 B2 | 6/2007 | Kwon et al. | |
| 7,272,467 B2 * | 9/2007 | Goncalves | G01C 21/12 180/168 |
| 7,474,945 B2 * | 1/2009 | Matsunaga | G05D 1/0214 701/25 |
| 7,573,403 B2 * | 8/2009 | Goncalves | G01C 21/12 318/568.11 |
| 7,706,917 B1 | 4/2010 | Chiappetta et al. | |
| 7,720,554 B2 | 5/2010 | DiBernardo | |
| 7,725,232 B2 | 5/2010 | Makela et al. | |
| 7,774,158 B2 * | 8/2010 | Domingues Goncalves | G01C 21/12 701/26 |
| 7,805,220 B2 * | 9/2010 | Taylor | G05D 1/0219 318/568.12 |
| 7,827,643 B2 | 11/2010 | Erlich et al. | |
| 7,899,599 B2 | 3/2011 | Makela et al. | |
| 7,996,097 B2 | 8/2011 | Dibernardo | |
| 8,086,419 B2 * | 12/2011 | Goncalves | G01C 21/12 701/450 |
| 8,295,955 B2 | 10/2012 | Dibernardo | |
| 8,311,735 B2 * | 11/2012 | Arita | G01C 21/32 701/400 |
| 8,364,309 B1 | 1/2013 | Bailey | |
| 8,380,350 B2 | 2/2013 | Ozick et al. | |
| 8,390,251 B2 | 3/2013 | Cohen et al. | |
| 8,396,592 B2 | 3/2013 | Jones et al. | |
| 8,412,377 B2 | 4/2013 | Casey et al. | |
| 8,428,778 B2 | 4/2013 | Landry et al. | |
| 8,452,450 B2 | 5/2013 | Dooley et al. | |
| 8,634,956 B1 | 1/2014 | Chiappetta et al. | |
| 8,961,695 B2 * | 2/2015 | Romanov | A47L 11/4011 134/18 |
| 2004/0167667 A1 | 8/2004 | Goncalves et al. | |
| 2004/0167669 A1 * | 8/2004 | Karlsson | G01C 21/12 700/259 |
| 2004/0167670 A1 * | 8/2004 | Goncalves | G01C 21/12 700/259 |
| 2004/0167688 A1 * | 8/2004 | Karlsson | G01C 21/12 701/23 |
| 2004/0168148 A1 * | 8/2004 | Goncalves | G01C 21/12 717/104 |
| 2004/0204792 A1 * | 10/2004 | Taylor | A47L 9/2805 700/245 |
| 2004/0211444 A1 * | 10/2004 | Taylor | A47L 9/2805 134/18 |
| 2004/0236468 A1 * | 11/2004 | Taylor | A47L 9/2805 700/245 |
| 2004/0244138 A1 * | 12/2004 | Taylor | A47L 9/2805 15/319 |
| 2005/0000543 A1 * | 1/2005 | Taylor | G05D 1/0219 134/18 |
| 2005/0007057 A1 | 1/2005 | Peless et al. | |
| 2005/0010330 A1 | 1/2005 | Abramson et al. | |
| 2005/0010331 A1 * | 1/2005 | Taylor | G05D 1/0219 700/245 |
| 2005/0015920 A1 * | 1/2005 | Kim | A47L 9/1409 15/352 |
| 2005/0022330 A1 * | 2/2005 | Park | A47L 7/0061 15/319 |
| 2005/0171636 A1 * | 8/2005 | Tani | G05D 1/0276 700/245 |
| 2005/0171644 A1 * | 8/2005 | Tani | A47L 9/009 700/253 |
| 2005/0213082 A1 | 9/2005 | DiBernardo et al. | |
| 2005/0234679 A1 | 10/2005 | Karlsson | |
| 2005/0273967 A1 * | 12/2005 | Taylor | A47L 5/28 15/319 |
| 2006/0064202 A1 | 3/2006 | Gutmann et al. | |
| 2006/0076917 A1 * | 4/2006 | Lim | G05D 1/0246 318/568.12 |
| 2006/0095170 A1 | 5/2006 | Yang et al. | |
| 2006/0165276 A1 | 7/2006 | Hong et al. | |
| 2006/0167587 A1 * | 7/2006 | Read | B23Q 9/00 700/245 |
| 2007/0042716 A1 | 2/2007 | Goodall et al. | |
| 2007/0061043 A1 | 3/2007 | Ermakov et al. | |
| 2007/0090973 A1 * | 4/2007 | Karlsson | G01C 21/12 340/995.22 |
| 2007/0100496 A1 | 5/2007 | Forell | |
| 2007/0156286 A1 | 7/2007 | Yamauchi | |
| 2007/0157415 A1 * | 7/2007 | Lee | A47L 5/225 15/319 |
| 2007/0179670 A1 | 8/2007 | Chiappetta et al. | |
| 2007/0192910 A1 | 8/2007 | Vu et al. | |
| 2007/0244610 A1 | 10/2007 | Ozick et al. | |
| 2007/0262884 A1 * | 11/2007 | Goncalves | G01C 21/12 340/995.24 |
| 2007/0271011 A1 | 11/2007 | Lee et al. | |
| 2008/0009964 A1 * | 1/2008 | Bruemmer | G05D 1/0088 700/245 |
| 2008/0009965 A1 * | 1/2008 | Bruemmer | G05D 1/0088 700/245 |
| 2008/0009966 A1 * | 1/2008 | Bruemmer | G06N 3/008 700/245 |
| 2008/0009967 A1 * | 1/2008 | Bruemmer | G05D 1/0088 700/245 |
| 2008/0009968 A1 * | 1/2008 | Bruemmer | G06N 3/008 700/245 |
| 2008/0009969 A1 * | 1/2008 | Bruemmer | G06N 3/008 700/245 |
| 2008/0012518 A1 | 1/2008 | Yamamoto | |
| 2008/0065267 A1 | 3/2008 | Hong et al. | |
| 2008/0155768 A1 | 7/2008 | Ziegler et al. | |
| 2008/0276408 A1 * | 11/2008 | Gilbert, Jr. | A47L 11/34 15/320 |
| 2009/0018766 A1 * | 1/2009 | Chen | G06F 17/3087 701/533 |
| 2009/0030551 A1 * | 1/2009 | Hein | G05D 1/024 700/253 |

(56) References Cited

U.S. PATENT DOCUMENTS

| | | |
|---|---|---|
| 2009/0081923 A1 | 3/2009 | Dooley et al. |
| 2009/0093907 A1 | 4/2009 | Masaki et al. |
| 2009/0177320 A1* | 7/2009 | Lee .................. B25J 5/00 700/245 |
| 2009/0177323 A1 | 7/2009 | Ziegler et al. |
| 2009/0281661 A1 | 11/2009 | Dooley et al. |
| 2009/0312869 A1* | 12/2009 | Ohnaka ............ B25J 9/0003 700/253 |
| 2010/0070078 A1 | 3/2010 | Kong et al. |
| 2010/0070125 A1 | 3/2010 | Lee et al. |
| 2010/0082193 A1 | 4/2010 | Chiappetta |
| 2010/0183422 A1 | 7/2010 | Makela et al. |
| 2010/0197362 A1* | 8/2010 | Saitoh ............ H04M 1/274516 455/569.2 |
| 2010/0198443 A1 | 8/2010 | Yabushita et al. |
| 2010/0235033 A1 | 9/2010 | Yamamoto et al. |
| 2010/0241289 A1 | 9/2010 | Sandberg |
| 2010/0268697 A1* | 10/2010 | Karlsson ............ G01C 21/12 707/694 |
| 2010/0284621 A1* | 11/2010 | Goncalves ......... G01C 21/12 382/218 |
| 2011/0098853 A1 | 4/2011 | Park et al. |
| 2011/0125323 A1* | 5/2011 | Gutmann ........... G05D 1/0234 700/258 |
| 2011/0202175 A1* | 8/2011 | Romanov .......... A47L 11/4011 700/250 |
| 2011/0208357 A1* | 8/2011 | Yamauchi .......... G05D 1/0038 700/258 |
| 2012/0109376 A1* | 5/2012 | Lee .................. G05D 1/0246 700/259 |
| 2013/0138246 A1 | 5/2013 | Gutmann et al. |
| 2013/0138247 A1* | 5/2013 | Gutmann et al. ............ 700/253 |
| 2013/0245937 A1 | 9/2013 | Dibernardo et al. |
| 2013/0284207 A1* | 10/2013 | Vicente Pena ........ F24J 2/14 134/6 |
| 2013/0325330 A1* | 12/2013 | Chen ................ G01C 21/32 701/450 |
| 2014/0230179 A1* | 8/2014 | Matsubara ........... A47L 7/04 15/319 |
| 2015/0073586 A1* | 3/2015 | Weiss ............... B66F 9/063 700/216 |
| 2015/0202771 A1* | 7/2015 | Lee ................. B25J 9/0003 700/259 |
| 2015/0212520 A1* | 7/2015 | Artes ................ G05D 1/0022 701/2 |

OTHER PUBLICATIONS

Gutmann, et al.; Localization in a Vector Field Map; Proc. of Int. Conf. on Intelligent Robots and Systems (IROS) 2012.

Gutmann, et al.; Scaling Vector Field Slam to Large Environments; Evolution Robotics, Pasadena, California.

West, et al; Evolution Robotics Extends Awardwinning Product Line With Mint™ Plus Automatic Floor Cleaner, retrieved from the Internet <URL: http://mintcleaner.com/2011/evolution-robotics-extends-award-winning-product-line-with-mint%E2%84%A2-plus/>; Sep. 14, 2011; retrieved on Oct. 31, 2012.

U.S. Appl. No. 13/651,080, filed Oct. 12, 2012, Enrico DiBernardo.

USPTO; Office Action dated Aug. 13, 2014, from related application U.S. Appl. No. 13/673,935 (filed Nov. 9, 2012).

USPTO; Office Action dated Sep. 25, 2014, from related application U.S. Appl. No. 13/673,926 (filed Nov. 9, 2012).

USPTO; Office Action dated Nov. 18, 2014, from related application U.S. Appl. No. 13/673,935 (filed Nov. 9, 2012).

European Patent Office; Extended European Search Report dated Dec. 1, 2015, from related European Patent Application No. 12848273 (filed Nov. 9, 2012).

European Patent Office; Supplemental Partial European Search Report dated Aug. 5, 2015, from related European Patent Application No. 12848273 (filed Nov. 9, 2012).

* cited by examiner $x_0$    c    $m_1$    $m_2$    $m_3$    $m_4$

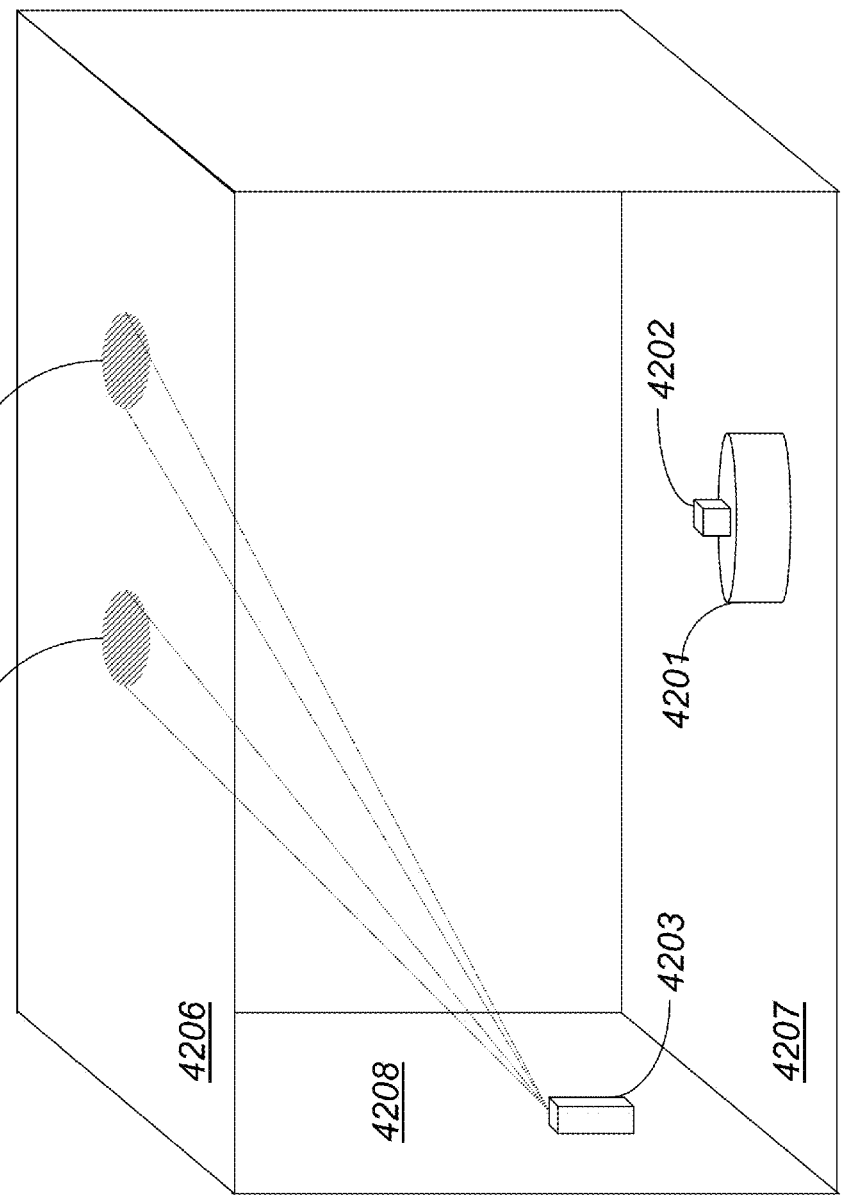

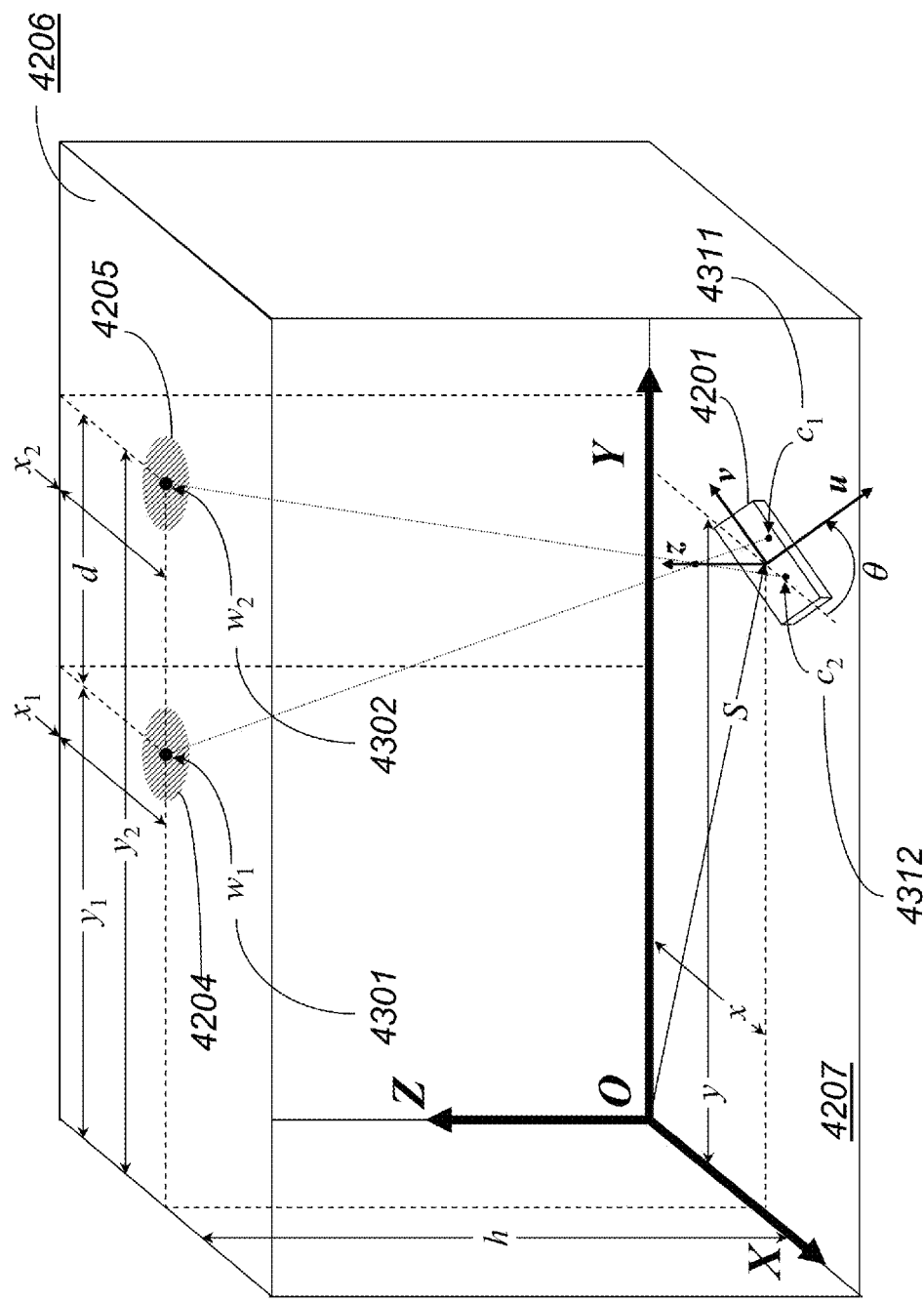

RE-LOCALIZATION OF A ROBOT FOR SLAM

CROSS-REFERENCE TO RELATED APPLICATIONS

This application claims the benefit under 35 U.S.C. §119(e) of U.S. Provisional Application No. 61/558,831, filed Nov. 11, 2011, the entirety of which is hereby incorporated by reference herein.

This is related to U.S. patent application Ser. No. 12/940,937 filed on Nov. 5, 2010, and U.S. patent application Ser. No. 11/090,621 filed Mar. 25, 2005, now U.S. Pat. No. 7,720,554, issued May 18, 2010, the entireties of which are hereby incorporated by reference herein.

BACKGROUND OF THE INVENTION

Field of the Invention

The invention generally relates to mobile robots, and in particular, to the localization of mobile robots.

Description of the Related Art

By choosing appropriate sensors, computing hardware, algorithms, and a process for setup, a mobile robot can be installed for autonomous navigation in almost any indoor space [1].

The question from a consumer perspective then becomes, how cheap can a system be designed, and how simple can the setup process be made. In the context of autonomous floor cleaning, the hardware costs should be as small as possible (within a few tens of dollars) and the setup should be minimal, e.g. the often suggested approach of first fully mapping an environment for the purpose of localization afterwards [2] will not be acceptable to many end consumers.

In this respect, approaches using vision or small laser range finders have become very successful within the last few years. Samsung's Hauzen is one of the existing autonomous vacuum cleaners showing systematic navigation. A camera pointing towards the ceiling is used for tracking the pose of the robot [3]. The same sensor configuration is used nowadays on many other robot vacuums, including those of Yujin Robotics, Philips and LG Electronics. In addition to the up-facing camera, LG's Roboking also uses an optical sensor observing the floor surface. A different sensing technology is employed in Neato's XV-11 vacuum robot: a miniature laser range finder [4]. Navigation using that sensor has been a research topic for more than two decades [5].

SUMMARY

One embodiment includes a method of estimating a pose of a robot, wherein the method includes: computing the pose of the robot through simultaneous localization and mapping as the robot moves along a surface to generate one or more maps, wherein the pose comprises position and orientation of the robot; navigating the robot such that the robot treats the surface in a methodical manner; determining that operation of the robot has been paused, and after resuming operation of the robot: re-localizing the robot within a map of the one or more maps without erasing the one or more maps; and resuming treatment of the surface in the methodical manner.

One embodiment includes an apparatus, wherein the apparatus includes: a robot; and a controller of the robot configured to: compute a pose of the robot through simultaneous localization and mapping as the robot moves along a surface to generate one or more maps, wherein the pose comprises a position and orientation of the robot; navigate the robot such that the robot treats the surface in a methodical manner; determine that operation of the robot has been paused, and after resumption of operation of the robot: re-localize the robot within a map of the one or more maps without erasing the one or more maps; and resume treatment of the surface in the methodical manner.

One embodiment includes an apparatus for estimating a pose of a robot, wherein the apparatus includes: a means for computing the pose of the robot through simultaneous localization and mapping as the robot moves along a surface to generate one or more maps, wherein the pose comprises position and orientation of the robot; a means for navigating the robot such that the robot treats the surface in a methodical manner; a means for determining that operation of the robot has been paused, and after resuming operation of the robot: a means for re-localizing the robot within a map of the one or more maps without erasing the one or more maps; and a means for resuming treatment of the surface in the methodical manner.

One embodiment includes a method of performing simultaneous localization and mapping (SLAM) for a robot, wherein the method includes: performing SLAM in a first area associated with a first map; performing SLAM in a second area associated with a second map; and performing position estimation in a third area outside of and between the first area and the second area, wherein in the third area, position estimation is performed with dead reckoning.

One embodiment includes an apparatus, wherein the apparatus includes: a robot; a controller of the robot configured to: perform SLAM in a first area associated with a first map; perform SLAM in a second area associated with a second map; and perform position estimation in a third area outside of and between the first area and the second area, wherein in the third area, position estimation is performed with dead reckoning.

One embodiment includes an apparatus for performing simultaneous localization and mapping (SLAM) for a robot, wherein the apparatus includes: a means for performing SLAM in a first area associated with a first map and in a second area associated with a second map; and a means for performing position estimation in a third area outside of and between the first area and the second area, wherein in the third area, position estimation is performed with dead reckoning.

One embodiment includes a method of managing resources for a robot, wherein the method includes: associating observations of a first set of one or more continuous signals with a first map; associating observations of a second set of one or more continuous signals with a second map, wherein the second map is maintained independently the first map; and switching between performing simultaneous localization and mapping (SLAM) with the first map or performing SLAM with the second map based at least partly on an observed signal strength of the first set or the second set.

One embodiment includes an apparatus, wherein the apparatus includes: a robot; a controller of the robot configured to: associate observations of a first set of one or more continuous signals with a first map; associate observations of a second set of one or more continuous signals with a second map, wherein the second map is maintained independently the first map; and switch between performing simultaneous localization and mapping (SLAM) with the first map or performing SLAM with the second map based at least partly on an observed signal strength of the first set or the second set.

One embodiment includes an apparatus for managing resources for a robot, wherein the apparatus includes: a means for associating observations of a first set of one or more continuous signals with a first map; a means for associating observations of a second set of one or more continuous signals with a second map, wherein the second map is maintained independently the first map; and a means for switching between performing simultaneous localization and mapping (SLAM) with the first map or performing SLAM with the second map based at least partly on an observed signal strength of the first set or the second set.

The robots can also include a drive assembly, such as a motor, wheels, gearbox and the like for moving and maneuvering the robot, include wheel odometers for odometry, a gyroscope for measuring yaw angle, and a treatment assembly, such as a cleaning assembly, for treating a surface, such as a floor.

BRIEF DESCRIPTION OF THE DRAWINGS

These and other features of the invention will now be described with reference to the drawings summarized below. These drawings (not to scale) and the associated descriptions are provided to illustrate preferred embodiments of the invention and are not intended to limit the scope of the invention. Like designations denote like elements.

Figure 20:
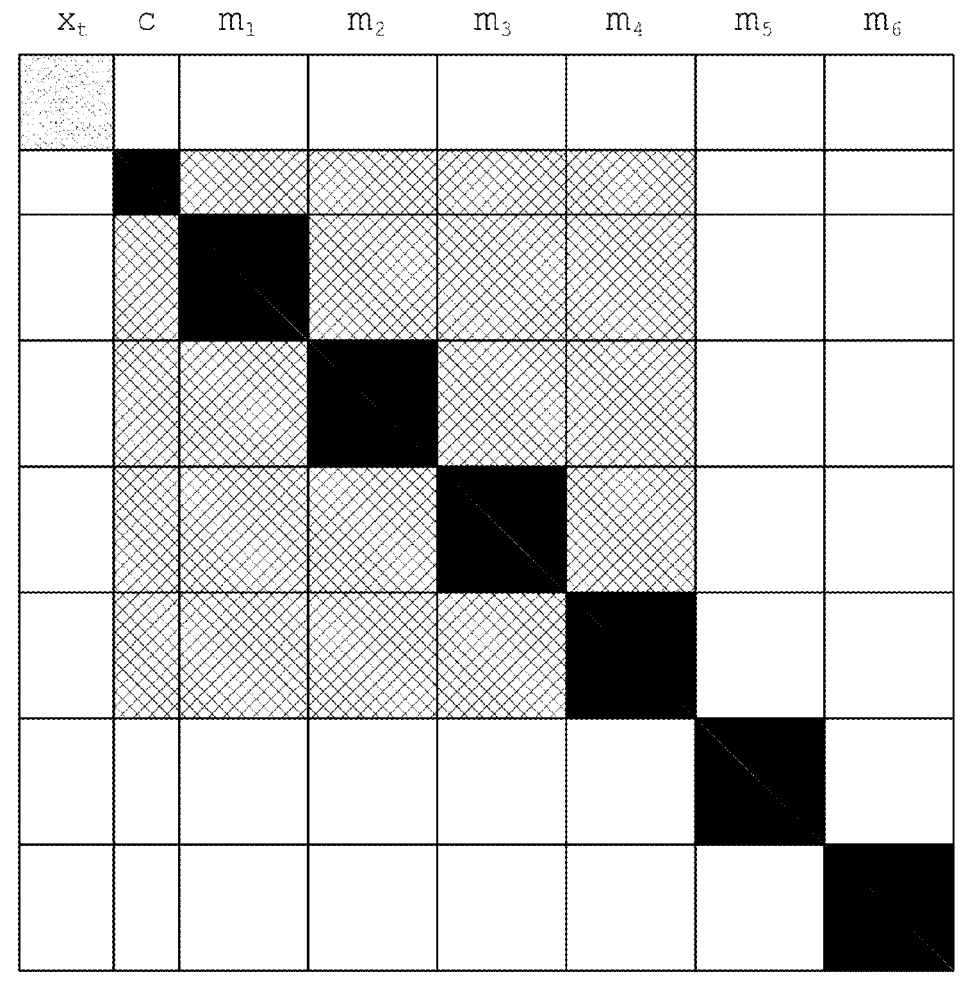

FIGS. 16-22 illustrate an example development of an information matrix in an embodiment using EKF SLAM for localization.

FIG. 42 illustrates an example of a use for the position estimation techniques.

FIG. 43 illustrates a geometrical model associated with one embodiment.

DETAILED DESCRIPTION OF THE PREFERRED EMBODIMENT

Although these methods and apparatus will be described in terms of certain preferred embodiments, other embodiments that are apparent to those of ordinary skill in the art, including embodiments that do not provide all of the benefits and features set forth herein, are also within the scope of the invention.

Figure 1:
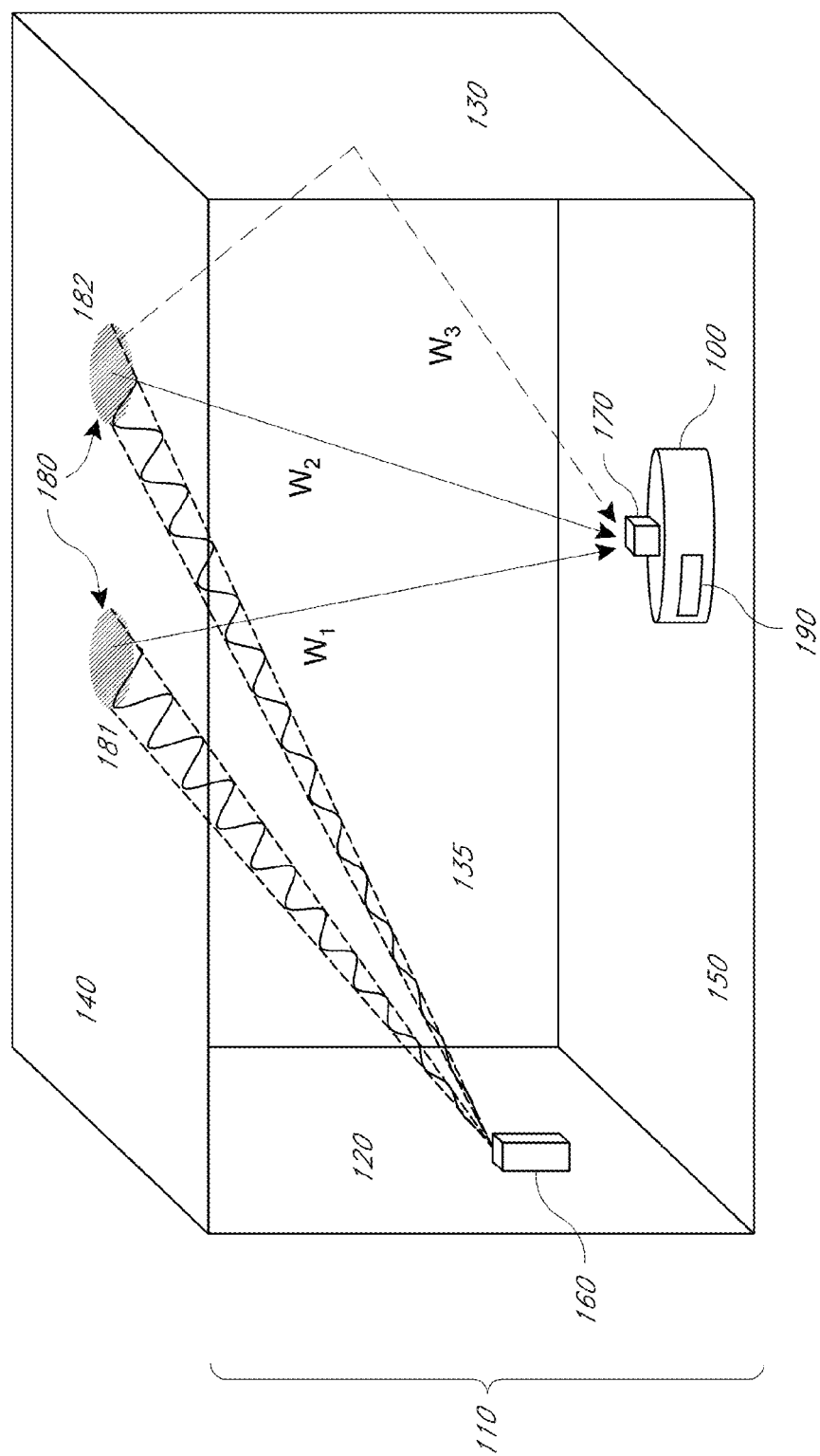
FIG. 1 illustrates an example embodiment of a mobile device configured to learn signal distributions for use in localizing and navigating an environment.

One embodiment uses low-cost indoor navigation which employs active beacons in the form of navigation cubes that project two patterns onto the ceiling in the area to be cleaned (see FIG. 1). It can be argued that this is a modification to the environment. However, other systems also require modifications before a robot can operate, e.g. turning on lights for a vision system, installing virtual walls for defining the area the robot is allowed to navigate in, or, in general, opening doors and clearing of obstacles. In another embodiment, the localization system leverages on existing infrastructure already present in the home, for example the WiFi signals of base stations.

Some of the advantages of embodiments compared to vision or range finders-based solutions are the low memory footprint and the low computational requirements. The data structures used fit into tens of kilobytes and are updated on relatively low-cost computational hardware, such as an ARM7 processor. This reduces the cost of the localization subsystem which is crucially important in consumer products and can make the difference between success and failure of the product in the marketplace.

Localization using active beacons looks trivial at first sight as the pose of the robot could be triangulated from the known beacon positions [6]. However, usually the beacon positions are not known a priori and the beacon signals become distorted by reflections off walls and furniture. The latter is also a well-known problem with other similar signals, like GPS in urban canyons [7], or the mobile positioning in wireless networks [8].

Instead of modeling or filtering multi-path signals, recent approaches compute a signal map over the environment, sometimes also referred to as location fingerprinting [9]. The signal map can be learned by, for example, Expectation-Maximization [10] or Gaussian Process Latent Variable Models [11]. In one embodiment, the signal map is learned using a simultaneous localization and mapping (SLAM) approach.

In one embodiment, the signal map includes signal vectors over space and is referred to as Vector Field SLAM. An earlier application (U.S. application Ser. No. 12/940,937) disclosed a method for keeping a robot localized in small- to medium-sized environments containing a single "Northstar" beacon [12, 13]. A Northstar beacon refers to a device which projects two or more spots of lights, preferably to a ceiling. These spots can be in the infrared spectrum and each spot can be distinguished based on a switching frequency at which the spots are pulsed.

Described herein are methods and systems for the localization of an object, such as a mobile object (e.g., a robotic floor cleaner). Certain embodiments may utilize such mobile object localization to navigate the mobile object. By way of illustration and not limitation, the mobile object may optionally be an autonomous, semiautonomous, or remotely directed floor cleaner (e.g., a sweeper, a vacuum, and/or a mopper), delivery vehicle (e.g., that delivers mail in a building, food in a hospital or dormitory, etc.), or monitoring vehicle (e.g., pollution or contaminant detector, security monitor), equipped with one or more drive motors which drive one or more wheels, tracks, or other such device, where the drive motors may be under control of a computing device executing a program stored in non-transitory memory (e.g., it persists when the object is powered down or when some other data is overwritten or erased).

Example embodiments will now be described with reference to certain figures. Through the description herein, "localization" may include determining both the position of an object in an environment and the orientation of that object. The combination of position and orientation is referred to as the "pose". Either or both of the position (or location) and orientation may be absolute (in terms of a logical reference angle and origin) or relative (to another object).

Many objects, including mobile objects, are not functionally or physically symmetrical. Knowing the orientation of such objects may be useful in determining how to navigate such objects in an environment. For example, some mobile objects can only move forward and some mobile objects may have functional components, such as vacuum ports or sweepers, at specific locations on their surface. Also, the current orientation of a mobile object may affect its future position as much as its current position does if it moves in the direction of its orientation. Thus, determining the pose of a mobile object may be of great assistance in determining how to navigate the mobile object to perform a task, such as a floor cleaning task, in an efficient manner.

For convenience, much of this disclosure is expressed in terms of localizing a "mobile device". However, the disclosed aspects may generally be used to localize types of objects, and one of skill in the art will understand how the disclosure can be applied to objects that are not independently mobile (such as those that are transported or carried by something else) and to objects that are not devices (e.g., pets equipped with collars or humans carrying appropriately configured tags or computing devices).

Typically, when performing tasks such as vacuum cleaning, lawn mowing, delivery, elderly care, etc., an autonomous or mobile device needs to know its pose with respect to its environment in order to reach its goal or accomplish its task in an effective way. For example, toys and other devices might be intended and configured to behave in a particular manner when they are in a particular location. Even if the device itself has no additional task or goal that benefits from localization, if its pose can be determined then the location of a person or other entity carrying or otherwise attached to the device can be determined. If the relative orientations of the carrier and the device are known, then the pose of the carrier can be determined.

The methods and systems disclosed herein advance the state of the art in how the pose of an autonomous device is computed from a combination of observations of a vector field that varies over space and measurements from motion sensors such as odometers, gyroscopes, accelerometers, internal measurement units (IMU) or other dead-reckoning devices (generically referred to as "dead-reckoning sensors" and the output of which is generically referred to as "odometry" or "motion measurements"). Measurements (e.g., measurements of change in position or orientation) from a motion sensor may be relative to another position or may be absolute. Such measurements may include measures of location or distance (e.g., distance or direction of travel) as well as measures of object orientation (e.g., amount of rotation from a previous orientation or amount of rotation from an absolute reference). Wave or other signals emitted into an environment by an external source can create an appropriate vector field. Example methods and systems disclosed herein use a localization and mapping technique, such as a simultaneous (which may be substantially simultaneous) localization and mapping (SLAM) framework, for estimating object pose, parameters modeling rotational variability, and parameters describing the signal distribution or vector field in the environment.

Example embodiments incorporating certain disclosed aspects can localize and track a mobile device with higher accuracy than conventional methods that ignore complications such as rotational variability or multi-path effects. Some embodiments do so in a way that requires no a priori map of the environment or of the signal strength in that environment. Some disclosed embodiments can optionally do so while using relatively inexpensive amounts of computational resources such as processing power, storage, and time, such that the functionality disclosed herein can be made available in a relatively compact mobile device and/or it can be distributed in affordable mass market consumer goods, including products which perform additional functionality beyond localizing, mapping, or navigating. Pose estimates can be obtained in near real time in some such embodiments and some embodiments run in constant or substantially constant time, with storage requirements linear or near linear based on the size of the environment for a given node size (i.e., for a given node size, it is linear in the number of nodes).

FIG. 1 illustrates an example context or environment in which an object 100 such as a mobile device may be situated. The environment 110 in this example includes left wall 120, right wall 130, front wall 135, ceiling 140, and floor or ground 150. One or more signal sources 180 generate background wave signals—the aforementioned vector field. The mobile device 100 includes a signal detector 170 configured to detect the signals generated by the sources 180 and a dead-reckoning (motion) sensor 190 to report on observed motion.

U.S. Pat. No. 7,720,554 discloses, among other things, a low-cost optical sensing system for indoor localization. A beacon 160 projects a pair of unique infrared patterns or spots 180 on the ceiling 140. The beacon 160 can be placed relatively freely in the environment 110 and adjusted such that it points towards the ceiling 140. An optical signal sensor 170 measures the direction to both spots 180 on the ceiling 140. The signal sensor 170 then reports the coordinates of both direction vectors projected onto the sensor plane. These beacon spots 180 are the signal sources in an example embodiment that is used throughout this disclosure. Other embodiments may use more or fewer spots 180. Other wave signals such as those used in Wi-Fi, GPS, cellular networks, magnetic fields, sound waves, radio-frequency identification (RFID), or light can also be used. Corresponding sources include wireless routers, satellites, cell towers, coils, speakers, RFID transmitters, and projectors. For example, appropriately configured ceiling lights or speakers may be used in certain embodiments. Although the illustrated embodiment uses a dedicated projector 160 to generate the signal sources 180, in other embodiments pre-existing or off-the-shelf generators can be used. For example, in an apartment complex or a yard, a detector 170 may be configured to take advantage of the distinct Wi-Fi signals available from the various Wi-Fi routers that may be within range. Similarly, existing lights, including fixed ceiling lights, may be used with photo-sensitive sensors. Other signal sources may generate soundwaves (audible, subsonic, or ultrasonic) and the detector 170 may be configured to detect the generated waves. Thus, no or minimal modification to the environment is necessary for such embodiments to be effective. Digital signals, including those transmitted by radio and/or as used in wireless communications may also be used.

Because an indoor embodiment is used to illustrate many of the disclosed aspects, those aspects are disclosed in the context of an indoor environment. However, the disclosed aspects are not limited in this way and can operate outdoors as well as indoors.

A system that tracks the pose of a mobile device 100 equipped with a signal sensor 170 by relying, even in part, on the values reported by that sensor 170 faces a number of challenges. Typically, the signals sensed by the sensor 170 will have a different strength or value at different locations in the environment. In the illustrated scenario, the mobile device 100 moves along the ground 150 (although one of skill could readily apply what is disclosed to a mobile device that travels along a wall or ceiling, or that moves (and rotates) in three dimensions). One challenge is relating a change in the detected (sensed) signal to a change in ground position. The relationship between sensed signal and ground position is the "scale" parameter.

Another challenge stems from the construction, manufacture, or assembly of the sensor 170, performance properties of the sensor 170, and/or its association with or coupling to the mobile device 100. In some embodiments the orientation of the sensor 170 is fixed relative to the environment 110 and is independent of the rotation of the mobile device 100. For example, a gyroscopic or inertial system may be used to rotatably attach the sensor 170 to the mobile device 100 such that when the mobile device turns or rotates, the sensor rotates in a counter direction. In other embodiments the sensor 170 is rigidly affixed to or integrated with the mobile device 100 such that its orientation is substantially fixed relative to the orientation of the mobile device 100. Indeed, in this disclosure the position and orientation of the sensor 170 are presumed to be identical to that of the mobile device 100 so that, for example, "sensor 170" is used interchangeably with "device 100" when discussing pose or motion. As discussed below, this assumption simplifies the disclosure. One of reasonable skill can readily account for any fixed or calculable offset between the orientation of the sensor 170 and the device 100.

Ideally, rotation of the sensor 170 relative to the environment 110 should not affect the detected signal or should affect it in a way that depends only on the degree of rotation. For example, the direction to signal sources 180 changes when rotating the sensor 170, but the magnitude of the signal at that position is not changed. However, some sensors have directional sensitivities. For example, a Wi-Fi receiver can show changes in signal strength when the antenna is rotating as a result of the device on which it is mounted (e.g., the mobile device) rotating. Even in such a situation, the variation might be predictable and calculable. However, errors in manufacturing, misalignments in attaching the sensor on the object, uneven flooring, and the like may introduce an additional, difficult to predict, variation in the orientation of the signal sensor 170 relative to the orientation of the device 100. This may lead to seemingly unpredictable variation in the signal strength detected by the sensor 170. Thus, for example, a sensor 170 measuring bearing and elevation relative to sources 180 can show variations due to calibration errors of the sensor's vertical axis. This parameter is referred to herein as "rotational variability".

A third challenge in determining the pose of a mobile device arises from the multiple paths from the signal sources 180 to the sensor 170. In general, a sensor 170 may receive a wave signal not only directly from a source 180 but also through reflections on walls 120, 130, 135 and other stationary and non-stationary objects in the environment 110 (e.g., furniture, trees, and humans). The direct path as well as each reflection may contribute to the signal measured on the sensor 170. This can create non-linear and seemingly arbitrary distributions of the signal throughout the environment 110. This effect is referred to herein "multi-path".

Some embodiments of the methods and systems disclosed are configured to operate when some or all of the following conditions are met:

First, a given signal can be uniquely identified relative to other signals so that when a signal is detected at different times in an environment 110 with multiple signals, a correspondence between the signals can be maintained. For example, signals in Wi-Fi, GPS and other networks contain a unique ID as part of their data packet protocol. Active beacons, such as those disclosed in U.S. Pat. No. 7,720,554, may encode a signature (e.g., by modulating the signal, such as by modulating a light that forms light spots on a ceiling).

Second, signals are substantially continuous and change over space but optionally not in time. It should be understood that continuity does not mean that there is necessarily a one-to-one correspondence of vector of signal values to ground positions. The same measurement vector might be observed at several different locations in the environment 110 because, for example, of multi-path. Some embodiments may operate with signals that change in time, where the change over time is known or can be predicted.

Third, a dependency on orientation can by described by signal sensor orientation and rotational variability. In other words, knowing the signal values at one pose (position and orientation) enables expected signal values for other orientations at the same position to be calculated if the change in sensor orientation and any rotational variability are known.

Figure 2:
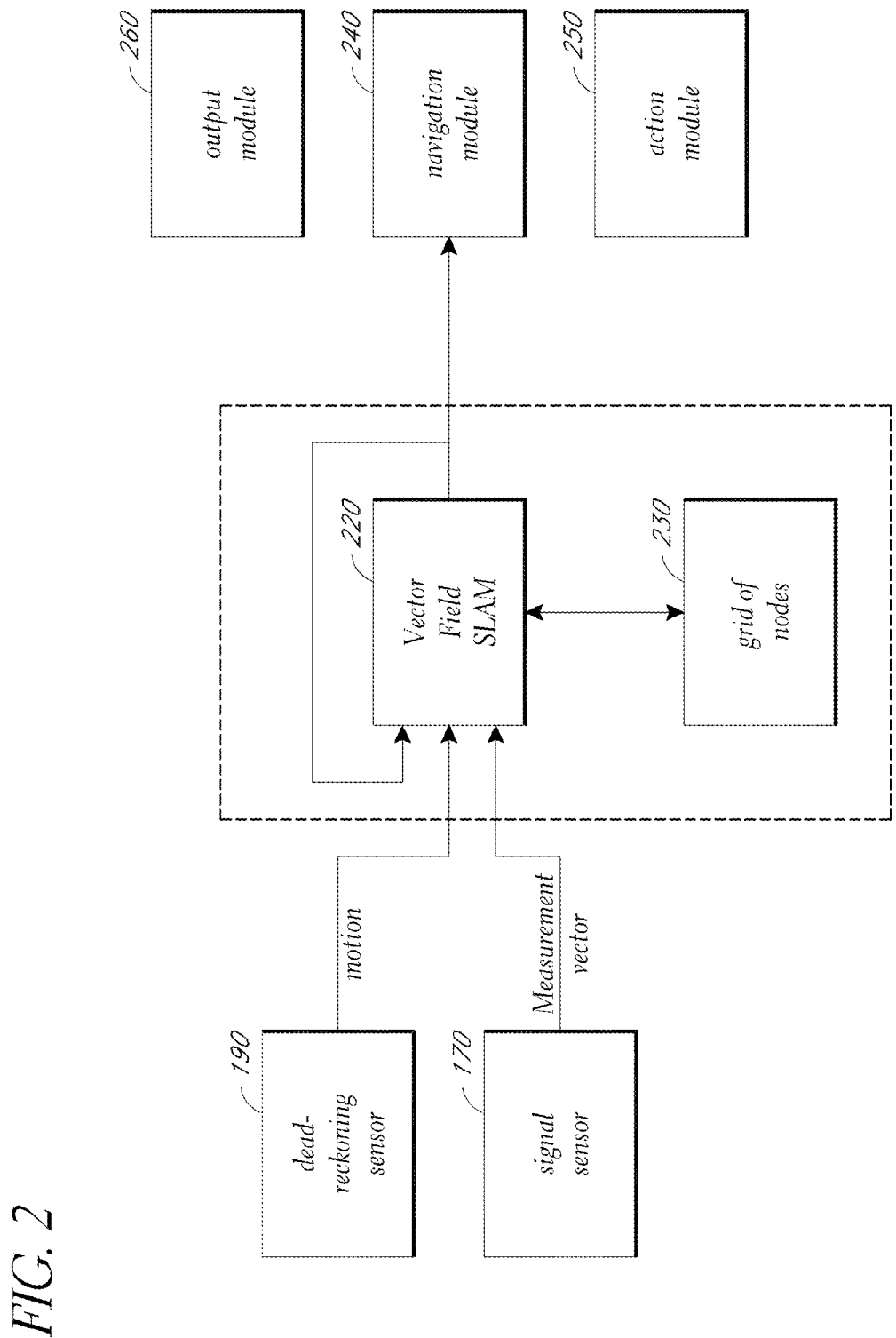
FIG. 2 is a functional logical diagram illustrating example functional elements of an embodiment of such a mobile device.

FIG. 2 illustrates an example functional block diagram of an embodiment of a localization system. A dead reckoning sensor 190 provides relative motion data (odometry). Information from the dead reckoning sensor may be used to estimate, in whole or in part, the device's current position based upon a previously determined position and advancing that position using a known or estimated speed over an elapsed period of time.

The dead reckoning (motion) sensor 190 may include multiple instances of multiple types of dead reckoning sensors such as those mentioned above. A signal sensor 170 provides measurement vectors of the signals in the environment. The signal sensor 170 may include multiple instances of one or more types of sensing components. In some embodiments the signal sensor 170 may include one or more sensors which detect more than one different types of signals (e.g., the signal sensor 170 may include both Wi-Fi sensors and light sensors). Some such embodiments may use only one signal type at a time; some such embodiments may normalize the output of the signal sensor and proceed as if there were only one type of (composite) signal being sensed; and some embodiments may extend what is disclosed below in obvious ways by using the availability of more signal sensor data to improve the filtering results.

The output of sensors 170, 190 are provided to a Vector Field SLAM module 220. The illustrated SLAM module 220 reads and stores information 230 about a grid of nodes. The SLAM module 220 also provides pose estimates of the mobile device 100 and map information about the signal distribution in the environment 110. These may be provided to other components for use and/or display. For example, pose estimates may be provided to a navigational component 240, which directs the mobile device 100 to move to a new location based at least in part on its current pose. They may also be provided to an alerting or action system 250 which uses the current pose as at least a partial basis for subsequent action such as cleaning. The map may be stored for future use and/or displayed for diagnostic purposes, for example.

Even though many appropriate signal sources may be present or could be made available, and although appropriate signal sensors may be configured on an embodiment, some embodiments will optionally not use GPS, not use WiFi, not use direct light signals (e.g., non-reflected light from lamps or infrared sources), and/or not make use of ceiling lighting fixtures for some or all aspects of the localization process.

Figure 3:
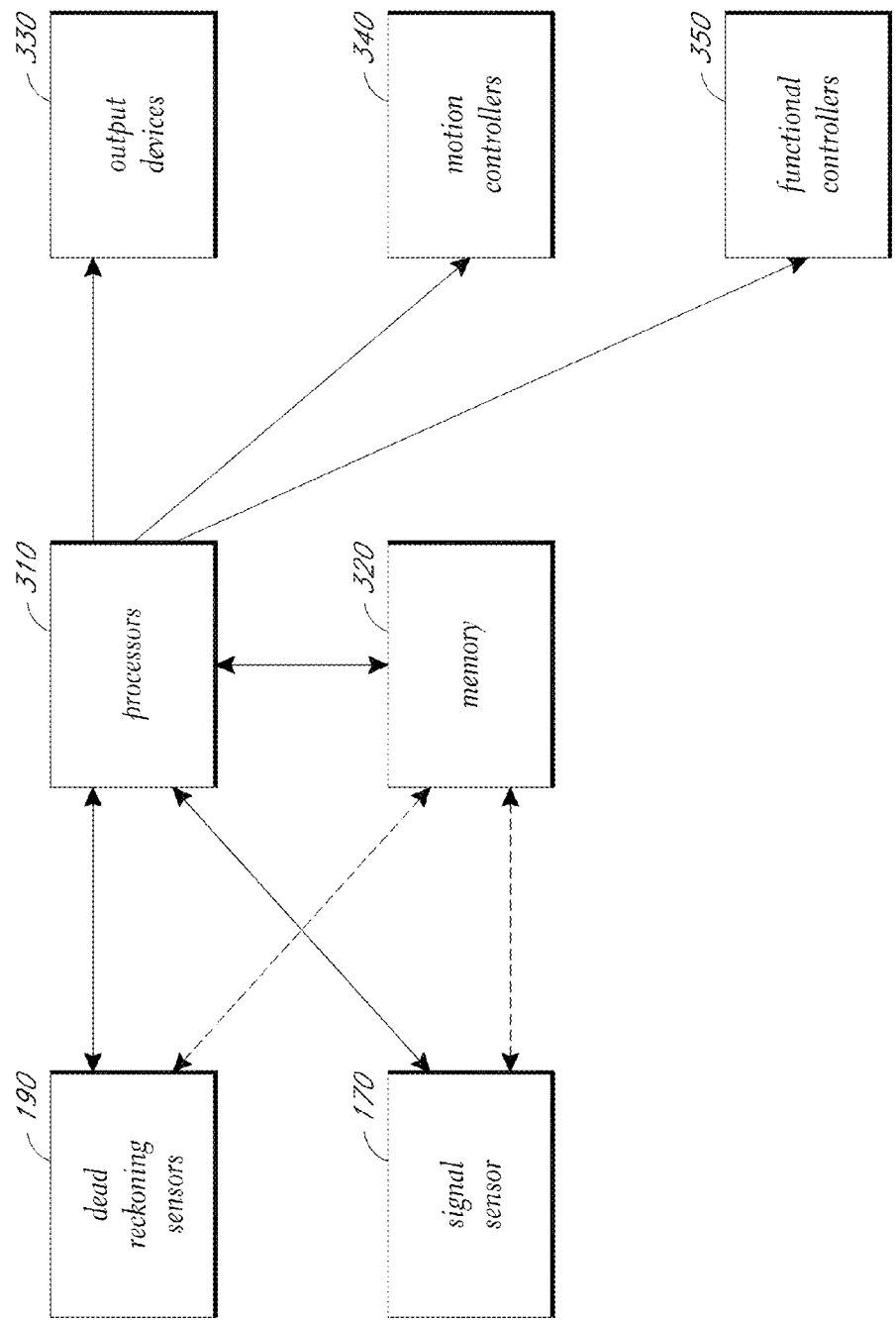
FIG. 3 illustrates an example physical architecture of an embodiment of such a mobile device.

FIG. 3 illustrates example physical components of an appropriately configured example device 100. The dead reckoning sensors 190 and signal sensors 170 are instantiated by components such as those described above. Those physical sensors may include their own processors and/or local storage components and may be configured to normalize data and generate standardized output signals. The sensor components may communicate with one or more processors 310. The processor may be, for example, a specially configured chip or a more general processor executing software. Regardless, it is configured in accordance with what is disclosed herein. The processor may include its own storage, but it may be advantageous for the device 100 to include additional memory or storage 320 to store any necessary software and the data necessary to implement the methods disclosed below. In some embodiments the sensors may also store data directly in the memory 320. Software for implementing aspects of what is disclosed would typically be stored in ROM, flash memory, or some other form of persistent storage, although volatile storage may be used as well. Data may be stored in volatile (e.g., can be erased when the system powers down) and/or non-volatile memory (which stores the data for later access even if the device is powered down and then powered up again). The processor 310 and storage 320 may also be used for functional purposes not directly related to localization. For example, the mobile device 100 may use them when performing navigation or when performing tasks such as cleaning or guarding. In other embodiments, the processing and storage capacity are dedicated to localization and mapping and the device contains additional computational capacity for other tasks.

The processor 310 may be operatively connected to various output mechanisms such as screens or displays, light and sound systems, and data output devices (e.g., busses, ports, and wireless or wired network connections). The processor may be configured to perform navigational routines which take into account the results of the SLAM process. Executing a navigational process may result in signals being sent to various controllers such as motors (including drive motors or servomotors), brakes, actuators, etc, which may cause the mobile device 100 to move to a new pose (or to perform another activity, such as a cleaning function). The move to this new pose may, in turn, trigger additional output from the sensors to the processor, causing the cycle to continue. An example embodiment is configured with an ARM7 processor, 256K of flash ROM for software, and 64K of RAM for data. These are not minimum requirements—some or all of what is disclosed herein can be accomplished with less processing and storage capacity. Other embodiments may be different processors and different memory configurations, with larger or smaller amounts of memory.

Turning back to FIG. 1, the signal sensor 170 measures bearing and elevation to two or more of the projected spots 180 on the ceiling 140. Bearing and elevation can be translated into (x, y) coordinates in a sensor coordinate system by projecting them onto the sensor plane, which in the illustrated example embodiment is typically less than 10 cm above the ground 150 and is substantially parallel to it. In addition to the signal coordinates, the amount of light from each spot 180 is measured as the signal magnitude.

Figure 4:
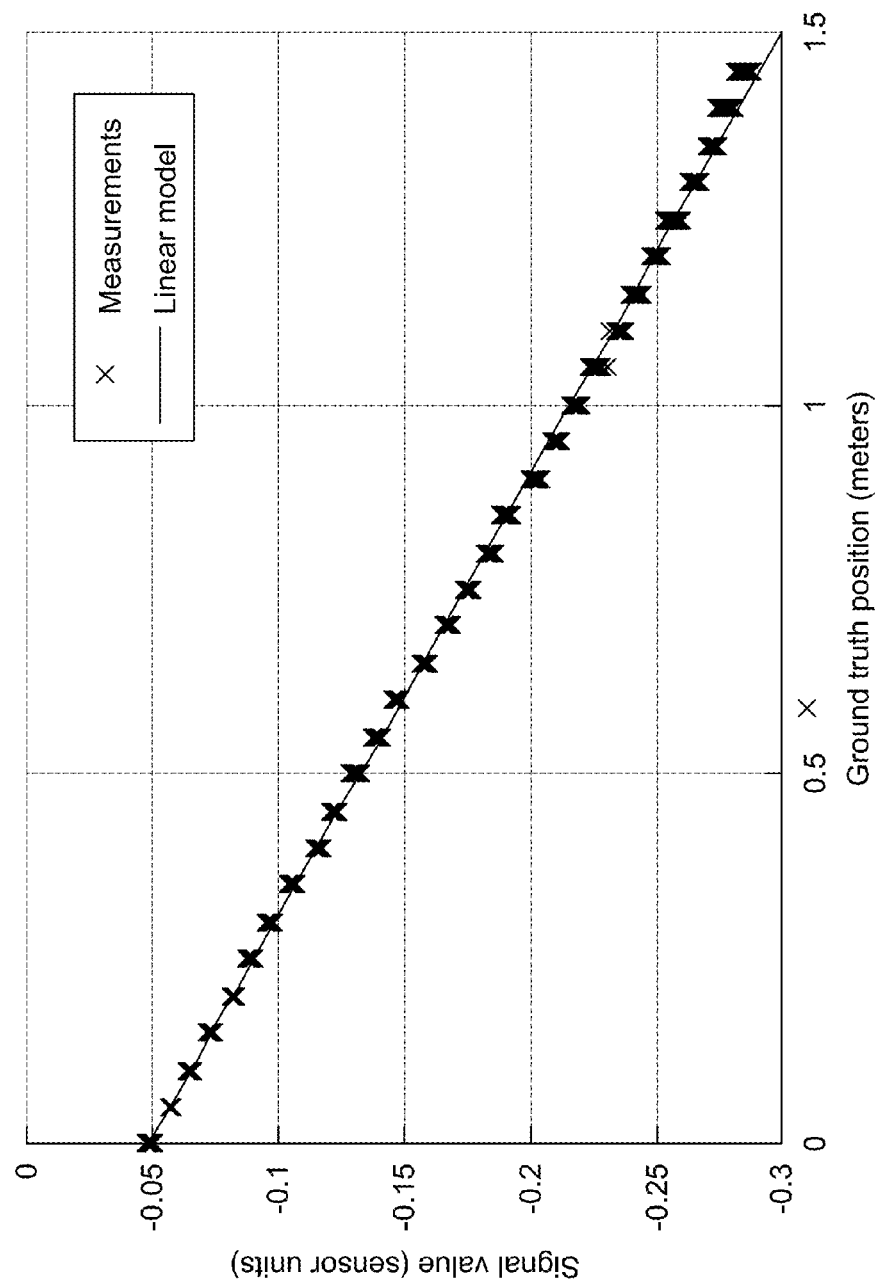
FIG. 4 illustrates a linear relationship between the actual ("truth") ground position of a mobile device and the output of a sensor detecting signals at that ground position.

The geometry of the illustrated localization system results in a linear model for position estimation in an ideal environment without multi-path signals. That is, if the sensor 170 moves one meter in one direction, the sensor coordinates change by a certain amount (depending on the scale parameter, which is proportional to the height of the ceiling 140). If the sensor 170 then moves another meter into the same direction, the sensed signals change by the same amount. FIG. 4 illustrates this property by using measurements of a sensor 170 mounted on a fixed path (or "rail") along which the sensor 170 moves in a fixed and known direction. The rail is an experimental platform for evaluating the systems and methods described herein which allows the ground position of the sensor 170 to be known to observers and which also allows the orientation of the sensor 170 to be controlled. On the x-axis the position on the rail is shown. The y-axis shows the y coordinate of one of the spots 180 in sensor units.

In situations such as that shown in FIG. 4, the linear distribution of the wave signal can be used directly for the localization of the sensor 170 in conjunction with other system parameters. For example, in the embodiment illustrated in FIG. 1 with two spots 180, these parameters could be chosen as per Eq. 1, where $s_1$ and $s_2$ are scale factors for each spot 180 and $m_0 = (m_{0,x1}\ m_{0,y1}\ m_{0,x2}\ m_{0,y2})^T$ contains absolute offsets $(m_{0,x1}\ m_{0,y1})^T$ for the first spot 181 and $(m_{0,x2}\ m_{0,y2})^T$ for the second spot 182.

$$v_{init} = (s_1, s_2, m_0) \qquad \text{Eq. 1}$$

From these parameters, an expected signal value $h = (h_{x1}, h_{y1}, h_{x2}, h_{y2})^T$ at a sensor position $(x\ y)^T$ can be calculated as:

$$\begin{pmatrix} h_{x1} \\ h_{y1} \\ h_{x2} \\ h_{y2} \end{pmatrix} = \begin{pmatrix} m_{0,x1} \\ m_{0,y1} \\ m_{0,x2} \\ m_{0,y2} \end{pmatrix} + \begin{pmatrix} s_1 & 0 \\ 0 & s_1 \\ s_2 & 0 \\ 0 & s_2 \end{pmatrix} \begin{pmatrix} x \\ y \end{pmatrix} \qquad \text{Eq. 2}$$

It is straightforward to extend this model for an arbitrary number of spots 180.

For general wave signals, a similar linear model can be chosen. In general, the following model in Eq. 3 applies, where h is the vector of estimated signal values for position $(x\ y)^T$, $h_0$ is the absolute offset in the sensor space, and $A_0$ is a general scale matrix.

$$h = h_0 + A_0 \begin{pmatrix} x \\ y \end{pmatrix} \qquad \text{Eq. 3}$$

Figure 5:
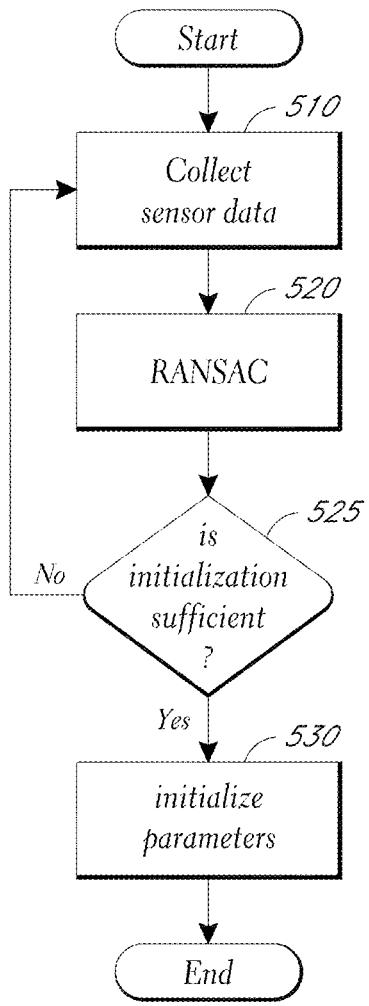
FIG. 5 illustrates a non-linear relationship between the actual ("truth") ground position of a mobile device and the output of a sensor detecting signals at that ground position.

A flow chart for computing the parameters of this linear model (either Eq. 2 or Eq. 3) is shown in FIG. 5. At state 510, sensor measurements are obtained from the signal sensor 170. When a sensor measurement is obtained, data about the concurrent pose of the device 100 is also obtained (e.g., at the same or substantially the same time), such as from one or more on-board dead-reckoning sensors 190 or from separate monitoring systems. State 510 continues while the device 100 travels a short distance. At state 520, a RANSAC method (or, more generally, any algorithm for fitting data into a linear model) is run. At state 525 the status of the process is evaluated. Based on, for example, the number of data points evaluates (which may be set to 2, 5, 10, or more), the amount of time elapsed (which may be set to 1 second, 5 seconds, 10 seconds, 30 seconds, or more), or the quality of the data fitting algorithm (which may be set to be about or above a particular threshold), an embodiment may determine the initialization is sufficient. If so, then at state 530, the output of RANSAC is used to initialize the parameters for the relevant equation. If not, the initialization process continues.

RANSAC (Random Sample Consensus) is an iterative method to estimate the parameters of a mathematical function from sensor data that include outliers (see, e.g., A. Fischler, R. C. Bolles. Random Sample Consensus: A Paradigm for Model Fitting with Applications to Image Analysis and Automated Cartography. Comm. of the ACM, Vol 24, pp 381-395, 1981). The RANSAC algorithm runs several iterations. In a given iteration a number of measurements are chosen at random (the term "random" as used herein, encompasses pseudo random). In an embodiment using two spots 180, two signal sensor 170 readings each containing measurements to both spots 180 are sufficient. In an example implementation, it was determined that additional sample readings per iteration did not produce a significant improvement on the results and increased the resources consumed by the RANSAC process. From the chosen measurements the parameter values are determined by solving the set of equations arising from placing the chosen measurements into the mathematical model, Eq. 2. More generally, Eq. 3 may be used. The computed parameters are then evaluated using some or all available sensor data, optionally including dead reckoning data. This usually computes a score such as the number of inliers or the overall residual error. After completing the desired number of iterations, the parameter values with a score meeting certain criteria (e.g., the best score) are chosen as the final parameters.

Embodiments may use variations of RANSAC or alternatives to it.

Illustrative examples of the parameters used during initialization are presented below, in the discussion of GraphSLAM.

Once the initialization process is complete or the parameters for the relevant equation are otherwise determined, one or more algorithms for accounting for noisy sensors and dead-reckoning drift can be used to implement a system to effectively track the pose of the mobile device 100 with more accuracy, in less time, and/or with lower computational resource requirements than many conventional methods. Examples of such algorithms include the Kalman Filter, the Extended Kalman Filter (EKF), the Invariant Extended Kalman Filter (IEKF), and the Unscented Kalman Filter (UKF). However, the ability of these filters to effectively track pose after the initialization process of FIG. 500 tends to degrade in environments where the distribution of the wave signal is non-linear. But even in environments, such as room 110, where the wave signal is distorted (e.g., by multi-path), the linear model described here is still useful for the initialization of non-linear systems according to what is disclosed herein.

As discussed above, multi-path occurs when the wave signal not only reaches the signal sensor 170 directly but also in other ways, such as by reflecting from nearby objects or walls (e.g. the right wall 130 in FIG. 1). As the sensor 170 moves closer to wall 130, due to occlusion and limited field of view, the sensor 170 receives more signal contributions from wall reflections. The result is a shift in the signal back to a position that appears to be further away from the wall 130.

Figure 6:
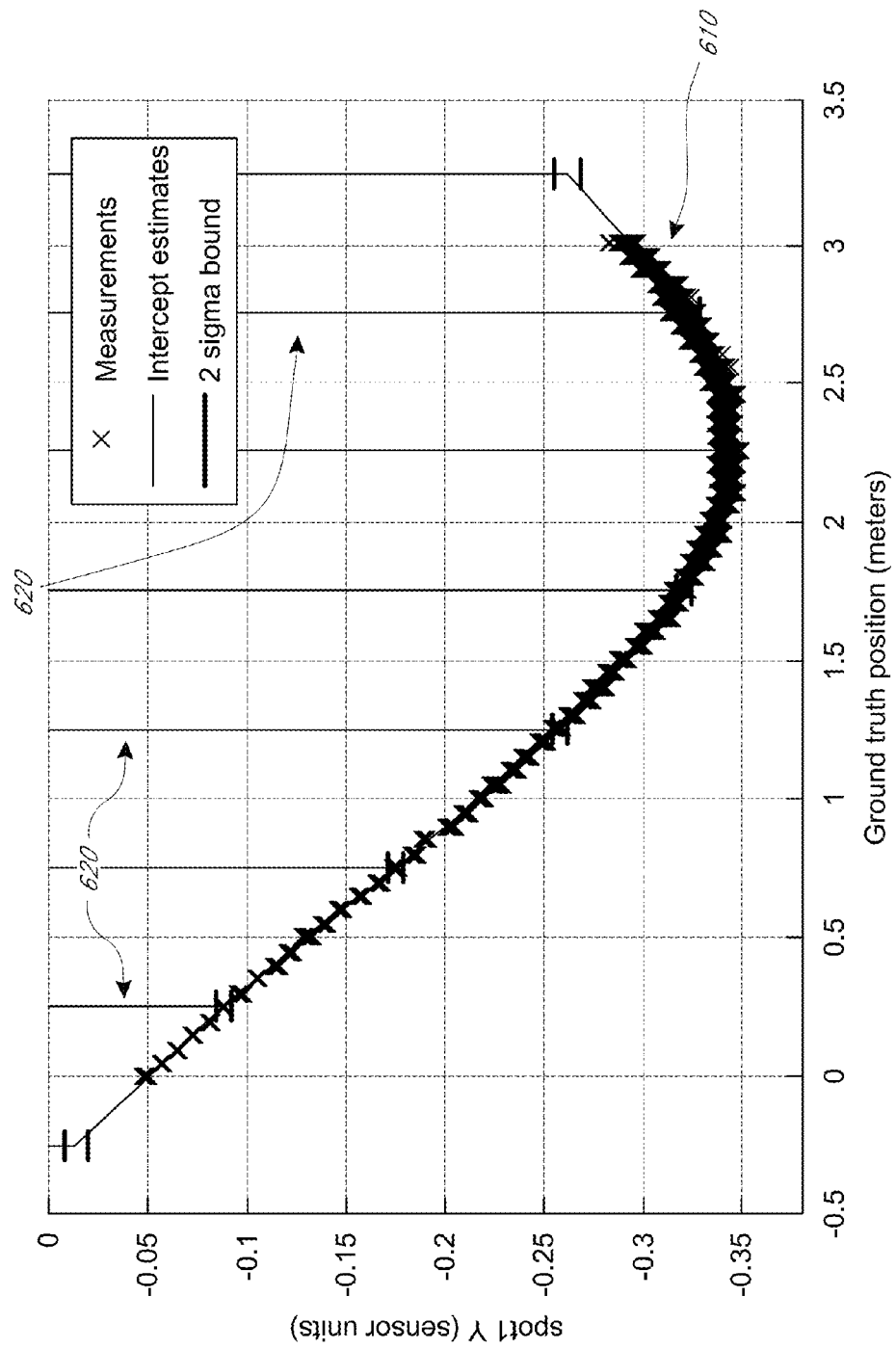
FIG. 6 is a flow chart of an example localization filter initialization process.

FIG. 6 illustrates this scenario where right wall 130 reflects the signal from the spots 180. Note how the curve 610 bends over and switches to the opposite direction: when the mobile device 100 is 3 meters from its starting point the sensor 170 is reporting a detected value of approximately −0.3, the same value it reported at approximately 1.5 meters, instead of the expected value of approximately −0.55 predicted by a linear model. This compression of the sensor signal appears with any wave signal that shows reflections from walls or other objects. It makes position estimation particularly difficult because a range of signal sensor readings do not match to exactly one ground position but instead have a least two ground position candidates. Even more candidates are possible when taking measurements in 2D or higher dimensions, or when the multipath pattern involves multiple objects, for example.

However, if the expected signal strength as a particular location is known, then signal strength measurements can still be used for localization in a multi-path environment via, for example, a Bayesian localization framework such as an EKF. In an example embodiment, by way of illustration, a piece-wise linear approximation (pieces are illustrated in FIG. 6 by the solid vertical lines 620) is used to substantially simultaneously learn the signal shape or "map" (the strength of the signal throughout the environment) and estimate the pose of the mobile device 100. This is done using a simultaneous localization and mapping (SLAM) approach.

The second challenge mentioned was rotational variability. When turning a sensor 170 in place, the measurements of the observed vector signal can change. This is the rotational variability of the sensor 170. For example, a sensor 170 in an embodiment using spots 180 outputs (x y) coordinates of the center of a spot 180 on the sensor plane. The (x y) coordinates essentially are a vector representing bearing and elevation to the spot 180. Ideally, as the sensor 170 rotates in place, only the bearing should change—the elevation should stay constant. In practice, however, elevation changes (usually, but not always, by a relatively small amount) due to variations in manufacturing, calibration errors, or misalignments in mounting the sensor 170 on the mobile device 100.

Figure 7:
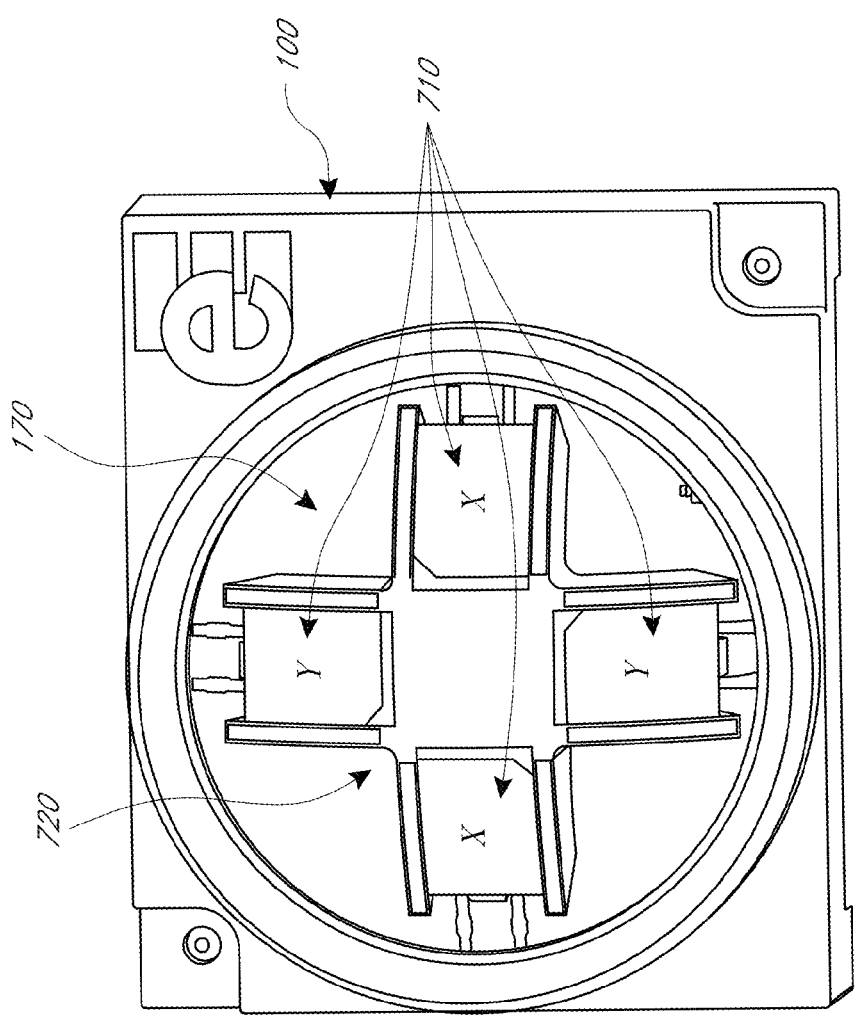
FIG. 7 illustrates an example embodiment of a signal sensor for localization.
Figure 7:
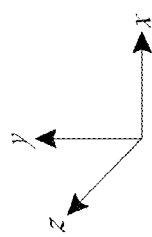

For example, FIG. 7 shows a top-down perspective of an example of one embodiment of a signal sensor 170 mounted on a mobile device 100. Although FIG. 1 represents the sensor 170 as protruding from the mobile device 100, FIG. 7 depicts an embodiment in which the sensor 170 is recessed in a cavity or depression with a substantially circular perimeter (although other perimeters could also be used). The sensor 170 comprises four infrared photodiodes 710 mounted on a pyramidal structure 720. The top of the pyramid 720 does not contain a photodiode 710 and is substantially coplanar with the top surface of the mobile device 100. In other embodiments, the sensor 170 may have a different structure including, for example, more or fewer photodiodes 710 arranged in a similar or different configuration. The approach described herein can be adapted to account for the geometric properties of the sensor 170 used. In the arrangement shown in FIG. 7, each of the photodiodes 710 measures incoming light by producing an electric current substantially proportional to the received light. Each of the two opposing photodiode pairs is then used for measuring the direction of light on the corresponding axis. Below, the computation of the light direction and the effects of rotational variability for the x axis of the sensor are discussed. The computations for the y axis are analogous. Thus, what follows describes a mathematical system that models rotational variability for the signal sensor 170 of FIG. 7 and can be readily adapted to a wide range of signal sensors.

Figure 8:
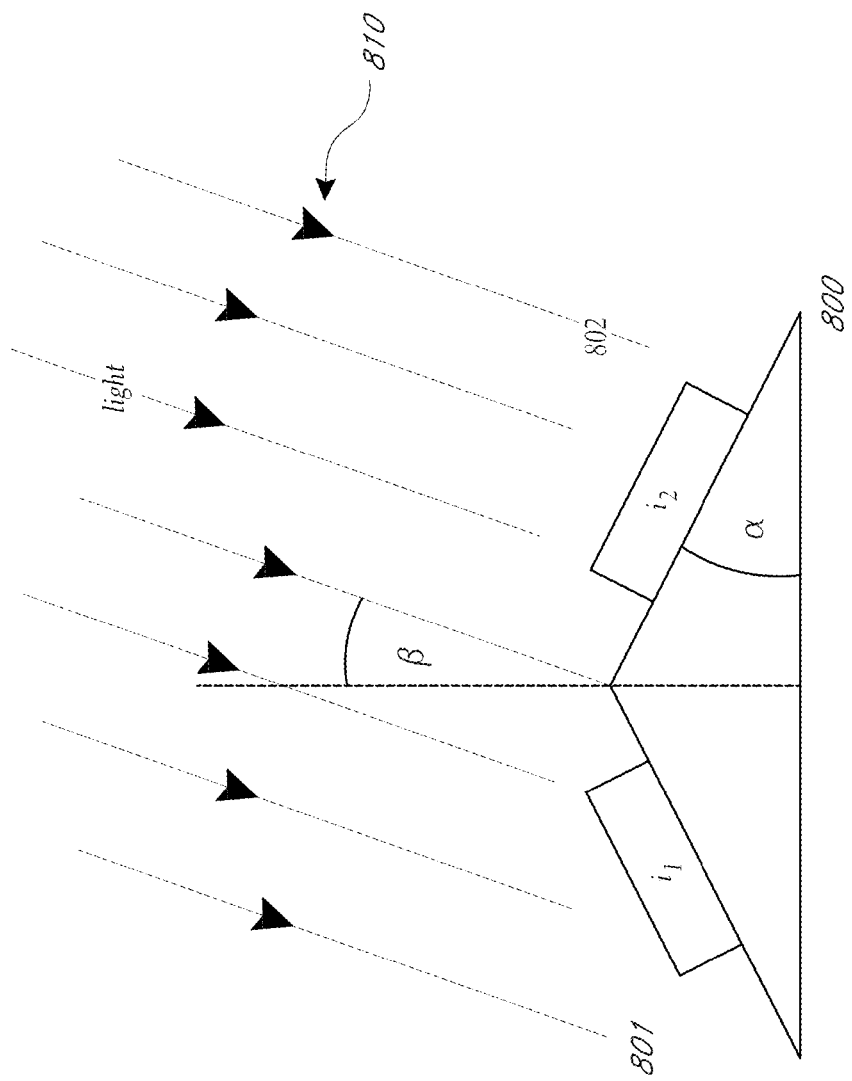
FIG. 8 is a cross-section of the sensor of FIG. 7.

FIG. 8 illustrates a representation 800 of the sensor 170 of FIG. 7, simplified for the purposes of clarity. Only the pair of photodiodes 710 measuring along the x axis is shown. Light from one of the spots 180 (it can be assumed to be spot 181 without any loss of generality) is directed at the sensor 170 as illustrated by light vectors 810. The x coordinate reported by the sensor 170 is proportional to the tangent of the elevation angle ($\beta$) to spot 181. This tangent of $\beta$ is measured through the two currents i1 and i2 of the opposing photodiodes 801 and 802, respectively. The angle $\alpha$ of the pyramid is a parameter that may vary among embodiments. Some embodiments may have an adjustable angle $\alpha$. The below assumes that $\alpha$ is greater than zero or that such an effect is simulated (e.g., through the use of apertures above the photodiodes which cast shadows and limit the exposure of the photodiodes to light from the spots.). Generally, the larger the angle $\alpha$ is, the larger the sensitivity of the sensor 170 to changes in location, but the smaller the field of view (e.g., the closer the sensor 170 must remain to the spots). While any effective angle $\alpha$ between 0 and 90 degrees may be used, it is preferably within the range of 15 to 75 degrees. Some embodiments may use, for example, 30, 45, or 60 degrees.

The coordinate $h_{x1}$ of spot 181 is equal to the tangent of $\beta$ and is measured by:

$$h_{x1} = \frac{i_1 - i_2}{i_1 + i_2} = \tan\beta\tan\alpha. \qquad \text{Eq. 4}$$

The rotational variability is modeled by an offset in $\beta$ that changes with the orientation of the sensor 170 such that Eq. 5 holds, where $\beta'$ is the angle to the ideal axis of rotation perpendicular to the ground plane and $\beta_\epsilon$ is the angular error that changes with rotation.

$$\beta = \beta' + \beta_\epsilon \qquad \text{Eq. 5}$$

Inserting Eq. 5 in Eq. 4 and applying the rule of the tangent of the sum of angles yields:

$$\frac{i_1 - i_2}{i_1 + i_2} = \tan(\beta' + \beta_\epsilon)\tan\alpha \qquad \text{Eq. 6}$$
$$= \frac{\tan\beta' + \tan\beta_\epsilon}{1 - \tan\beta'\tan\beta_\epsilon}\tan\alpha$$

Since $\beta_\epsilon$ is small, $\tan \beta_\epsilon$ is approximated by:

$$\tan\beta_\epsilon = \frac{\sin\beta_\epsilon}{\cos\beta_\epsilon} \approx \frac{\beta_\epsilon}{1} = \beta_\epsilon \qquad \text{Eq. 7}$$

Substituting Eq. 7 into Eq. 6 yields:

$$\frac{i_1 - i_2}{i_1 + i_2} \approx \frac{\tan\beta' + \beta_\epsilon}{1 - \beta_\epsilon\tan\beta'}\tan\alpha \qquad \text{Eq. 8}$$

For elevation angles $\beta'$ that are much less then 90°, $1-\beta_\epsilon \tan \beta'$ is approximated as 1, yielding Eq. 9, where $c_x$ is the rotational variance on the x axis depending on the orientation of the signal sensor 170.

$$\frac{i_1 - i_2}{i_1 + i_2} \approx \tan\beta'\tan\alpha + \beta_\epsilon\tan\alpha \qquad \text{Eq. 9}$$
$$= \tan\beta'\tan\alpha + c_x$$

For the y axis of the sensor 170 another bias term $c_y$ is derived in an analogous way. Together both parameters form the vector c of rotational variability.

$$c = \begin{pmatrix} c_x \\ c_y \end{pmatrix} \qquad \text{Eq. 10}$$

Since the direction $\beta$ to the spots 180 can be arbitrary, the parameters for rotational variability are substantially independent of where the spots 180 are located. All spots 180 may therefore share substantially the same parameters.

Similar and analogous results can be obtained for other signal sources and sensor types. Rotational variability is not limited to the illustrated embodiment. Other sensor(s) 170 that measures bearing-to-signal sources 180 can show similar effects when the vertical axis of the sensor 170 is slightly misaligned or the sensor 170 otherwise rotates around an axis different from the ideal one. For example, antennas for radio or other wireless communication can show slight changes in the received signal when they rotate. Thus, an optional useful model of the way the vector of signal values changes on rotation of the sensor 170 is a function that only depends on the orientation of signal sensor 170 and parameters describing the rotational variability of the signal sensor 170.

Figure 9:
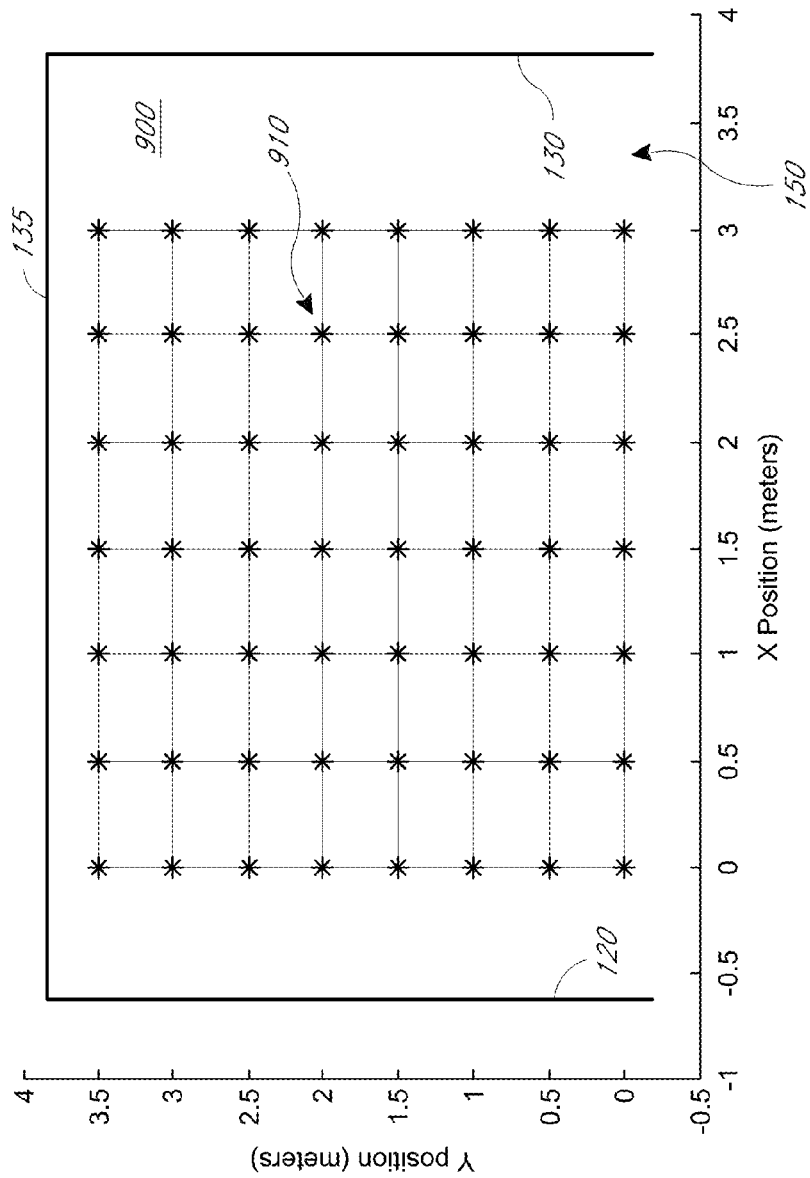
FIG. 9 illustrates a top-down perspective of an illustrative example operating environment with a grid of sensor measurement points.
Figure 10:
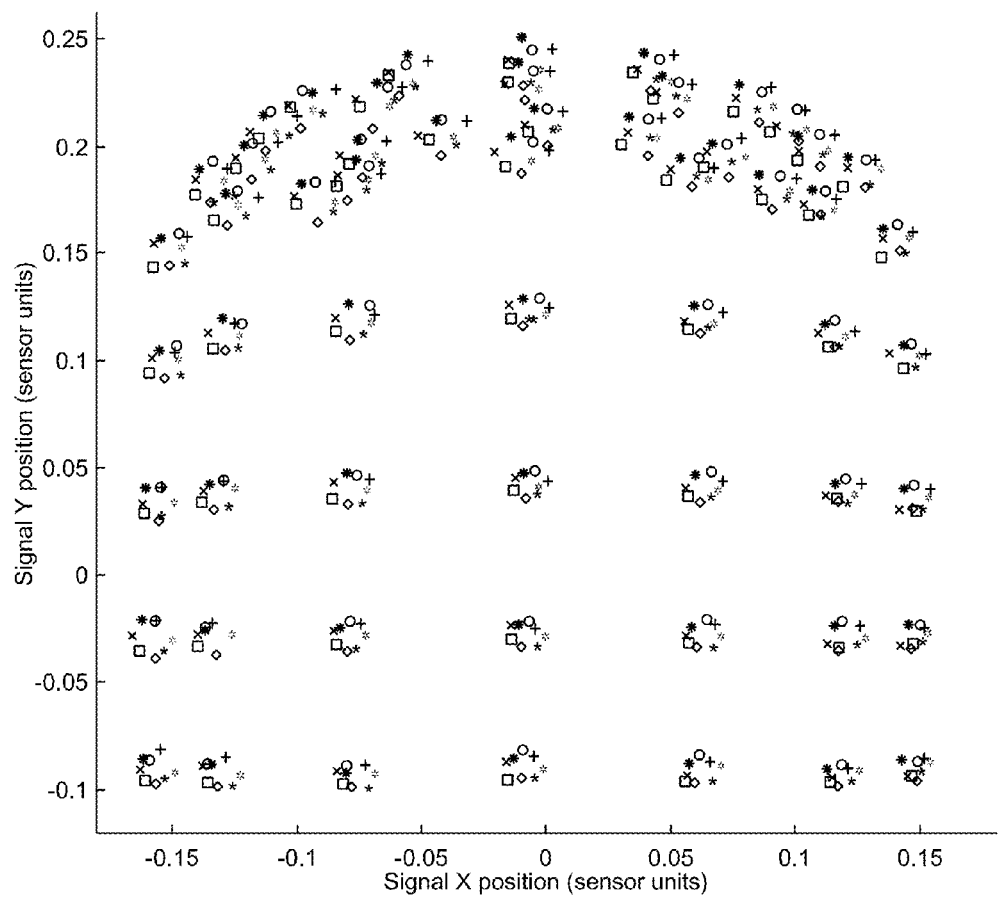
FIG. 10 illustrates an example of rotational variance of signal measurement as well as detected variation in the signal throughout the environment of FIG. 9.

FIGS. 9 and 10 illustrate rotational variability and non-linearity arising from multi-path signals. The two figures depict the environment of room 110 from a top down perspective. FIG. 9 shows a regular grid 900 consisting of 8×7 positions (every 50 cm in this example) on the floor 150. A system using spots 180 was deployed with an appropriately configured signal sensor 170. At a given location 910, sensor measurements were taken with eight different sensor orientations (every 45°).

The measurements were then rotated back and drawn in a common reference frame. FIG. 10 shows the resulting signal measurements using different symbols for the eight orientations. At a given location 910, the measurements form a ring which shows the rotational variability at this location. In this experiment the radius is almost constant over the entire room 110. The mean of rotational variability is about 0.0072 sensor units, which corresponds to an angular error of about $\beta_\epsilon = 0.72°$. The error caused by rotational variability can be constant (as in this example) but might also change over time or location, e.g., if the angular error $\beta_\epsilon$ is more significant or if there are other similarly variable sources of error, such as uneven floors or motion dependent device vibration, not modeled in Eq. 4 to Eq. 9.

Changes in the pitch or angle of the mobile device relative to the surface it is traversing can also cause or contribute to rotational variability. For example, uneven floors or ground such as might result from rolling terrain, general bumpiness, twigs or branches, brickwork, and the like can cause the pitch of the mobile device to change. In some embodiments, rotational variability due to change in pitch is monotonic, although it complements rotational variability due to manufacturing and other sources At least some rotational variability due to changes in pitch may be accounted for using the methods described herein. For example, changes in pitch of less than 3, 5, or 7 degrees (or other pitches) may be accommodated by some embodiments without modification to what is disclosed herein.

FIG. 9 also shows the effect of multi-path signals. In the illustrated scenario, the walls on the left 120, right 130, and front 135 cause signal reflections. While the left wall 120 and right wall 130 create some level of signal compression, the front wall 135 causes severe reflections that make the signal bend over. Even worse, in the corners of the room, the signal is reflected from two walls and therefore the resulting measurement is even more distorted.

Although there is significant signal distortion, it has been determined that the error is systematic and continuous. This allows modeling the nature of the signal using non-linear systems. An example embodiment approximates the non-linearity caused by multi-path through the use of piece-wise linear functions. This example technique is described below in greater detail. Other approximations, e.g., using Splines (piecewise polynomial (parametric) curves which may be used to approximate complex shapes using curve fitting) or Nurbs (non-uniform rational basis splines, which are mathematical models which may be used to generate and represent surfaces and curves) may also be used and may provide more accurate representations of the non-linear signal distortion. However, experimentation with certain embodiments has indicated that the use of bi-linear interpolation results in faster processes and produces sufficiently good results in embodiments that have limited computational resources. Embodiments with more computational resources or those with relaxed time constraints may beneficially use other representations, including Splines or Nurbs.

In some embodiments, localization of a mobile device 100 equipped with a signal sensor 170 is performed by learning the signal distribution in the environment 110 while at the same time (or at substantially the same time) localizing the mobile device 100. This is known as simultaneous localization and mapping (SLAM). As discussed above, in the following it is assumed that the pose of the mobile device 100 and the signal sensor 170 are substantially identical. In some embodiments they are not, and it is straightforward to add, for example, a fixed coordinate transformation between the two poses. However, assuming pose identity facilitates understanding of the various disclosed aspects.

In SLAM, a device moves through a time series of poses $x_0 \ldots x_T$, $x_t = (x, y, \theta) \in SE(2)$, in an environment (e.g. room 110) containing N map features $m_1 \ldots m_N$, $m_i \in \Re^M$. Here SE(2) is the space of poses in the 2 dimensional plane and $\Re^M$ the space of the map features. Without loss of generality, $x_0 = (0, 0, 0)^T$. At each time step $t=1 \ldots T$ the system receives a motion input $u_t$ (e.g., odometry from dead reckoning sensors 190) with covariance $R_t$ and a measurement $z_t$ (e.g., of signal strength from signal sensors 170) with covariance $Q_t$.

The motion input $u_t$ is measured, for example, by motion sensors 190 on the mobile device 100 and describes the change in pose of the sensor 170 from time step t−1 to t. As mentioned above, in certain embodiments the motion input may be provided by external sensors or a combination of internal and external sensors. The input vector $u_t$ is associated with a covariance $R_t$ that models the accuracy of the pose change. Typical motion sensors 190 include wheel encoders, gyroscopes, accelerometers, IMUs and other dead-reckoning systems. A motion model defined by a function g describes the motion of the device 100 since the previous time step where $e_u$ is a zero mean error with covariance $R_t$:

$$x_t = g(x_{t-1}, u_t) + e_u \qquad \text{Eq. 11}$$

An example of input $u_t$ is a forward translation d followed by a rotation α: $u_t = (d\ \alpha)^T$. Eq. 11 then resolves into the following form:

$$x_t = \begin{pmatrix} x \\ y \\ \theta \end{pmatrix} + \begin{pmatrix} d\cos\theta \\ d\sin\theta \\ \alpha \end{pmatrix} + e_u \qquad \text{Eq. 12}$$

For those skilled in the art it is straightforward to substitute different motion models g and input vectors $u_t$ depending on the geometry of the mobile device 100 and available motion sensors 190. The systems and methods disclosed herein apply regardless of the motion model.

When the signal sensor 170 on the mobile device 100 obtains a new reading $z_t$ of the wave signals, the SLAM system uses a sensor model to predict the observation. As in the case of motion, the sensor reading $z_t$ is associated with a covariance $Q_t$ modeling the accuracy of the measurement. The sensor model is defined by a function h that predicts an observation given the sensor 170 pose at time step t and map features as in Eq. 13, where $e_z$ is a zero mean error with covariance $Q_t$. The sensor model h depends on the map features and the available signal sensor 170 in the mobile device 100. In early SLAM applications such as those described in Thrun et al. [2005, Chapter 10], map features are landmarks and the sensor model h computes bearing and distance to them. The systems and methods disclosed herein optionally use a very different approach: some or all of the features are signal values at predetermined or fixed locations and, few or none of the features are landmarks in the environment. The expected values of wave signals at a given device 100 pose are computed by h as follows.

$$z_t = h(x_t, m_1 \ldots m_N) + e_z \qquad \text{Eq. 13}$$

In SLAM it is possible to include in the sensor model calibration parameters like those describing rotational variability of the sensor 170. The SLAM algorithm then not only estimates device pose and map features, but also estimates the calibration parameters. All calibration parameters are summarized in a vector c. The size of this vector depends on the sensor 170. For example, in an embodiment using the reflection from spots of modulated light created by a projector 160 as the signal sources 180, the calibration parameters include the two bias constants ($c_x$, $c_y$) in Eq. 10. The observation model in Eq. 13 then includes this parameter:

$$z_t = h(x_t, c, m_1 \ldots m_N) + e_z \qquad \text{Eq. 14}$$

Embodiments also learn the vector field generated by M signals over the environment. This vector field can mathematically be described as a function that maps a ground pose to a vector of M signal values.

$$VF : SE(2) \to \Re^M \qquad \text{Eq. 15}$$

Since signals are independent of sensor 170 orientation (per the preferences set forth above), the space of poses SE(2) can be decomposed into position and orientation. The vector field over position is then modeled as a piece-wise linear function by laying a regular grid of node positions $b_i = (b_{i,x}; b_{i,y})^T$, $i=1 \ldots N$ onto the ground 150 (or onto whatever surface the mobile device 100 is traversing). This creates rectangular cells with one node at each of the cell's four corners. Each node i holds a vector $m_i \in \Re^M$ describing the expected signal values when placing the sensor at $b_i$ and pointing at a pre-defined direction $\theta_0$. Returning to the running example of signal sources 180 being spots of modulated light, the vector $m_i$ holds four values—the coordinates of both spots 180: $m_i = (m_{i,x1}, m_{i,y1}, m_{i,x2}, m_{i,y2})^T$.

The spacing of cells in the regular grid defines the granularity and precision with which the wave-signal distribution in the environment 110 is modeled. A finer spacing leads to more cells, yielding better precision but requiring more memory. A coarser spacing results in fewer cells, requiring less memory but at the possible cost of precision. The exact parameter for the cell size depends on the environment, mobile device, and the application. For the purpose of covering an environment 110 with reasonable precision (e.g., for systematic floor cleaning), the cell size could be 0.5 m to 2 meters for a system using spots of frequency modulated light as signal sources 180 in an environment with a ceiling height of 2.5 to 5 meters.

Figure 11:
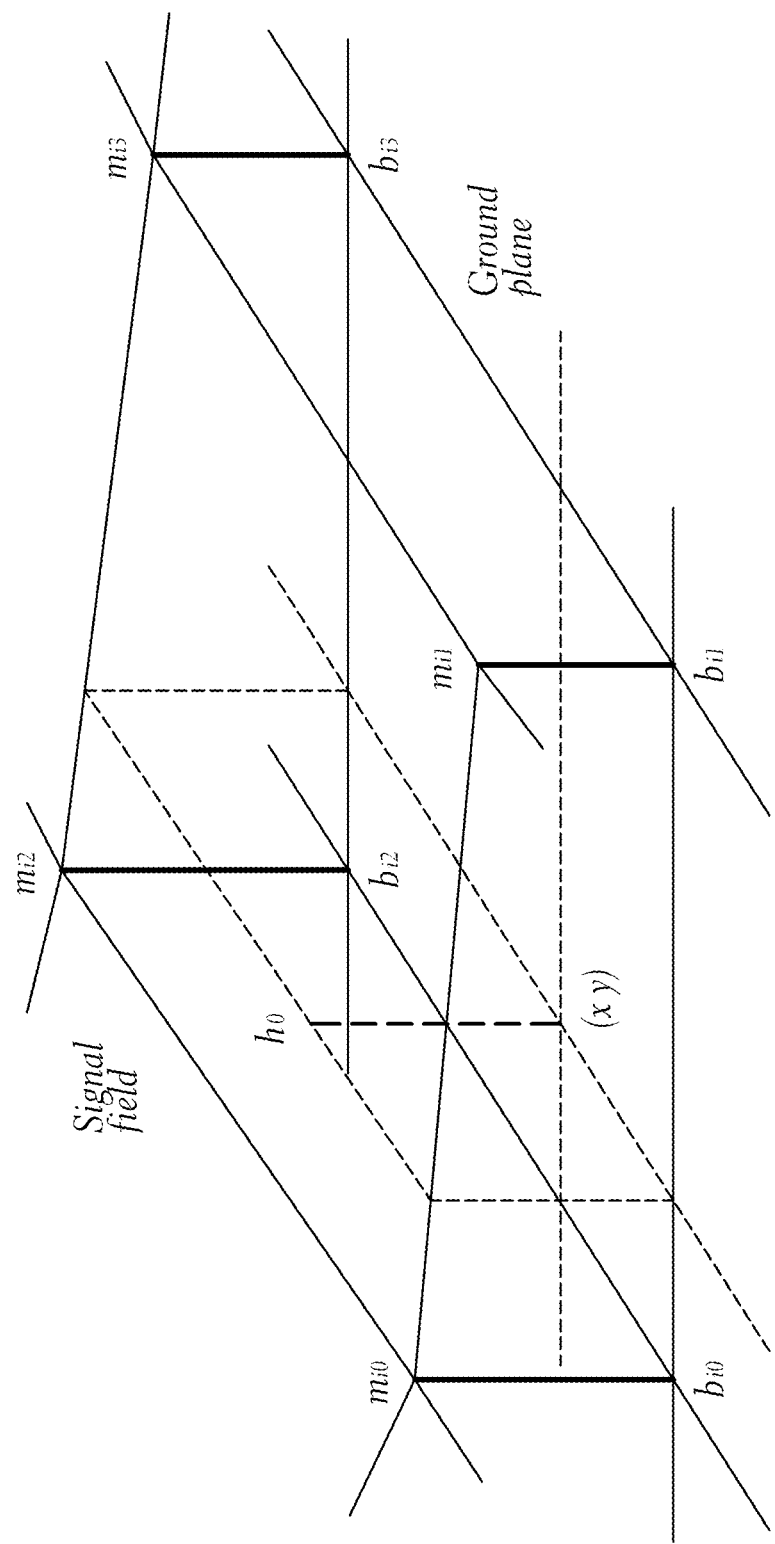
FIG. 11 illustrates bilinear interpolation used by some embodiments.

For an arbitrary sensor position with orientation $\theta_0$, the expected signal values are computed by bilinear interpolation from the nodes of a cell (e.g., the four nodes) containing the sensor position. Such a cell is illustrated in FIG. 11. The four nodes may be determined from the sensor position at time t and node positions $b_i$. "Current cell" refers to the cell in which the sensor is positioned at the current time step t. Let $x_t = (x, y, \theta)$ be the sensor pose and $b_{i0} \ldots b_{i3}$ the cell nodes enclosing the sensor 170 as shown in FIG. 11.

The expected signal values at (x, y) with orientation $\theta_0$ are then computed as Eq. 16, where $m_{i0}, m_{i1}, m_{i2}$ and $m_{i3}$ are the signal values at the four cell nodes and $w_0, w_1, w_2$ and $w_3$ are the weights of the bilinear interpolation computed as Eq. 17.

$$h_0(x, y, m_1 \ldots m_N) = w_0 m_{i0} + w_1 m_{i1} + w_2 m_{i2} + w_3 m_{i3} \qquad \text{Eq. 16}$$

$$w_0 = \frac{(b_{i1,x} - x)(b_{i2,y} - y)}{(b_{i1,x} - b_{i0,x})(b_{i2,y} - b_{i0,y})} \qquad \text{Eq. 17}$$

$$w_1 = \frac{(x - b_{i0,x})(b_{i2,y} - y)}{(b_{i1,x} - b_{i0,x})(b_{i2,y} - b_{i0,y})}$$

$$w_2 = \frac{(b_{i1,x} - x)(y - b_{i0,y})}{(b_{i1,x} - b_{i0,x})(b_{i2,y} - b_{i0,y})}$$

$$w_3 = \frac{(x - b_{i0,x})(y - b_{i0,y})}{(b_{i1,x} - b_{i0,x})(b_{i2,y} - b_{i0,y})}.$$

The final expected signal values are computed by taking into account sensor orientation $\theta$ and the parameters c describing the rotational variability of the sensor 170:

$$h(x_t, c, m_1 \ldots m_N) = h_R(h_0(x, y, m_1 \ldots m_N), \theta, c) \qquad \text{Eq. 18}$$

Here $h_R$ is a continuous function that transforms the interpolated signal values obtained through Eq. 16 by the sensor orientation and rotational variability. This is usually a rotation by orientation $\theta$ followed by a correction with the rotational variability c. In the running example, turning the sensor 170 in place causes the spot 181 coordinates to change according to the rotation angle $\theta$ but in the opposite direction. The rotational component $h_R$ therefore becomes Eq. 19, where ($h_{x1}, h_{y1}, h_{x2}, h_{y2}$) is the output vector of Eq. 16. It is also possible to formulate the equations for a variable number of spots 180 since the components in Eq. 16 to Eq. 19 are not correlated between spots 180. Similar equations can be readily obtained for other signal sources.

$$h_R(h_{x1}, h_{y1}, h_{x2}, h_{y2}, \theta, c_x, c_y) = \begin{pmatrix} \cos\theta & \sin\theta & 0 & 0 \\ -\sin\theta & \cos\theta & 0 & 0 \\ 0 & 0 & \cos\theta & \sin\theta \\ 0 & 0 & -\sin\theta & \cos\theta \end{pmatrix} \begin{pmatrix} h_{x1} \\ h_{y1} \\ h_{x2} \\ h_{y2} \end{pmatrix} + \begin{pmatrix} c_x \\ c_y \\ c_x \\ c_y \end{pmatrix} \qquad \text{Eq. 19}$$

It is possible to apply more complex schemes for predicting the sensor signal that use more than only the four nodes of the current cell. A cell with fewer nodes could also be used. In another embodiment, the function in Eq. 16 is evaluated for the current and several neighboring cells and then a weighted mean of them is computed as the final result. The weights are taken as the mass of probability of the current position estimate that falls into each cell. The weight of a given cell is a function of the probability that the sensor or mobile device is within this cell. This probability can be derived from the current mobile device pose and associated uncertainty as it is computed by the localization filter.

The above understandings and equations enable the application of a SLAM algorithm for estimating device path, rotational variability, and/or the signal values at the node positions. Optionally, full SLAM and/or on-line SLAM may be used.

In full SLAM, the complete trajectory of the device 100, rotational variability of the sensor 170, and/or some or all map features are computed. For example, the state that is estimated is:

$$Y = \begin{pmatrix} x_1 \\ \vdots \\ x_T \\ c \\ m_1 \\ \vdots \\ m_N \end{pmatrix}. \quad \text{Eq. 20}$$

One algorithm that computes an estimate of Y is GraphSLAM, which is used in some embodiments and is described in more detail below.

In contrast, on-line SLAM estimates the current pose and some or all map features at each time step t=1 . . . T. The state estimated at each time step t is:

$$y_t = \begin{pmatrix} x_t \\ c \\ m_1 \\ \vdots \\ m_N \end{pmatrix}. \quad \text{Eq. 21}$$

There are several algorithms that estimate $y_t$ over time. Examples using EKF-SLAM, EIF-SLAM and ESEIF-SLAM are described below. Embodiments may use any of the described full SLAM or on-line SLAM algorithms, as well as other algorithms. Some embodiments can be configured to use a particular SLAM algorithm depending on, for example, a user's preference, the computational resources available, and other operational constraints.

GraphSLAM is a non-linear optimization method for estimating the state vector in Eq. 20 by finding the values in Y that best explain the sensor and motion data from sensors 170 and 190. GraphSLAM estimates Y as the solution to a non-linear least squares problem in finding the minimum of the following objective function where the quantities are defined as described before:

$$J = \sum_{t=1}^{T} (x_t - g(x_{t-1}, u_t))^T R_t^{-1} (x_t - g(x_{t-1}, u_t)) + \quad \text{Eq. 22}$$

$$\sum_{t=1}^{T} (z_t - h(y_t))^T Q_t^{-1} (z_t - h(y_t))$$

Figure 12:
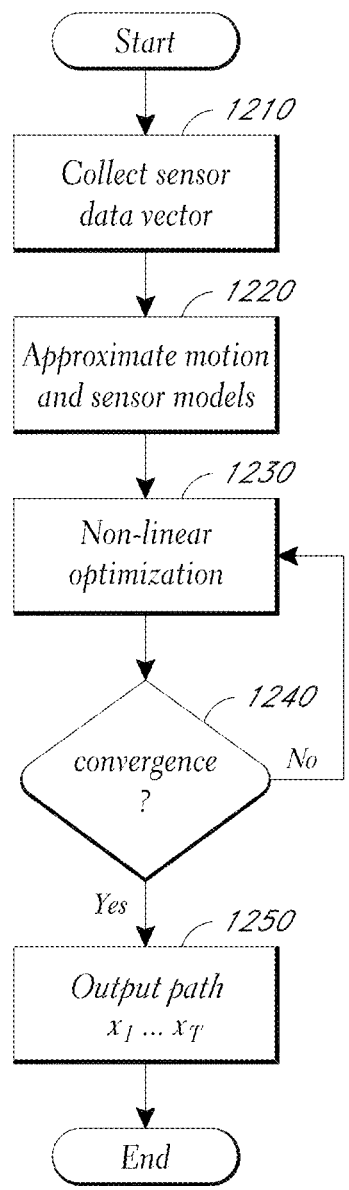
FIG. 12 is a flow chart illustrating an example use of GraphSLAM for localization.

An example implementation of GraphSLAM is illustrated in FIG. 12. One general approach is to first provide an initial estimate of the state vector Y at state 1210. This may be based on, for example, data from the dead reckoning sensors 190 or data from the signal sensors 170. Then the embodiment approximates motion model g(.) and sensor model h(.) by linear models using Taylor expansion at the current estimate of the state vector at state 1220. This results in a quadratic function of Eq. 22. The linear equation system that reduces or minimizes the quadratic function obtained in state 1220 is solved or optimized at state 1230. This provides an improved estimate of Y. The second and third states are repeated until the solution converges to a desired degree at state 1240. If sufficient convergence is not obtained, then optimization state 1230 is repeated. If it is obtained, then at state 1250 a path is output.

The linear equation system may optionally be solved during optimization state 1230 using Conjugate Gradient, since the system is usually sparse and positive definite.

For providing an initial estimate of the state vector in state 1210, the following method can be used. First, the initial device poses $x_1 \ldots x_T$ are computed from $x_0 = (0, 0, 0)^T$ by iteratively applying the motion model in Eq. 11 for each t=1 . . . T. Second, the initial rotational variability is $c=\hat{c}$ where $\hat{c}$ is a rough guess about the values of rotational variability that depend on the sensor 170. In the running example, some embodiments use $\hat{c}=(0, 0)^T$ because the rotational variability is usually small. The initial node values $m_i$ are computed from Eq. 1 and Eq. 2. For example, the parameters in Eq. 1 are computed by applying RANSAC over a short initial sequence, as discussed above. The node values $m_i$ are then obtained from the node position $b_i$ through Eq. 2.

The short initial sequence typically contains a minimum or relatively low number of sensor samples (e.g., 2 to 50) while the mobile device 100 moves a certain distance. This distance is usually proportional to the chosen cell size such that enough samples are available that cover a reasonable fraction of the cell. For example, for a cell size of 1 meter, the distance threshold may be selected within the range of 0.5 m to 1 meter. More generally, some embodiments may be configured to travel a distance of ⅓ to ⅔ of the cell size. This distance may also depend on the size of the mobile device 100: typically, larger mobile devices should travel further during the initialization phase. Optionally, a given sample is spaced a minimum distance from an adjacent sample. This distance may be determined based on a dynamically configured initialization travel distance and sample count, for example. It may also be fixed a priori so that samples are taken after every half second of travel or after every 10 centimeters of travel, for example, although other time periods and distances may be used.

GraphSLAM may be implemented as a batch method since the motion and sensor data needs to be available when computing the non-linear optimization. Furthermore, the amount of computation is significant. These constraints may make it difficult to use GraphSLAM in certain embedded systems with limited computational resources, such as if the mobile device 100 is a conventional vacuum cleaner or other consumer product. GraphSLAM is nevertheless useful as a baseline algorithm for computing the best possible result given the sensor data and a chosen model. For example, it can be used during the development of products or selectively run when computational resources are available to check the performance of other methods. Further, there are certain embodiments of product mobile devices where there are sufficient computational and memory resources to utilize GraphSLAM.

One such method for state estimation used by some embodiments is an Extended Kalman Filter (EKF). The EKF is a non-linear variant of the Kalman Filter (KF). EKF-SLAM is an on-line SLAM method. The state vector contains the current pose of the device 100 but not older or future poses (or estimates thereof). Furthermore, the size of the state grows as the mobile device 100 moves in the environment 110. Initially the state contains only device pose, rotational variability and the node estimates of the 4 nodes of the initial cell.

$$y_0 = \begin{pmatrix} x_0 \\ c \\ m_1 \\ m_2 \\ m_3 \\ m_4 \end{pmatrix} \qquad \text{Eq. 23}$$

As the mobile device 100 moves around and visits further cells, the system grows by augmenting the state vector with further nodes. After t time steps and visiting cells with a total of n nodes the state becomes:

$$y_t = \begin{pmatrix} x_t \\ c \\ m_1 \\ \vdots \\ m_n \end{pmatrix} \qquad \text{Eq. 24}$$

The EKF computes an estimate of this state by maintaining mean and covariance modeling a Gaussian distribution over the state.

$$y \sim N(\mu, \Sigma) \qquad \text{Eq. 25}$$

The initial mean is set to Eq. 26, where $\hat{c}$ is a rough guess/estimate of the rotational variability of the sensor 170 and $\hat{m}_1 \ldots \hat{m}_4$ are initial values of the four nodes obtained from sensor data of a short initial sequence as described before using Eq. 1 and Eq. 2. Again, in a sample embodiment using spots 180, the initial rotational variability can be set to $\hat{c} = (0, 0)^T$.

$$\mu_0 = \begin{pmatrix} x_0 \\ \hat{c} \\ \hat{m}_1 \\ \hat{m}_2 \\ \hat{m}_3 \\ \hat{m}_4 \end{pmatrix} \qquad \text{Eq. 26}$$

The initial covariance is a diagonal matrix where the vehicle uncertainty is set to 0 and the uncertainties of rotational variability and the four initial nodes are infinite. For implementation on a computer, $\infty$ can be replaced by a large number.

$$\Sigma_0 = \begin{pmatrix} 0 & \ldots & \ldots & \ldots & \ldots & \ldots & 0 \\ \vdots & 0 & \ldots & \ldots & \ldots & \ldots & 0 \\ \vdots & \vdots & 0 & \ldots & \ldots & \ldots & 0 \\ \vdots & \vdots & \vdots & \infty & 0 & \ldots & 0 \\ \vdots & \vdots & \vdots & 0 & \ddots & \ddots & \vdots \\ \vdots & \vdots & \vdots & \vdots & \ddots & \ddots & 0 \\ 0 & 0 & 0 & 0 & \ldots & 0 & \infty \end{pmatrix} \qquad \text{Eq. 27}$$

On object motion $u_t$ with covariance $R_t$, EKF-SLAM updates the state as Eq. 28 and Eq. 29, where f extends the motion model g over all state variables and $F_y$ is its Jacobian with respect to state per Eq. 30 to Eq. 31.

$$\bar{\mu}_t = f(\mu_{t-1}, u_t) \qquad \text{Eq. 28}$$

$$\sum_t = F_y \sum_{t-1} F_y^T + R_t \qquad \text{Eq. 29}$$

$$f(y_{t-1}, u_t) = \begin{pmatrix} g(x_{t-1}, u_t) \\ c \\ m_1 \\ \vdots \\ m_N \end{pmatrix} \qquad \text{Eq. 30}$$

$$F_y = \frac{\partial f}{\partial y}(\mu_{t-1}, u_t) \qquad \text{Eq. 31}$$

When a new sensor observation $z_t$ with covariance $Q_t$ is taken, the system determines the current cell, i.e. the cell in which the mean estimate of current device pose $\hat{x}_t$ falls, and then updates the mean and covariance of the state.

In general the current cell at time t can be:
1. A cell where all four nodes are already part of the state vector.
2. A cell where at least one node but not all four nodes are part of the state vector.
3. A cell where none of the four nodes are in the state vector.

In the first case no changes are required to the state vector and the system can continue updating mean and covariance as described further below.

In the second and third cases, nodes not yet present in the state vector need to be added by augmenting the state with the new nodes. In general, adding a node to the state vector containing n nodes is achieved by Eq. 32 and Eq. 33, where $\hat{m}_{n+1}$ and $M_{n+1}$ are the mean and covariance of the new node. This mean and covariance can be computed from nodes already contained in the state vector by linear extrapolation per Eq. 34 and Eq. 35, where $A_i$, $i=1 \ldots n$ are matrices weighting the contribution of each node in the extrapolation, M is the covariance over all nodes, and S is additional noise for inflating the new covariance to allow the new node to vary for accommodating the non-linear structure of the wave signal. In some embodiments and in certain scenarios, the vector field changes slowly over space (i.e., the signal is relatively constant). Thus, in such embodiments, change between adjacent nodes is limited and extrapolation might degenerate into a linear model. Some embodiments use a smaller S in introduced in such circumstances, and some embodiments use introduced a larger S if the vector field is known or predicted to change more rapidly over space.

$$\bar{\mu}_t \leftarrow \begin{pmatrix} (\bar{\mu}_t) \\ \hat{m}_{n+1} \end{pmatrix} \qquad \text{Eq. 32}$$

$$\sum_t \leftarrow \begin{pmatrix} \overline{\sum_t} & 0 \\ 0 & M_{n+1} \end{pmatrix} \qquad \text{Eq. 33}$$

$$\hat{m}_{n+1} = \sum_{i=1}^{n} A_i \hat{m}_i \qquad \text{Eq. 34}$$

$$M_n = (A_1 \ldots A_n) M \begin{pmatrix} A_1 \\ \vdots \\ A_n \end{pmatrix} + S \qquad \text{Eq. 35}$$

Figure 13:
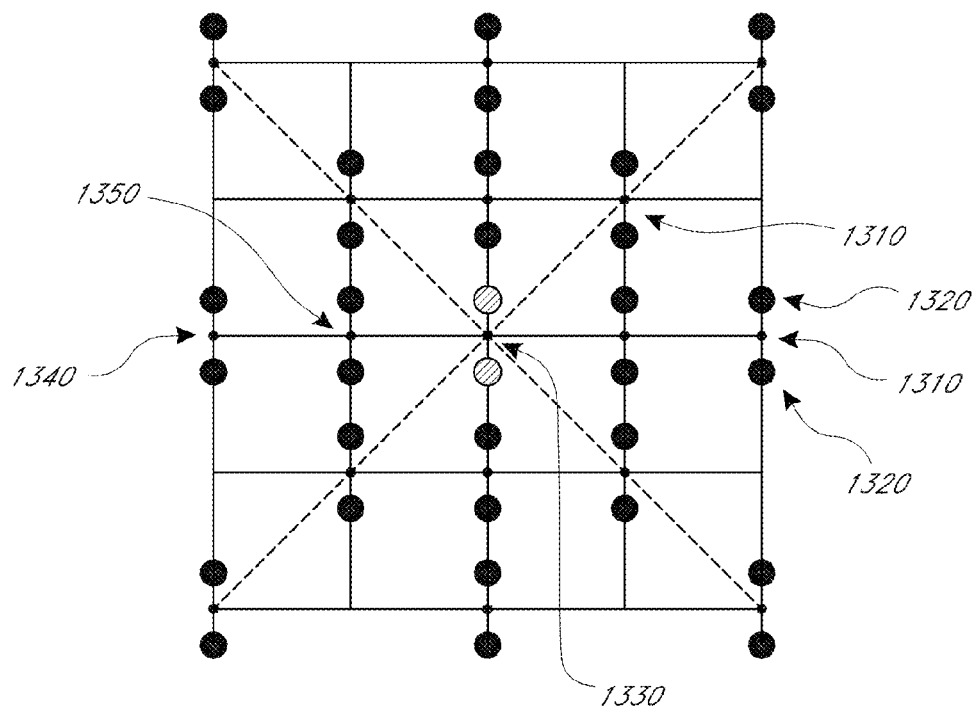
FIG. 13 illustrates an example 8-neighborhood of a node.
Figure 14:
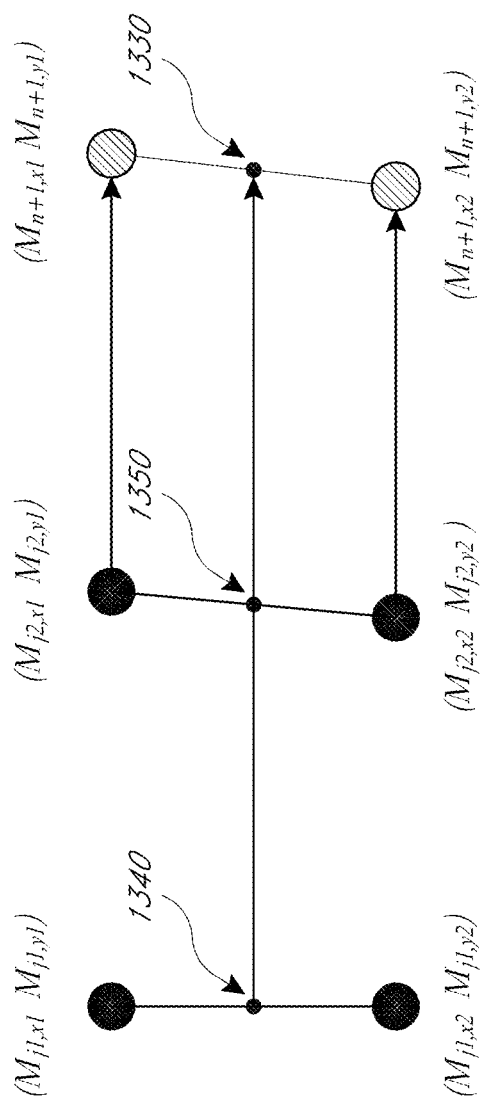
FIG. 14 illustrates an example extrapolation of localization values for a new node from a neighboring pair of nodes.

The initialization of a new node is graphically illustrated in FIGS. 13 and 14. In an embodiment, a new node 1330 is initialized by taking into account the 8-neighborhood directions around the new node 1330, as illustrated in FIG. 13. As shown in FIG. 14, for each of the eight directions, the two neighbors on the straight line from the new node 1330 are used to extrapolate the mean and covariance of the new node. For any such pair the new node can be computed as shown in FIG. 14. The mean and covariance are computed from node $j_1$ 1340 and $j_2$ 1350 only. Both nodes contain the mean estimates of both sensor spots. The corresponding contribution matrices are:

$$A_{j1} = -\frac{1}{2}\begin{pmatrix} 1 & 0 & 1 & 0 \\ 0 & 1 & 0 & 1 \\ 1 & 0 & 1 & 0 \\ 0 & 1 & 0 & 1 \end{pmatrix} \qquad \text{Eq. 36}$$

$$A_{j2} = \frac{1}{2}\begin{pmatrix} 3 & 0 & 1 & 0 \\ 0 & 3 & 0 & 1 \\ 1 & 0 & 3 & 0 \\ 0 & 1 & 0 & 3 \end{pmatrix}$$

The extrapolation is such that the mid point between the spots 180 is used for extrapolation. The orientation of the line between the two new spot estimates is taken over from the closer one. This has the effect that changes in orientation are not propagated when initializing new nodes.

Some embodiments optionally only consider cases where a new node can be initialized from a pair of the 8 directions. In case there are several possible candidates, an embodiment may chose the one with the smallest resulting covariance M. For comparing covariances, the matrix determinant, the trace of the matrix, its Frobenius norm, or other norms can be used.

If there are no neighbors for initialization, some embodiments discard the sensor observation. Such a situation may occur, for example, when the mobile device 100 travels over a full cell without any sensor 170 observations and then arrives in a cell where all four cells are not yet part of the state vector (scenario 3, above). In this scenario, the utility of the new observation for localization may be minimal. Nonetheless, some embodiments may still initialize a new node by linear combinations of other nodes in the state vector using Eq. 34 and Eq. 35. Some embodiments may optionally only use the motion updates (e.g., the odometry from the dead reckoning sensors 190) of the mobile device 100 and wait until the device 100 returns to an existing cell or to a cell that can be initialized. Another approach is to start over and re-initialize the system from the current pose.

Once the state vector contains elements for all nodes of the current cell, the mean and covariance are updated with the measurement $z_t$ and its covariance $Q_t$ by application of the EKF equations per Eq. 37 to Eq. 40 where $h(y_t)$ is the sensor model defined in Eq. 18, $H_y$ the Jacobian of the sensor model and K the Kalman gain.

$$\mu_t = \bar{\mu}_t + K(z_t - h(\bar{\mu}_t)) \qquad \text{Eq. 37}$$

$$\sum_t = (I - KH_y)\overline{\sum}_t \qquad \text{Eq. 38}$$

$$H_y = \frac{\partial}{\partial y}h(\bar{\mu}_t) \qquad \text{Eq. 39}$$

$$K = \sum_t H_y^T \left(H_y \sum_t H_y^T + Q_t\right)^{-1} \qquad \text{Eq. 40}$$

Figure 15:
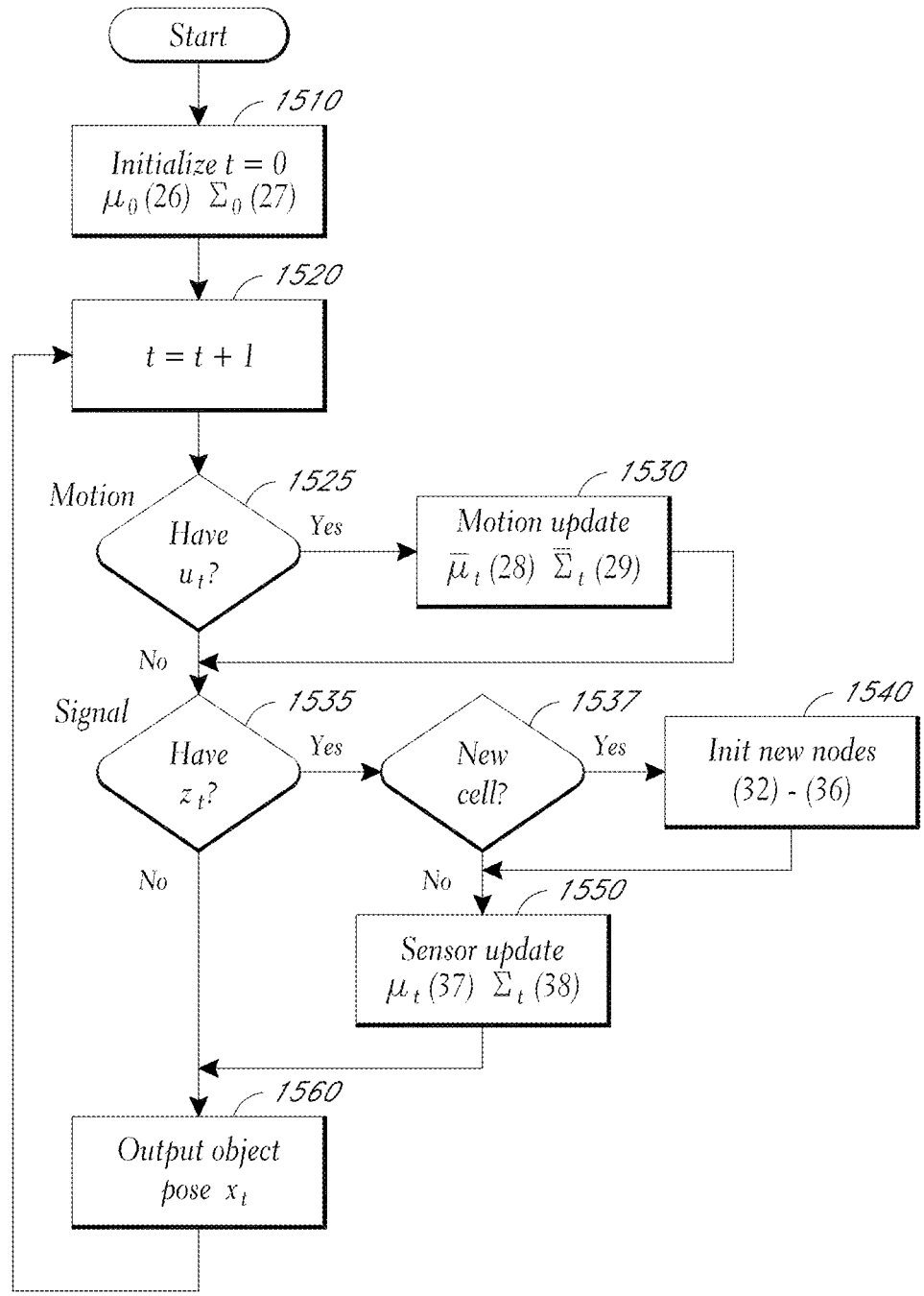
FIG. 15 is a flow chart illustrating an example use of EKF SLAM for localization.

A flow chart of the EKF-SLAM method for object localization is shown in FIG. 15. At state 1510, the initial parameters are set per Eq. 26 and Eq. 27. At the next time interval, if there is a motion update such as from the dead reckoning sensors 190 then it is applied at state 1530 per Eq. 28 and Eq. 29. If there is a value from the signal sensor 170, and if a new cell is needed, it is initialized at state 1540 per Eq. 32 to Eq. 36. After it is initialized, or if no new cell was needed, then a sensor update is performed at state 1550 per Eq. 37 and Eq. 38. After any necessary updates, a new pose is output at state 1560 and the process continues with the next time period.

In general, EKF-SLAM has the advantage that it is an on-line method, integrating motion/odometry and signal sensor measurements as they appear. The most computationally expensive operation is the update of the covariance matrix on sensor update in Eq. 38, state 1550. This involves the update of large numbers (e.g., all) of the matrix elements, an operation that takes time quadratic in the number of nodes in the state.

In general, the covariance $\Sigma_t$ is fully correlated. That is, there are few, if any, elements that are zero. This typically requires holding the full matrix in a data memory, which may limit the applicability of the method for embedded systems or other environments if there are overly limited memory resources.

An additional step in the EKF as well as in other filters is outlier rejection. In the case where measurements are received that seem implausible, the filter rejects these measurements. This may be accomplished by not updating the filter on such measurements, which may be the result of hardware errors, signal interference, or irregular timing problems, for example.

There are several options for detecting such outliers. For example, the sensor measurement itself can be examined for valid data. By way of illustration, a threshold on the absolute magnitude of the signal strength reported by a sensor if the range of allowable magnitudes for the signal being detected is known. If the measurement falls below or above this threshold it is rejected.

Another way to detect outliers is by comparing the received measurement $z_t$ with the expected one $h(\bar{\mu}_t)$. If the difference (e.g., as reported by means of the Mahanalobis distance, which is based on correlations between variables via which different patterns can be identified and analyzed) is too large, the measurement is rejected.

Another approach used by some embodiments for state estimation is an Extended Information Filter (EIF). The EIF is similar to the Extended Kalman Filter in that it models a Gaussian distribution over the state space and processes motion and signal sensor data on-line. Its parameterization, often called a dual representation, differs from that used by EKF. The parameterization consists of an information vector $T_t$ and an information matrix $\Lambda_t$ that are related to the mean $\mu_t$ and covariance $\Sigma_t$ of the EKF in the following way:

$$\eta_t = \Sigma_t^{-1} \mu_t$$

$$\Lambda_t = \Sigma_t^{-1} \qquad \text{Eq. 41}$$

The EIF-SLAM algorithm processes data from the motion sensors 190 and signal sensors 170 in the same way as EKF-SLAM described above. The computation of information vector and information matrix on object motion and sensor measurement can be derived from Eq. 26 to Eq. 40 by inserting Eq. 41 and simplifying the resulting equations.

In general a direct application of the EIF-SLAM algorithm does not provide a greater advantage than EKF-SLAM. Under some approximations, however, it is possible to keep the information matrix sparse, i.e. many elements are zero, allowing for a more compact storage and more efficient updates in terms of time and computational resources.

EIF-SLAM has the property that when inserting a signal sensor 170 measurement, only those elements in the state the measurement depends on need to be updated in the information matrix. For Vector Field SLAM this means that only elements related with the device 100's object pose and rotational variability and with the four nodes of the current cell are updated. All other elements in the information matrix stay unchanged. Therefore, the update on signal sensor 170 information turns only few elements from zero into non-zero and generally preserves the sparsity of the information matrix.

However, the update on device motion (e.g., when new data from the motion sensors 190 is received) causes a full update of the whole information matrix in the general case. This causes the information matrix to become non-zero in most if not all elements, which may destroy any sparsity that was present before the motion update.

Some embodiments may use strategies for approximating the update of the information matrix on device motion that preserve the sparsity of the information matrix. Two such methods are the Sparse Extended Information Filter (SEIF) and the Exactly Sparse Extended Information Filter (ES-EIF).

Yet another approach available to some embodiments for state estimation is ESEIF. The principle of the ESEIF algorithm is maintaining a set of "active features". In the original context, "features" refer to landmarks. In the case of Vector Field SLAM, the features are the nodes. The active features are a subset of all features. Typically those features that are currently observed by the mobile device 100 are the active ones. Other features are called "passive".

Only the active features contain cross-information between the pose of the device 100 and the feature (where the cross-information between device pose and feature is non-zero for active features, whereas for passive features this cross-information is zero). A feature can change its state from passive to active at any time without the need of special operations. The cross-information between device pose and feature starts as zero and becomes non-zero when updating the system on device motion.

Changing an active feature to a passive one requires computationally non-trivial operations that approximate the actual information matrix by a sparsification. ESEIF-SLAM conceptually integrates out the device pose and then re-localizes the device 100 using observations from only those features (nodes) that should stay or become active. By integrating out the device pose, the state becomes free of the pose. Any uncertainty in the device pose is moved into the feature estimates through the cross-information between device pose and feature. When re-localizing the device 100, only the features used in the signal sensor 170 observation then establish non-zero cross information. This way the sparseness of the information matrix is preserved.

Figure 16:
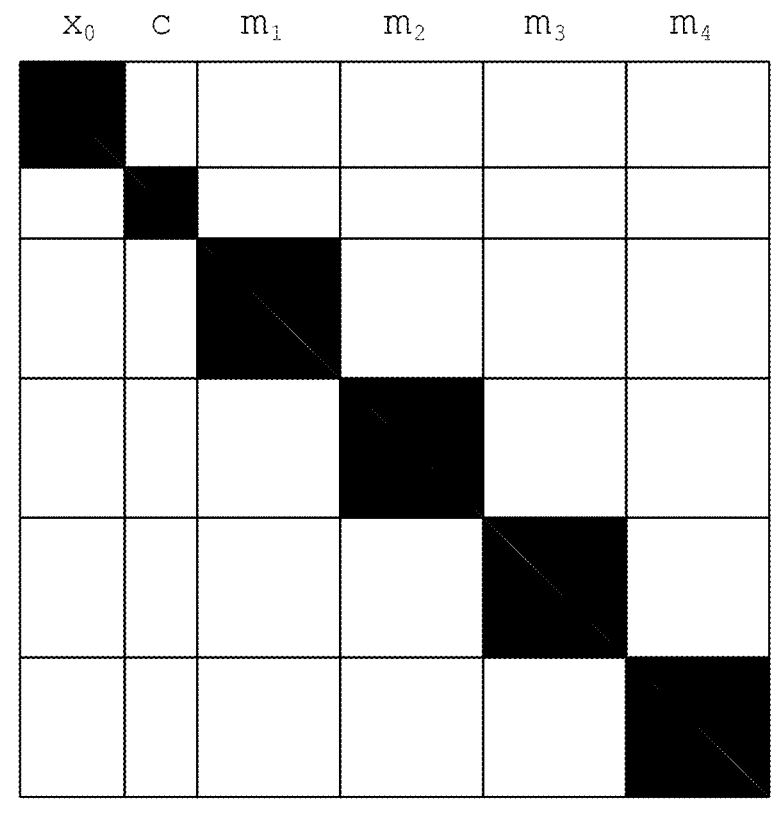

The following describes an implementation of the ESEIF algorithm in the context of Vector Field SLAM. FIGS. 16-22 show information matrices supporting this description. Initially the system starts with 4 nodes, as in Eq. 23. The corresponding information matrix is shown in FIG. 16. Only the diagonal blocks in the information matrix contain information and are non-zero, as indicated by black solid squares. All other entries are zero (shown as white). The diagonal blocks refer to the device pose $x_t$, the rotational variability $c$ and the initial 4 nodes $m_1 \ldots m_4$.

Figure 17:
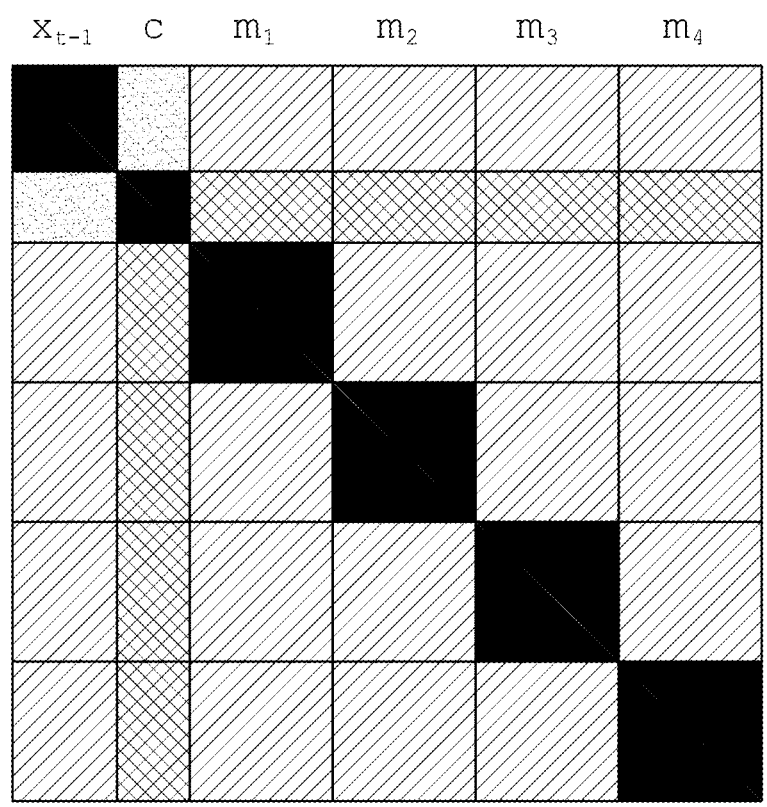

In an example embodiment, as long as the object stays within this initial cell, the system updates the complete information matrix using all 4 nodes as active features. Eventually the matrix becomes fully dense (most if not all elements become non-zero), as illustrated in FIG. 17.

Figure 18:
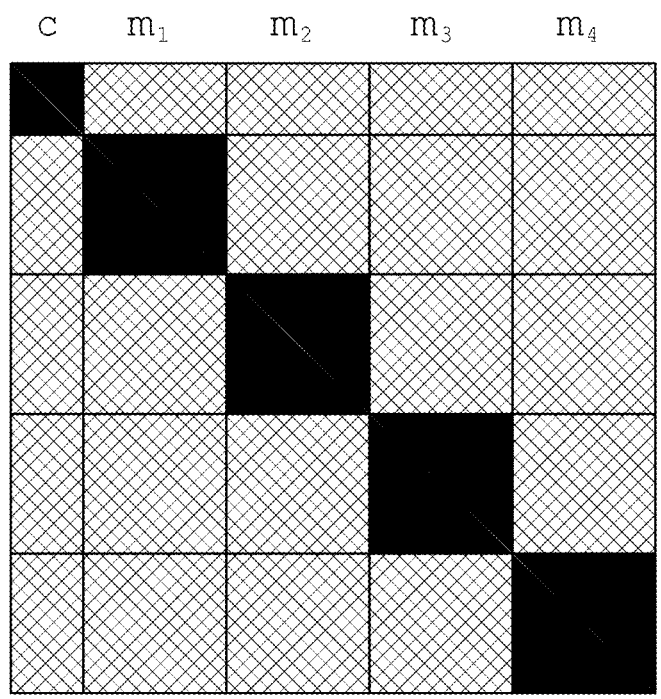

When the mobile device 100 moves out of the current cell and enters a different cell, the procedure of integrating out the device pose, initializing new nodes, and re-localizing the device takes place. First, the uncertainty of the device pose is integrated out. This moves information from the object pose into the rotational variability and the 4 nodes through their cross information. The result is an information matrix as shown in FIG. 18, which usually contains stronger information between nodes than before and lacks a device pose.

Figure 19:
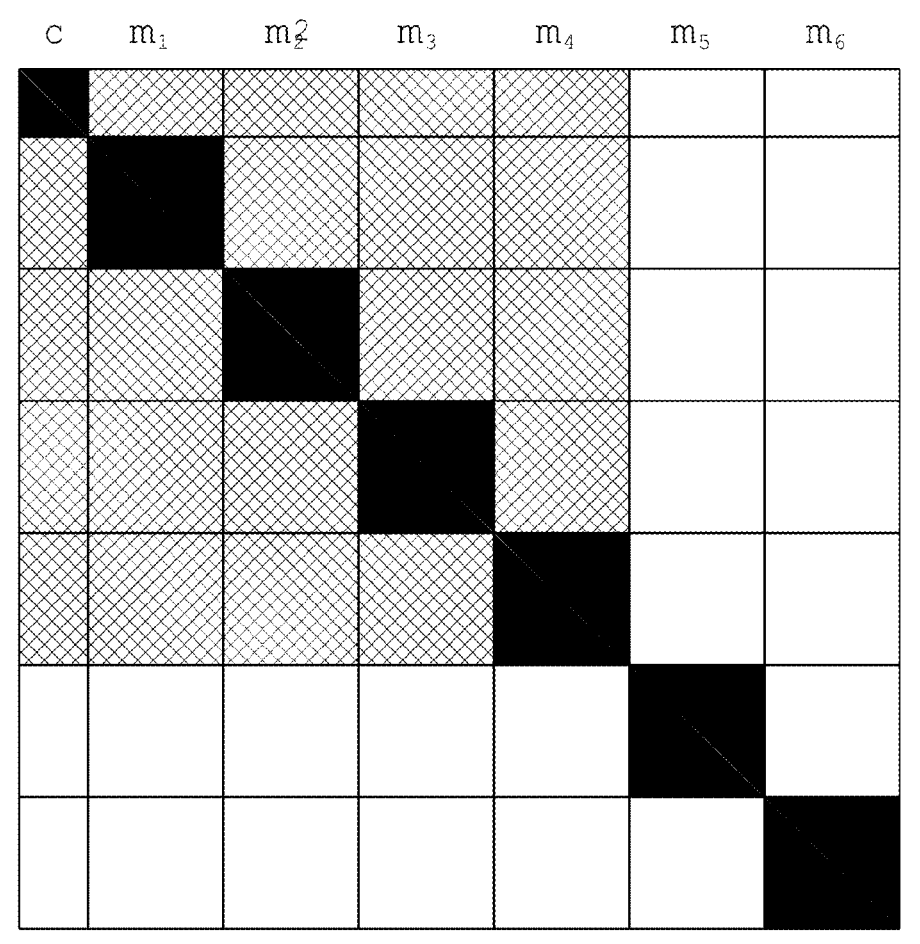

Next, new nodes are initialized and added to the state. For example, two new nodes $m_5$ and $m_6$ may be added as shown in FIG. 19. This indicates that the device 100 moved into a neighboring cell sharing nodes $m_3$ and $m_4$ with the initial one. The processing necessary for the addition of these nodes is described below. Note that the description also applies for other situations where 1, 3, or 4 new nodes need to be added, or, in embodiments that use cells with greater than four nodes, more than four new nodes need to be added.

The initial values for the information vector and matrix are obtained similarly to Eq. 32 to Eq. 36, but in the information form as set out in Eq. 41. The new information matrix then becomes the one as shown in FIG. 19. Note that there is no cross information between the new nodes and other entries in the state.

The pose of the device 100 is then reintroduced. In the original ESEIF algorithm, an object is localized through observations of active features. In this application of Vector Field SLAM algorithm this is performed in two steps. First, the state is augmented with the new device pose as shown in FIG. 19.

The entries for the new device pose in information vector and matrix are computed using Eq. 41 and the following mean and covariance per Eq. 42 and Eq. 43, where $R_0$ is a parameter that increases the uncertainty of the new device pose. Thus, the new device pose stays unchanged but becomes less certain. At this time there are no active nodes since all cross information between device pose and nodes are zero. Any four nodes can be chosen as the next active set of features. Since the device 100 is in the cell defined by nodes $m_3 \ldots m_6$, those nodes are chosen as the next set of active features.

$$\mu_t = \mu_{t-1} \qquad \text{Eq. 42}$$

$$\Sigma_t = \Sigma_{t-1} + R_0 \qquad \text{Eq. 43}$$

Figure 21:
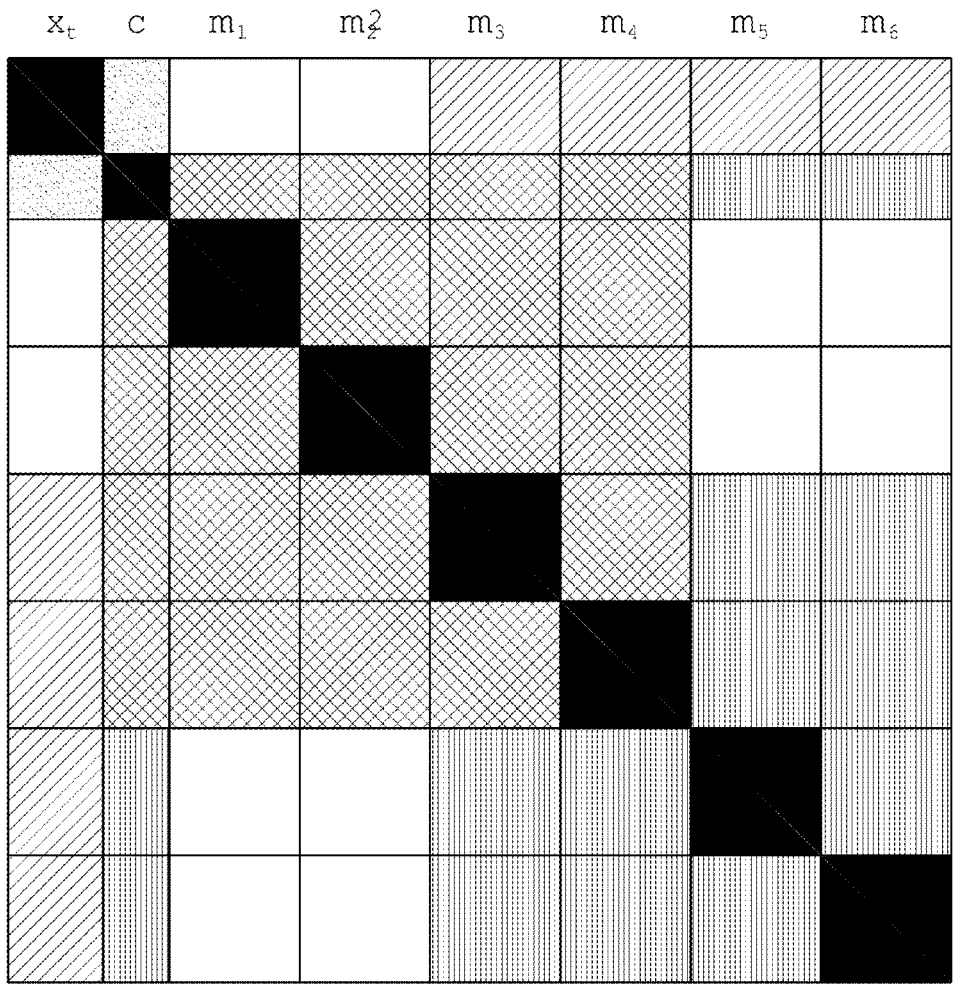

On signal sensor measurement $z_t$, the uncertainty of the device pose is reduced and elements related to rotational variability and the four active nodes $m_3 \ldots m_6$ are updated. This creates new cross-information between device pose, rotational variability, and active nodes as shown in FIG. 21. Note that there is no cross information between nodes $m_1$, $m_2$ and nodes $m_6$, $m_6$. This shows how the information matrix stays sparse.

As the device 100 moves within the current cell, in this example embodiment optionally only the device pose, rotational variability, and active cells $m_3 \ldots m_6$ are updated, as was noted during the discussion of the initial situation. When the device 100 moves into another cell, the state is extended and the information vector and matrix are augmented with new nodes as described above. If the new cell has been visited before, no new nodes need to be added to the state. In either case, the same procedure of integrating out device pose followed by re-localization takes place.

Figure 22:
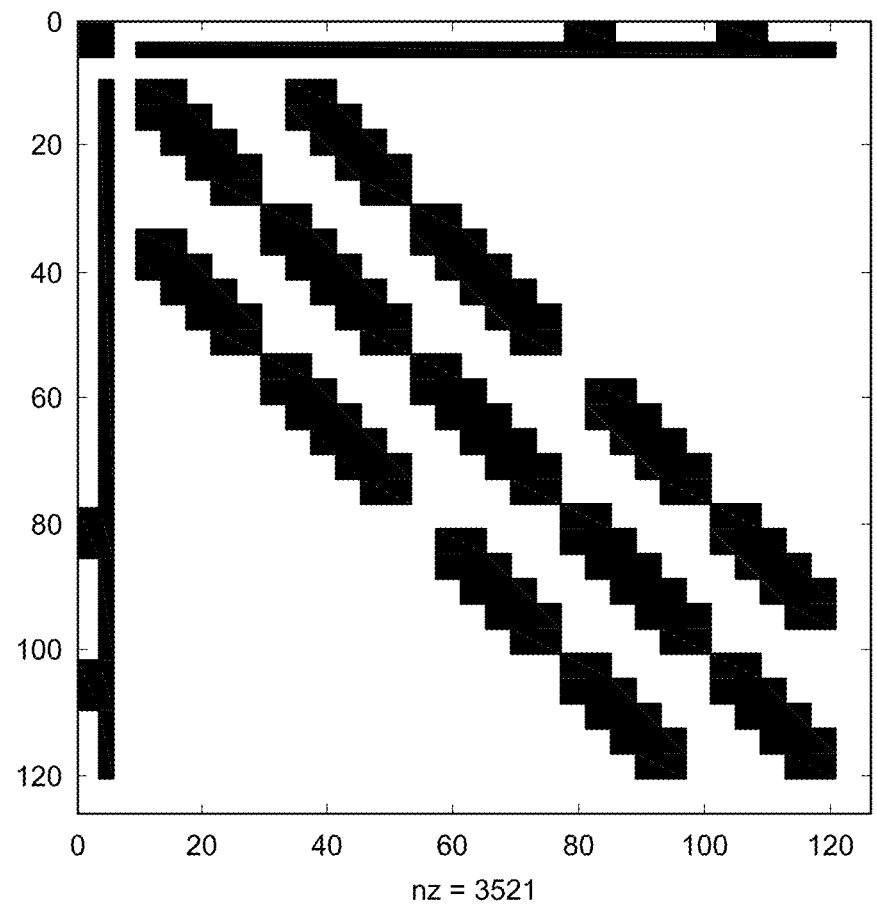

FIG. 22 shows the information matrix after a longer run of the system configured as described. The state contains a total of 29 nodes. The device pose $(x, y, \theta)^T$ consists of three variables, rotational variability $(c_x, c_y)^T$ consists of two variables, and each node $(m_{i,x1} m_{i,y1}, m_{i,x2}, m_{i,y2})^T$ consists of four variables. This leads to a total of $3+2+4*29=121$ variables. Non-zero information is indicated by solid blocks whereas white areas are zero information. The device pose contains cross information to the currently active nodes only (around rows 80 and 110). On the other hand, rotational variability contains cross information to all nodes. The nodes themselves have cross-information to spatially neighboring cells, which are at most eight neighbors per node. Overall the matrix is significantly sparse. From the $121 \times 121 = 14641$ entries in the information matrix, only 3521 or approximately 24% are non-zero. Furthermore since the matrix is symmetric, only the upper or lower half needs to be stored. This allows for compact storage and efficient computation within the ESEIF-SLAM algorithm—an efficient use of computational resources.

The mathematical equations for motion update (e.g., from the dead reckoning motion sensors 190), signal sensor update (e.g., from the sensors 170), and sparsification can be formulated directly in the information space, i.e. only using $\eta$ and $\Lambda$ for storing the state between motion and sensor updates. In addition an estimate of the mean $\mu$ is needed for computing the Jacobians of motion and sensor model.

Figure 23:
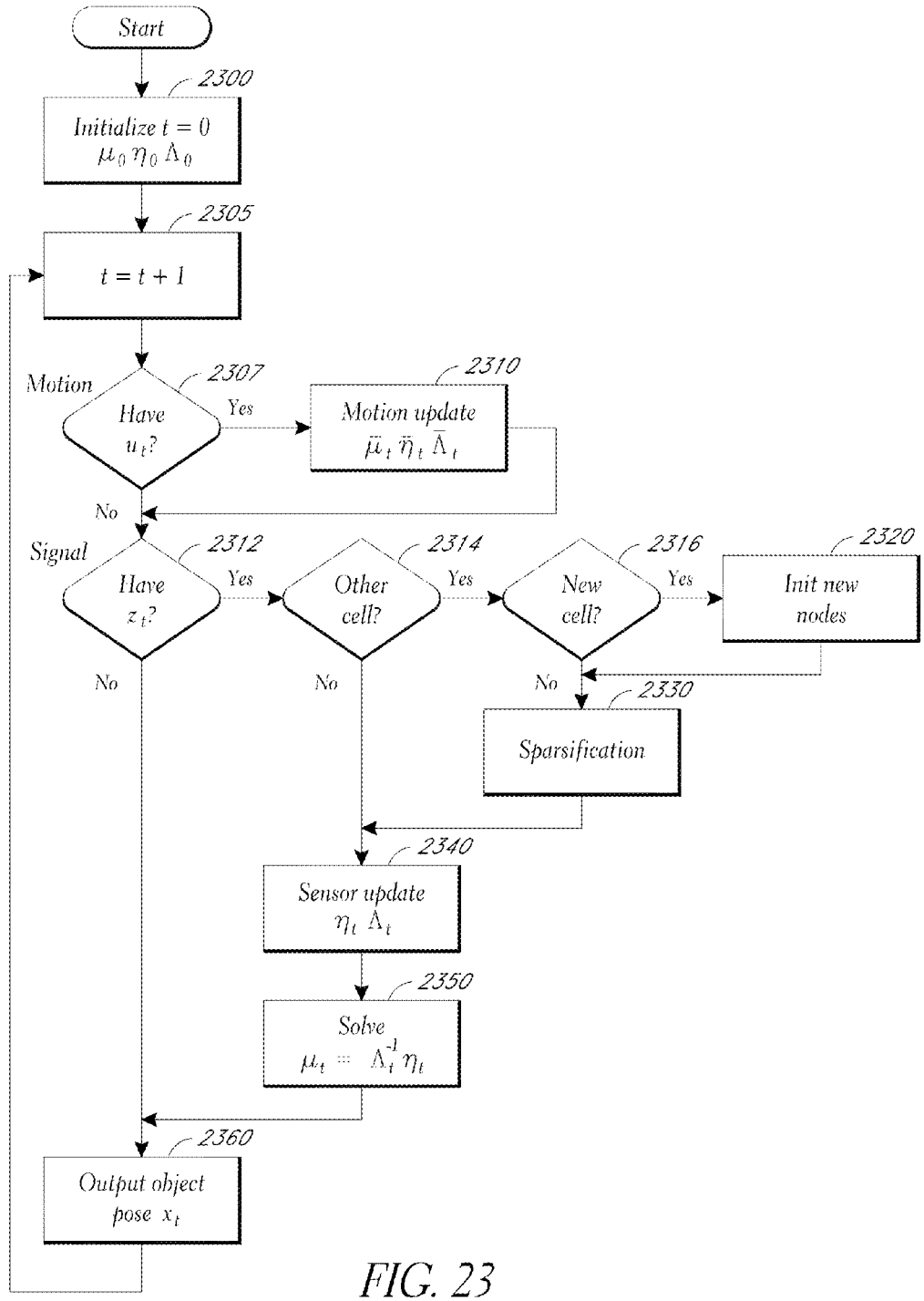
FIG. 23 is a flow chart illustrating an example use of ESEIF-SLAM for localization.

A flow chart of an example implementation of the ESEIF-SLAM algorithm for object localization is shown in FIG. 23. It is similar to the EKF-SLAM algorithm, with an initialization state 2300, a motion update state 2310 if there is new motion (odometry) data, a signal update state 2340 if there is new signal sensor data, preceded by a new-node initialization state 2320 if new nodes are added, but also with an additional sparsification state 2330 that integrates out device pose and re-localizes the device 100 when changing to another cell. Also, there is another state 2350 for recovering the current mean $\mu_t$ from the information space by solving an equation system. After the solving state 2350, a new device pose is produced at state 2360 and the process repeats. This flow chart, like those illustrating the other algorithms, is illustrative. One of ordinary skill will make use of available optimizations when implementing an algorithm, including these algorithms.

The state vector as defined in Eq. 20 and Eq. 21 only contains one field for rotational variability. This is under the assumption that rotational variability does not change with location and thus can be shared among all nodes. There are, however, situations where this is not the case, e.g. when the error $\beta_\epsilon$ in Eq. 5 is significant and the approximations in Eq. 7 to Eq. 9 introduce a larger error, or when the sensor 170 is tilted due to uneven floor. There are different ways to deal with changing rotational variability.

In one embodiment each node contains its own estimate of rotational variability. The state vector of full SLAM in Eq. 20 containing the full object path changes into Eq. 44, with similar changes for the state of on-line SLAM in Eq. 21.

$$y = \begin{pmatrix} x_1 \\ \vdots \\ x_T \\ m_1 \\ c_1 \\ \vdots \\ m_N \\ c_N \end{pmatrix} \qquad \text{Eq. 44}$$

The rotational variability is computed similar to the expected node values by using bilinear interpolation per Eq. 45, where $c_{i0}, c_{i1}, c_{i2}$ and $c_{i3}$ are the rotational variability estimates at the four cell nodes according to FIG. 11 and $w_0$, $w_1$, $w_2$ and $w_3$ are the weights from Eq. 17. Using the obtained value for c the predicted measurement is computed as before using Eq. 18.

$$c = w_0 c_{i0} + w_1 c_{i1} + w_2 c_{i2} + w_3 c_{i3} \qquad \text{Eq. 45}$$

Initial estimates of rotational variability are 0 with a co-variance of total uncertainty. When initializing new nodes, the same techniques as described for initial mean and covariance of the node signal values apply for rotational variability.

The cost of storing rotational variability with each node is an increase in the number of state variables and therefore higher memory and run-time consumption. This can limit the application of this solution when computational resources are constrained.

In another embodiment, only one instance of rotational variability is kept, as originally defined in Eq. 20 and Eq. 21, but it is allowed to change when the mobile device 100 moves. For EKF-SLAM this means that in the motion model in Eq. 28 and Eq. 30, a component $V_t$ is added to the sub-matrix of the rotational variability in the state covariance. $V_t$ is an additive co-variance matrix modeling how much rotational variability is allowed to change when moving. It is usually a diagonal matrix of constant values.

In another embodiment, $V_t=0$ as long as the device 100 stays within a cell and $V_t$ is set to a diagonal matrix with constant non-zero values on the diagonal only when the device 100 changes between cells. This has the advantage that while the device 100 stays within a cell, rotational variability is assumed to be constant and is only allowed to change when moving into another cell. In some situations this may offer a better approximation at the cost of additional computation time, but requires no significant additional computational space.

In another embodiment, $V_t$ is used to allow a change in rotational variability when moving between cells in the ESEIF-SLAM system. In the sparsification state, the rotational variability is integrated out and re-localized as the device pose is. This is done because adding $V_t$ in the information space would otherwise fully populate the information matrix, destroying or reducing its sparseness. The states for sparsification with rotational variability included are analogous to the previously described method. An additional advantage of this approach is the removal of cross-information between rotational variability and passive nodes. This further reduces memory requirements and saves computations, at least partially counteracting the additional computation necessary to perform the calculations.

These methods and systems may also be used for detecting and estimating "drift" on, for example, carpet. When a mobile device 100 moves on a carpeted surface, the carpet exhibits a force onto the mobile device 100 tending to slide or shift the mobile device 100 in a certain direction. This effect is caused by the directional grain, material, or other properties of the carpet. Other surfaces, such as lawns or artificial turf, may also exhibit similar properties.

The amount of this drift can be estimated by the localization filter in different ways. In one embodiment, the filter state in Eq. 24 is augmented by two additional variables $drift_x$ and $drift_y$ that represent the amount of carpet drift in the x and y direction of the global coordinate frame. The motion model in Eq. 11 then takes into account these new parameters and the filter estimates their values at the same time it estimates the other state variables.

In another embodiment, the mobile device 100 may be configured to move a certain distance forward followed by the same distance backward. From the difference in the position output of the localization system at the beginning and end of this sequence, the amount of carpet drift can be estimated because the carpet drift may be proportional to this position difference. Typically, such a distance would be small enough that it can be traversed rapidly but large enough that an appreciable difference can be detected and the results not obfuscated by noise. Some embodiments may use distances in the range of 10 cm to 2 meters. Some embodiments may use smaller distances. Some embodiments may use larger distances.

The systems and methods described above were evaluated by moving an indoor localization sensor 170, configured to detect infrared patterns 180 projected from a beacon 160, along a rail. Ground truth information—the actual pose of the sensor 170—was directly available from position and orientation sensors on the rail motor. Every 50 cm, sensed signal strength and other measurements were recorded with the sensor 170 in 8 different directions (every 45°), and approximately 50 readings were taken for each of those directions. Once the sensor 170 reached the end of the rail, it was moved 50 cm parallel to the previous rail line and another round of measurements was taken. This was repeated until a total of eight parallel tracks were completed. The previously discussed FIG. 9 shows the experimental setup with the ground truth positions of measurements. There is a wall 135 close to the rail at the top location. There are also walls on the left 120 and right 130 of the experimental space, but those walls are further from the sensor 170 than the upper wall 135 (at least when the sensor 170 is traversing the final rail). These walls contribute to multi-path signals and cause a significant disturbance of the sensor signal.

The previously discussed FIG. 10 shows the position of the sensor 170 directly determined by a linear sensor model in this environment. The compression on the left, right and top end is significant: a system using this linear model would loose significant accuracy in pose estimation.

Figure 24:
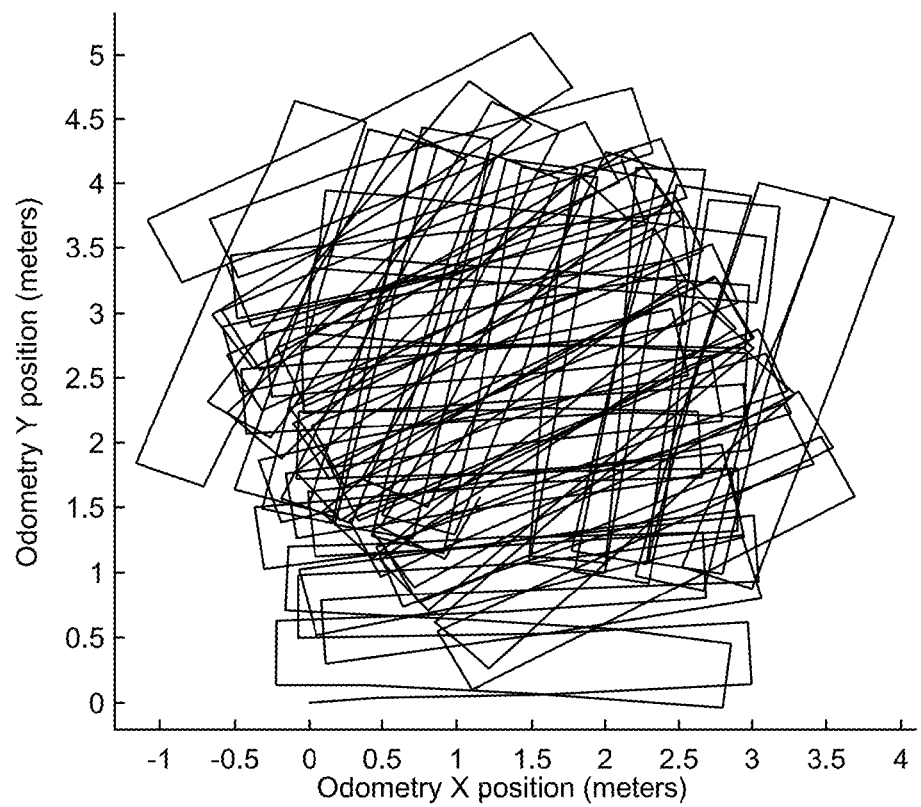
FIG. 24 illustrates example results of using odometry (dead-reckoning) alone to follow a navigational plan.

Using the recorded data, a path for a virtual mobile device 100 through the grid was generated. Starting in the lower left corner the object moves along the rows and changes between rows on the left and right side. This results in a theoretically straightforward motion: along a row, a 90° turn at the end of the row, a brief movement to reach the next row, and then another 90° turn before traversing that next row. In practice, when zero-mean Gaussian noise is added to the motion information (simulating real-world error after extended use of dead-reckoning sensors), the odometry path is obtained as shown in FIG. 24. After attempting to move up and down the rail grid approximately ten times, the error in orientation is up to 90°: the mobile device is actually moving vertically when its own reckoning system indicates it is moving horizontally.

The simulated relative pose data and the resulting odometry path are plausible examples of internal motion estimates. Mobile devices such as autonomous vacuum cleaners or other consumer products can show a similar degradation of pose estimation when using the integration of wheel encoder counts as the only method for pose estimation for example.

Figure 25:
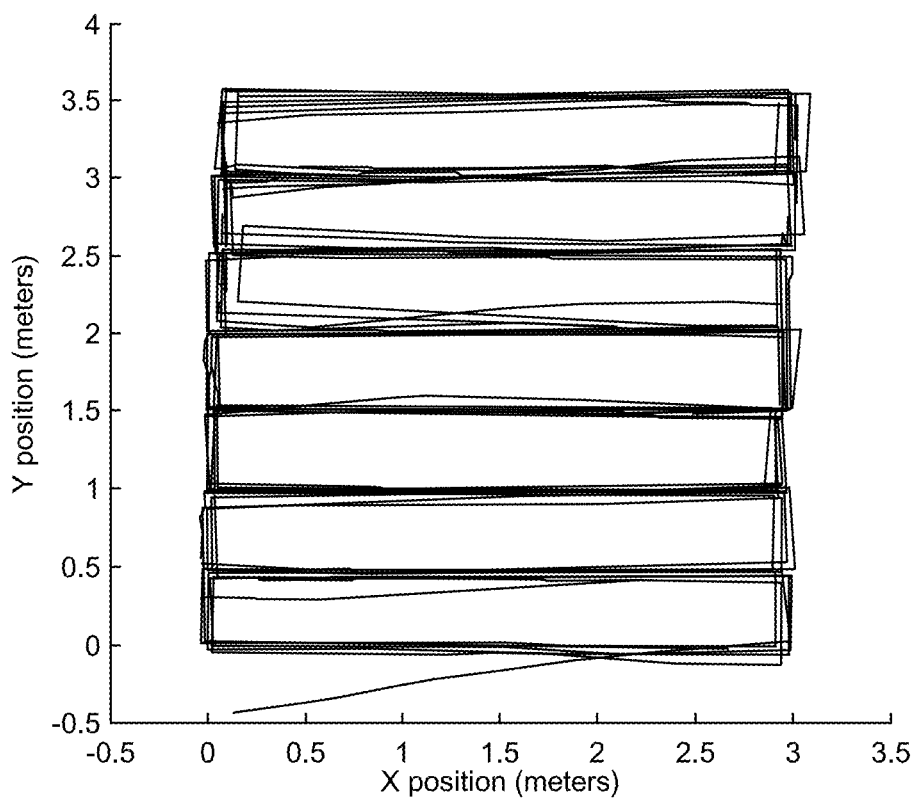
FIG. 25 illustrates example results of using an example embodiment of background signal localization to follow a navigational plan.

For testing the Vector Field SLAM system, one of the approximately 50 sensor measurements from the ground truth pose was randomly chosen when reaching a grid position. This measurement was then provided to the SLAM method for object localization. The cell size for Vector Field SLAM was set to 1×1 meters. FIG. 25 shows the resulting object path. Although the figures speak for themselves, the conclusion is that a mobile device 100 equipped with a localization and mapping system as disclosed herein, can following a navigational plan with a dramatically higher degree of accuracy than one relying on dead reckoning alone. This result was computed using an implementation of EKF-SLAM. Similar results were obtained using GraphSLAM and ESEIF-SLAM implementations.

In another series of experiments, the accuracy of the individual Vector Field SLAM implementations was compared to ground truth. In general, all three methods provide higher accuracy than other methods that only use linear sensor models. The GraphSLAM method usually provided slightly better accuracy than EKF-SLAM and ESEIF-SLAM. The latter two usually provided similar accuracy. The absolute position error was determined to depend on several factors such as ceiling height and the size of environments. In the test environment, the overall mean position error was about 6 cm. In general, the sources of error may vary depending on the signal sources 180 used. For example, ceiling height may not be a significant contributor to error if the background signal used is generated by magnetic coils suspended over the operating environment.

Figure 26:
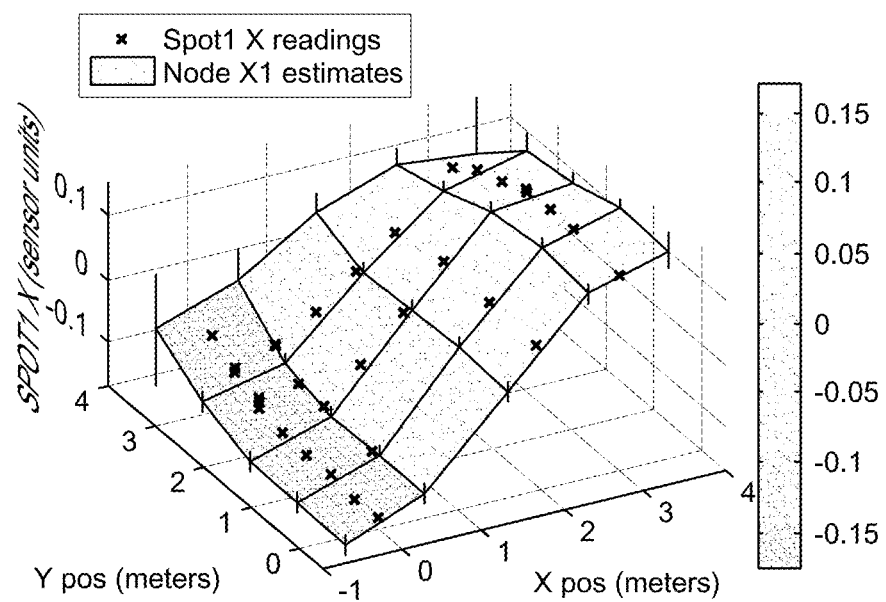
FIGS. 26 and 27 illustrate example signal strength maps generated by an embodiment.
Figure 27:
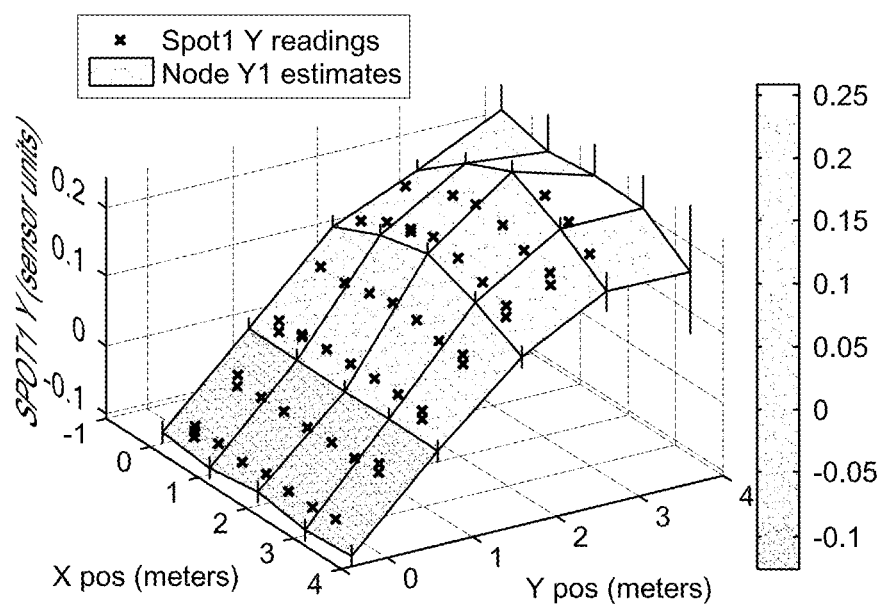

Vector Field SLAM also provides information about the learned sensor model or map—the signal strength through the environment. FIGS. 26 and 27 show the learned coordinates for a signal source, in this example an infrared pattern 801 (the plots for a second infrared pattern or spot 802 are similar and omitted). Error bars indicate the 2 sigma levels of the mean values at each node position. One can see how the sensor signal is bent towards the rear wall 135. This shape is accounted for by the piece-wise approximation of the sensor signal.

A typical embodiment will run asynchronously in that a new time step is considered to occur whenever new data is available from signal sensor 170. This may be as often as six or seven times a second. In some embodiments, new sensor data may be ignored if the embodiment is still integrating previously available data and generating new pose information. In some embodiments the localization processer may request data from the signal sensor 170 or otherwise indicate that it is available to process that data. Some embodiments may run synchronously, with new data provided at fixed and regular time intervals.

The systems and methods disclosed herein can be implemented in hardware, software, firmware, or a combination thereof. Software can include compute readable instructions stored in memory (e.g., non-transitory memory, such as solid state memory (e.g., ROM, EEPROM, FLASH, RAM), optical memory (e.g., a CD, DVD, Bluray disc, etc.), magnetic memory (e.g., a hard disc drive), etc., configured to implement the algorithms on a general purpose computer, special purpose processors, or combinations thereof.

Figure 28:
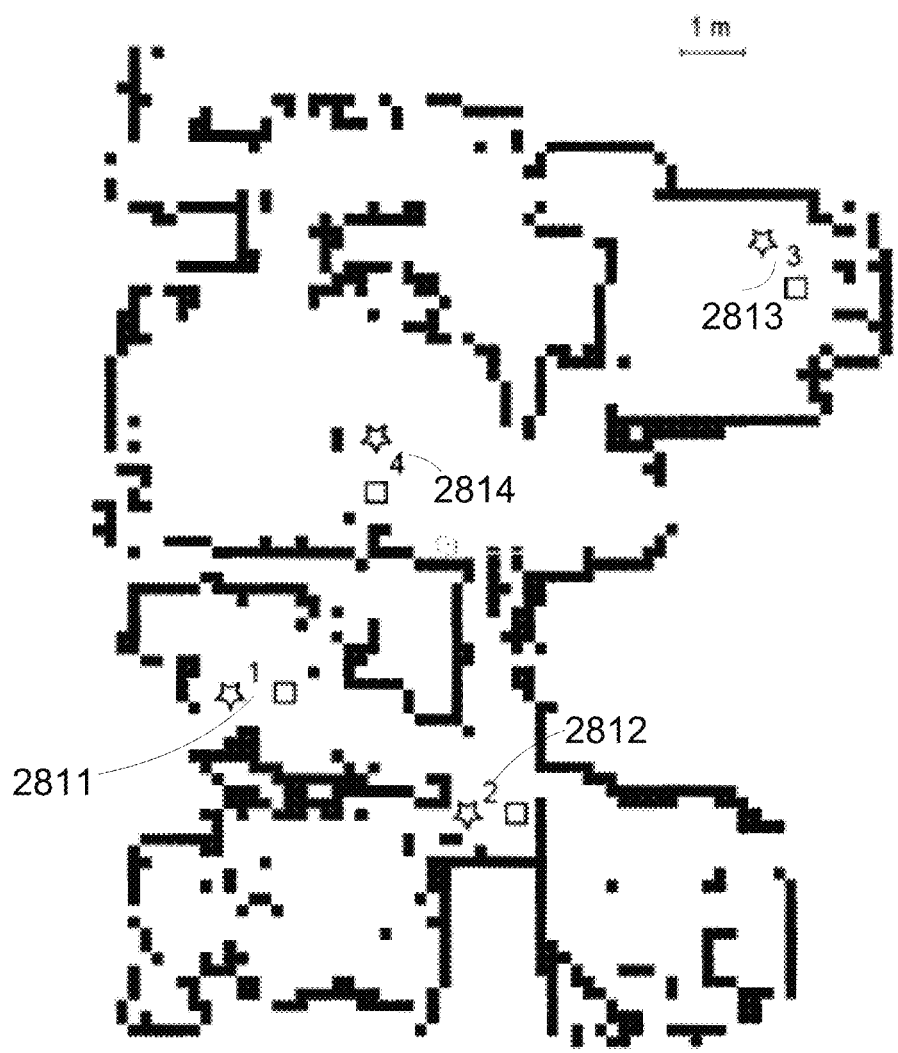
FIG. 28 illustrates a map generated by vector-field SLAM during a cleaning run in a relatively large 3-bedroom home environment.

Disclosed is a technique to extend Vector Field SLAM of to work in large environments in which multiple beacons are installed. As an example, FIG. 28 shows a typical home environment. Four navigation cubes each projecting two patterns onto the ceiling, each one of them referred to as Northstar beacons 2811, 2812, 2813, 2814, allow the robot to navigate through virtually the entire home. The Northstar spots are projected onto the ceiling and are indicated by star and square icons. Obstacles identified by the robot are drawn in black. Units are in meters.

The complexity of Vector Field SLAM with respect to area size and number of signals will be discussed. In order to keep memory and run-time requirements relatively low, a decoupling of localization maps is used. An approximation is presented that allows the robot to travel between Northstar beacon-covered areas each associated with its own signal map.

A dead reckoning technique can be used to estimate motion and/or positioning. In one embodiment, the robot estimates relative motion by using both wheel-odometry and a gyroscope so that it is able to move out of areas covered by beacons for extended periods of time. In one embodiment, the gyroscope can correspond to a MEMS gyroscope. In one embodiment, only a gyroscope with yaw is used.

Furthermore, as large environments increase the risk of the robot getting stuck somewhere, and for letting the user pause or kidnap the robot (e.g. for maintenance), the system should be able to resume treatment, such as cleaning, after these events. Treatment can include, but is not limited to, cleaning, wiping, sweeping, vacuuming, painting, spraying, planting, or the like. A tracking approach is formulated that allows the robot to reposition itself in a previously mapped area when operation is resumed. The robot is localized by searching the vector field for positions that provide a signal vector similar to a measurement taken by the robot. As the vector field does not need to be bijective, the measurement may fit to multiple places. Each such position is considered as a hypothesis, and is successively tracked over some distance to confirm its correctness.

We evaluate extensions to Vector Field SLAM in large home environments with sizes ranging from 35 to 125 m² and with number of beacons from one to four. However, additional beacons can be used. As the experiments demonstrate, an embodiment of is capable of keeping a robot localized in these environments while computational and storage requirements are similar to those required when using only a single beacon.

The next section summarizes a method of Vector Field SLAM as described in and in [12, 13]. A subsequent section describes extensions for allowing the method to work in large environments. Experimental results are later presented.

Vector Field SLAM

In Vector Field SLAM the spatial variation of continuous signals are learnt and simultaneously used for localizing the robot. Examples of continuous signals include the received signal strengths of WiFi base stations or the signals measured from active beacons. The particular physical characteristics of the signals do not matter as long as the continuous signals can be uniquely identified, are relatively stationary over time and change, preferably continuously, over space. In one embodiment, the coordinates of two spots projected onto the ceiling are used as the continuous signals. It will be understood that these continuous signals can be bursty or pulsed, such as provided by flashing infrared LEDs. The signal field is represented as a regular grid affixed node positions $b_i=(b_{i,x}, b_{i,y})^T, i=1 \ldots N$, where each node $m_i \in \mathfrak{R}^M$ holds the expected signal measurements of the robot when placed at $b_i$ and pointing in a fixed orientation $\theta_0$. Without loss of generality, let $\theta_0=0$ for an initial condition. Vector field and robot pose are then estimated through the application of simultaneous localization and mapping (SLAM).

The robot moves through a time series of poses $x_0 \ldots x_T$, $x_t \in SE(2)$. Without loss of generality, $x_0=(0, 0, 0)^T$ for an initial condition. At each time step $t=1 \ldots T$ the robot receives a motion input $u_t$ with covariance $R_t$ and a measurement $z_t$ of the continuous signals with covariance $Q_t$. Disclosed techniques consider that the measurements are also affected by calibration parameters c of the sensor. These parameters can reflect for example a rotational sensitivity in an antenna measuring WiFi signal strengths. In one example with an active beacon system, calibration c encodes a coordinate offset caused by a small error in the ideal horizontal plane of the sensor.

A motion model defined by a function g describes the motion of the robot since the previous time step:

$$x_t = g(x_{t-1}, u_t) + e_u \qquad \text{Eq. 46}$$

where $e_u$ is a zero mean error with covariance $R_t$.

Furthermore, the sensor model defined by function h predicts an observation given current robot pose, sensor calibration and vector field:

$$z_t = h(x_t, c, m_1 \ldots m_N) + e_z \qquad \text{Eq. 47}$$

where $e_z$ is a zero mean error with covariance $Q_t$.

One particular sensor model is decomposed into a rotational and a translational part as expressed in Eq. 48.

$$h(x_t, c, m_1 \ldots m_N) = h_R(h_0(x, y, m_1 \ldots m_N), \theta, c) \qquad \text{Eq. 48}$$

In Eq. 48, $x_t=(x, y, \theta)$ is the robot pose at time t, $h_R$ is a sensor-dependent, continuous function that rotates the expected signal values according to robot orientation $\theta$ and applies a correction based on the sensor calibration c, and $h_0$ is a bilinear interpolation of the expected signal values from the four nodes of the cell containing the robot (see FIG. 29) as expressed in Eq. 49.

$$h_0(x, y, m_1 \ldots m_N) = \sum_{j=0}^{3} w_j m_{i_j} \qquad \text{Eq. 49}$$

with $$w_0 = \frac{(b_{i_1,x} - x)(b_{i_2,y} - y)}{(b_{i_1,x} - b_{i_0,x})(b_{i_2,y} - y)} \qquad \text{Eq. 50}$$

$$w_1 = \frac{(x - b_{i_0,x})(b_{i_2,y} - y)}{(b_{i_1,x} - b_{i_0,x})(b_{i_2,y} - b_{i_0,y})} \qquad \text{Eq. 51}$$

$$w_2 = \frac{(b_{i_1,x} - x)(y - b_{i_0,y})}{(b_{i_1,x} - b_{i_0,x})(b_{i_2,y} - b_{i_0,y})} \qquad \text{Eq. 52}$$

$$w_3 = \frac{(x - b_{i_0,x})(y - b_{i_0,y})}{(b_{i_1,x} - b_{i_0,x})(b_{i_2,y} - b_{i_0,y})} \qquad \text{Eq. 53}$$

Figure 29:
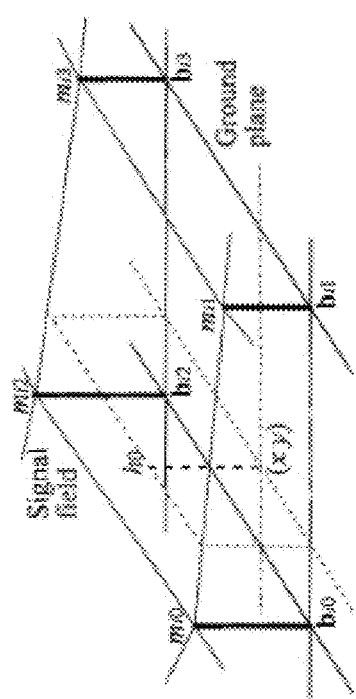
FIG. 29 illustrates bilinear interpolation from cell nodes.

FIG. 29 illustrates bilinear interpolation from cell nodes. A 1-dimensional vector field, that is, signal field, is illustrated. For dimensions of 2 and higher, the bilinear interpolation is analogous according to Eq. 49.

By choosing a standard motion model [1] and a suitable initialization, the robot trajectory, the sensor calibration and the vector field can be estimated. U.S. patent application Ser. No. 12/940,937 presented different implementations of the foregoing model including off-line non-linear optimization through GraphSLAM, an extended Kalman filter (EKF-SLAM) [12] and an exactly sparse extended information filter (ESEIF-SLAM) [13]. All methods show the ability to keep a robot localized in an environment of the size of a living room in which a single Northstar beacon has been placed.

For running the method on an embedded platform, the ESEIF-SLAM variant is particularly interesting. The method is constant time, and space grows linear in the size of the area explored. This allows it to run on a low-end ARM7 processor clocked at 44 MHz with only 64 KByte of RAM.

Extensions to Large Environments

In order to extend Vector Field SLAM to large environments, several additions can be integrated into the Vector Field SLAM algorithm.

Space and Run-Time Complexity of ESEIF-SLAM

Figure 30:
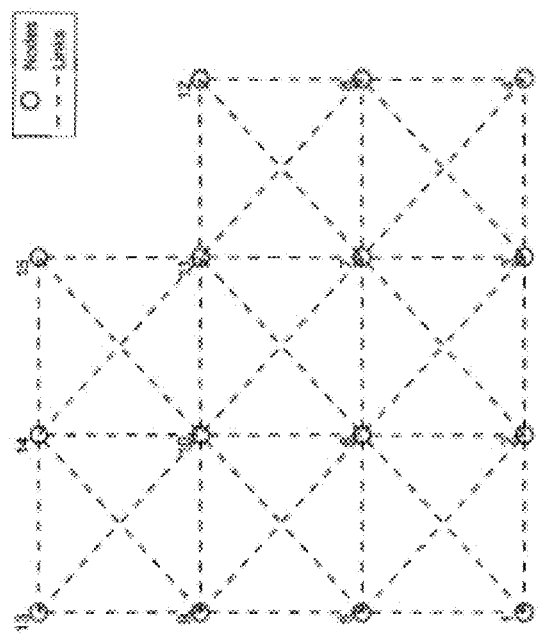
FIG. 30 illustrates a sample grid in vector field SLAM showing information links.

A closer look at the space and run-time complexities will now be discussed. FIG. 30 shows a sample grid consisting of 8 cells that models a vector field over an environment. Information links exist between nodes as they appear in an ESEIF-SLAM implementation.

As long as the robot stays within a cell, one embodiment of the ESEIF-SLAM approach updates robot pose, sensor calibration and the four cell nodes by integrating motion and sensor information. This results in information links between all involved variables, i.e. entries in the information matrix that correspond to robot pose, calibration, the four cell nodes, and the cross information between all of them are, in general, non-zero. In other words, the information matrix of a vector field of a single cell is fully dense.

When moving into a neighboring cell, the ESEIF approach performs a sparsification step [14]. First, the process marginalizes over robot pose and sensor calibration. This removes them from the state vector and leaves the information matrix with only the node's information and their cross entries. Next, the process relocates robot and sensor calibration using a sensor measurement in the new cell, for example, as shown in [13].

The effect of this approach is that each node shares information with at most eight neighboring ones as the links in FIG. 30 indicate. The nodes can be classified by the number of other nodes they link to. Only inner ones (nodes 6, 7 and 10) have eight connections. Nodes at the border have either 7 (node 11), 5 (nodes 2, 3, 5, 8, 9 and 14) or only 3 links (nodes 1, 4, 12, 13 and 15). In practice, the average connectivity per node is about 6. Of course this depends on the layout of the environment, for example, in an open room, the factor is larger as there are relatively more inner nodes.

The space requirements for N nodes with signal dimension M can now be estimated. In the following, the robot and calibration variables are ignored temporarily as they merely add a constant term. The ESEIF stores an information vector (size N M), an estimate of the mean (also size N M) and the sparse information matrix. The latter holds N information matrices of all nodes which, due to symmetry, each use a size of $$\frac{1}{2}M(M+1).$$

The cross information can be stored in $$\frac{1}{2} \cdot 6M^2$$

where the factor ½ accounts for the fact that each link is shared between two nodes. In total the space requirements for Vector Field SLAM using the ESEIF are $$Space_{ESEIF} \approx N\left(3\frac{1}{2}M^2 + 2\frac{1}{2}M\right) + \text{const.} \qquad \text{Eq. 54}$$

As for run-time, ESEIF-SLAM is constant time, i.e. does not depend on N [13]. The most expensive operation is the recovery of a part of the estimated mean. In our formulation, we update robot pose, sensor calibration and the four cell nodes. This involves solving a linear equation system in these variables with a symmetric and positive definite system matrix. Cholesky decomposition is used, which takes time cubic in the number of variables. If constant terms and factors are ignored, the time complexity therefore is as expressed in Eq. 55

$$Time_{ESEIF} = O(M^3). \qquad \text{Eq. 55}$$

Multiple Beacons Covering Large Environment

In order to cover a larger area, more beacons can be installed in the environment. In one situation, the signals of all beacons might be visible at some location. If this were modeled without loss of information, then the signal dimension M needs to be expanded to hold signal values of all beacons. However, increasing M has a drastic effect on the space and run-time of our ESEIF formulation. When doubling the number of signals, the space increases by a factor of four (Eq. 54) and run-time by a factor of 8 (Eq. 55).

However, most home environments have walls and rooms separating the space into areas where at most one beacon is visible. In case the areas of beacons overlap, in one embodiment, information from all but one beacon is ignored, e.g. using the beacon that provides the highest signal certainty. In an alternative embodiment, information less than all available beacons is used, such as, for example, the two beacons with the highest signal certainty.

In one embodiment, a logic for switching from one beacon to another is described as follows. For each beacon, the signal certainty is measured, e.g. the signal strength, that indicates how useful the beacon is for localization. Initially, the beacon showing the best such certainty is selected and used as the current beacon. From then on the certainties of all available beacons are compared and after a beacon different from the current one shows a larger value (for example, a signal strength that is twice as strong) the process can switch to that beacon and make it the current one.

Figure 31:
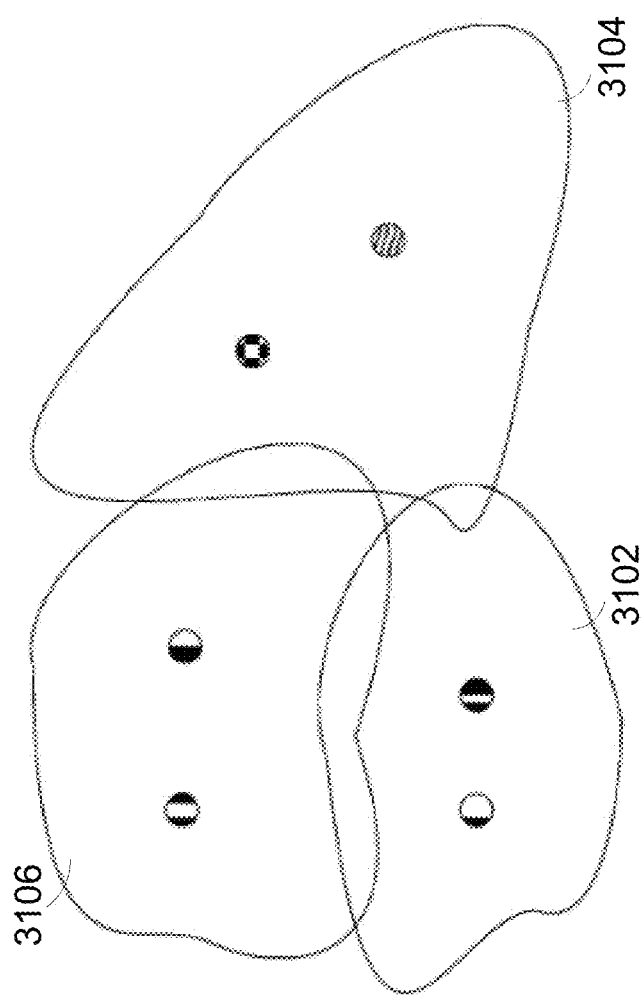
FIG. 31 illustrates an atlas of three maps each having a beacon that projects two unique spots for localization.

A natural choice of representing the environment is by using multiple localization maps, one for each area around a beacon. Whenever the robot switches the current beacon using the logic described above, a new localization map is started, or, if the robot has already visited the area before, it re-localizes in the corresponding localization map. The individual maps are allowed to overlap due to the hysteresis when switching the active beacon to another one. An example atlas of maps is shown in FIG. 31.

In a proper representation, the maps 3102, 3104, 3106 are linked by uncertain rigid-body transformations, i.e., they can rotate and translate slightly with respect to each other [15]. As long as the uncertainties associated with these transformations are small, each map can be anchored at a fixed global pose and the induced error moved into the procedure when re-localizing the robot in a localization map.

In one embodiment, the relative pose uncertainty computed from odometry from when the robot left a map is maintained until the robot re-enters it. In practice, this uncertainty can be limited to a certain maximum value. The uncertainty is then added to the pose uncertainty of the robot in our relocation step of the ESEIF [13]. This, of course, can introduce larger changes in the robot pose and should work well as long as the error when closing loops stays relatively small.

One advantage of processing in this manner is that the signal dimension M stays the same as for a single beacon. Only the number N of nodes is larger for storing the additional maps.

One embodiment includes performing SLAM in a first area associated with a first map; performing SLAM in a second area associated with a second map; and performing position estimation in a third area outside of and between the first area and the second area, wherein in the third area, position estimation is performed with dead reckoning. Dead reckoning can be performed using odometry and a gyroscope.

Optionally, a timer can be reset upon entry of the robot into the third area, the time spent in the third area can be tracked with the timer, and the robot can be controlled to return to at least one of the first area or the second area after a predetermined elapsed time in the third area.

In one embodiment, a controller further resets a timer upon entry of the robot into the third area from the first area or the second area; remembers which one of the first area or the second area the robot was in prior to entry to the third area; tracks time spent in the third area with the timer; and returns to the one of the first area or the second area from which the robot was in prior to entry to the third area after elapsing of a predetermined time in the third area unless the robot enters an area in which SLAM can be performed at least with positioning information based on observations of a set of one or more continuous signals.

In one embodiment, the controller further estimates a position uncertainty of the robot while operating in the third area; and if the position uncertainty is larger than a predetermined threshold, returns the robot to at least one of the first area or the second area. In one embodiment, the controller further estimates a position uncertainty of the robot while operating in the third area; remembers which one of the first area or the second area the robot was in prior to entry to the third area; and if the position uncertainty is larger than a predetermined threshold, returns the robot to the one of the first area or the second area from which the robot was in prior to entry to the third area.

In one embodiment, the controller is performs SLAM at least with positioning information based on observations of a first set of one or more continuous signals, and when in the second area, the controller performs SLAM at least with positioning information based on observations of a second set of one or more continuous signals. In one embodiment, the first set of one or more continuous signals and the second set of one or more continuous signals comprise reflections of spots of infrared light. In one embodiment, the controller distinguishes among the different reflections of spots of infrared light based on frequency.

One embodiment includes a robot and a controller of the robot. The controller associates observations of a first set of one or more continuous signals with a first map; associates observations of a second set of one or more continuous signals with a second map, wherein the second map is maintained independently the first map; and switches between performing simultaneous localization and mapping (SLAM) with the first map or performing SLAM with the second map based at least partly on an observed signal strength of the first set or the second set.

In one embodiment, the controller observes a plurality of sets of one or more continuous signals including the first set and the second set, wherein each of the plurality of observed sets is associated with a separate map; determines that a largest observed signal strength of the plurality of observed sets is larger in magnitude than a signal strength of a set currently being used for performing SLAM; and switches to performing SLAM with the set with the largest observed signal strength. In one embodiment, the controller observes a plurality of sets of one or more continuous signals including the first set and the second set, wherein each of the plurality of observed sets is associated with a separate map; determines that a largest observed signal strength of the plurality of observed sets is at least a predetermined factor larger in magnitude than a signal strength of a set currently being used for performing SLAM; and switches to performing SLAM with the set with the largest observed signal strength. For example, the predetermined factor can be a factor of 2. Other values will be readily determined by one of ordinary skill in the art. In one embodiment, the first set of one or more continuous signals and the second set of one or more continuous signals include reflections of spots of infrared light. The controller can distinguish among the different reflections of spots of infrared light based on frequency.

Gyroscope for Improving Orientation Estimates

Any navigation system improves when integrating accurate information about the relative motion of the robot. In particular when the absolute error in orientation can be kept low, on-line SLAM filters like EKF-SLAM and ESEIF-SLAM are less likely to become inconsistent [17].

Through some basic experiments, we found that rotation or yaw computed from only wheels quickly becomes unreliable within a few meters, in particular when the wheel base is small and the floor surface slippery. By integrating a gyroscope having yaw in the estimation of relative motion, rotation errors can be kept within a few degrees for several minutes of travel.

This allows the robot to navigate in areas not covered by any beacon, like at the outer perimeter or in the zone in between two distant beacons. Although information from both sensors could be combined in a probabilistic way, we found that using distance computed by wheels and rotation measured by gyroscope provides satisfactory results.

The inputs of motor commands, wheel encoders and gyro measurements are analyzed for detecting movement errors. Ideal velocity values of both wheels are computed by a linear combination using system matrices with parameters depending on the detected error. One embodiment is different in that wheel velocities are not computed but rather, the change in distance and rotation of the robot pose is directly provided. One embodiment is also simpler in that there is no need to adjust system parameters for combining encoders and gyro data depending on the movement error.

Figure 32:
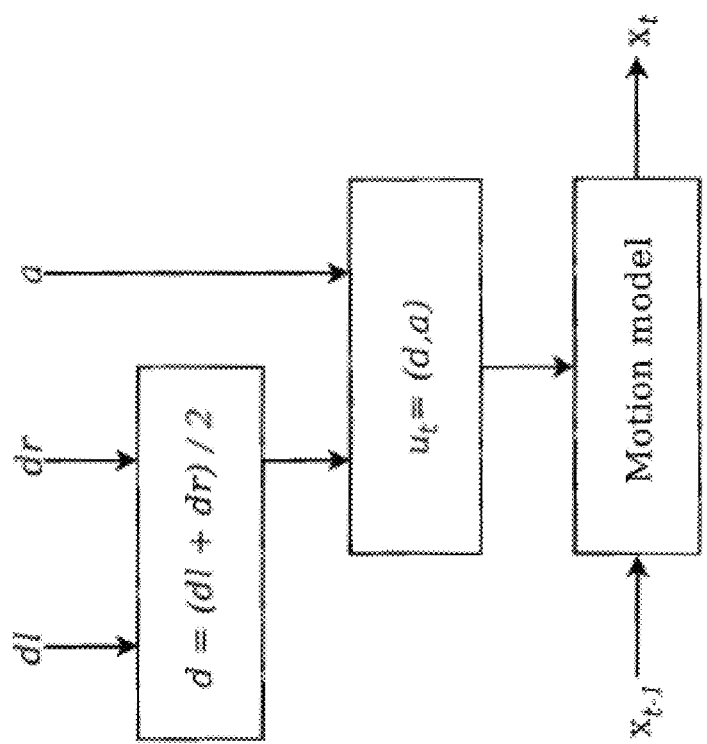
FIG. 32 is a flowchart of computing motion for a robot from dead reckoning data, such as data from odometry and a gyroscope.

FIG. 32 illustrates a flowchart for computing motion of a robot from data measured by odometry and a gyroscope (yaw). The disclosed method of integrating wheel encoders and gyroscope can be described mathematically. Let the sensor input at time t consist of the distances $d_l$ and $d_r$ measured by the left and right encoder, respectively, and the change in orientation $\alpha$ obtained from the gyroscope. A motion input $u_t$ as is then computed as expressed in Eq. 56

$$u_t = (d, \alpha)^T \quad \text{Eq. 56}$$

In Eq. 56, the $$d = \frac{1}{2}(d_l + d_r)$$

represents the average distance travelled of both wheels.

The robot pose $x_t$ is then computed from the motion model in Eq. 46. See FIG. 32 for a flowchart of updating the robot pose from the motion input.

A typical motion model is one in which the robot is traveling on a straight line of distance d in the forward direction followed by an in-place rotation about $\alpha$ as expressed in Eq. 57.

$$g_1(x_{t-1}, u_t) = \begin{pmatrix} x_{t-1} \\ y_{t-1} \\ \theta_{t-1} \end{pmatrix} + \begin{pmatrix} d\cos\theta_{t-1} \\ d\sin\theta_{t-1} \\ \alpha \end{pmatrix}. \quad \text{Eq. 57}$$

Figure 33:
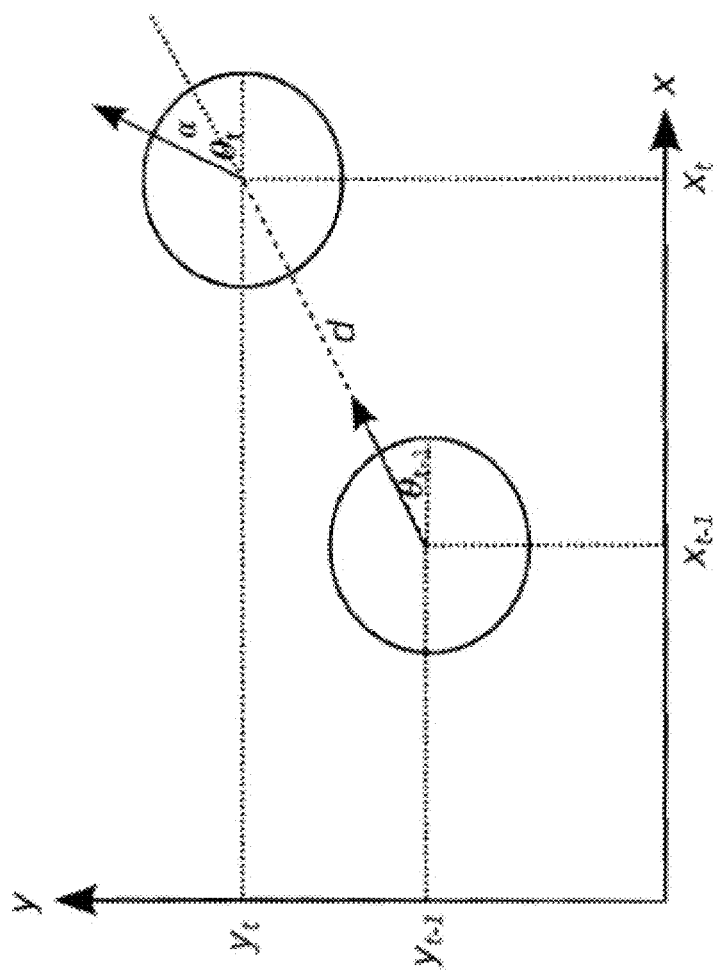
FIG. 33 illustrates a robot moving in a straight line followed by an in-place rotation.

See FIG. 33 for a graphical illustration of a robot moving on a straight line followed by an in-place rotation.

A different model assumes the robot is moving along an arc. For $\alpha \neq 0$ the new robot pose can be computed as expressed in Eq. 58.

$$g_2(x_{t-1}, u_t) = \begin{pmatrix} x_{t-1} \\ y_{t-1} \\ \theta_{t-1} \end{pmatrix} + \begin{pmatrix} \cos\theta_{t-1} & -\sin\theta_{t-1} & 0 \\ \sin\theta_{t-1} & \cos\theta_{t-1} & 0 \\ 0 & 0 & 1 \end{pmatrix} \begin{pmatrix} d\frac{\sin\alpha}{\alpha} \\ d\frac{1-\cos\alpha}{\alpha} \\ \alpha \end{pmatrix} \quad \text{Eq. 58}$$

Figure 34:
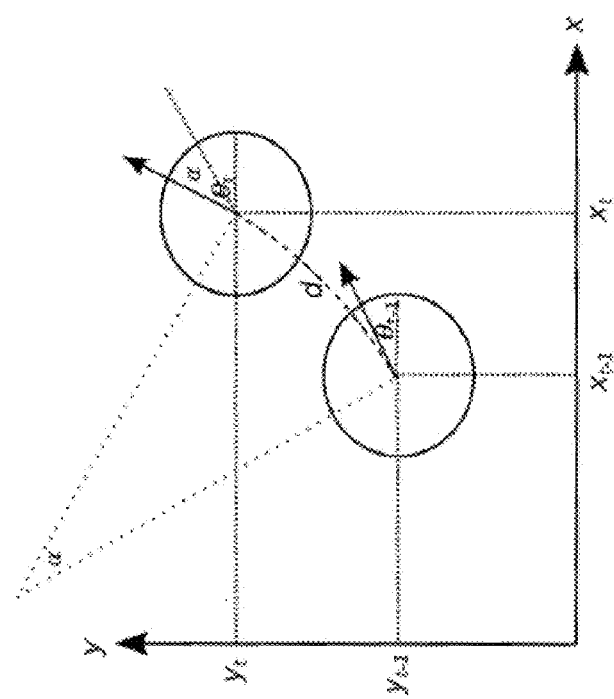
FIG. 34 illustrates a robot moving in an arc.

See FIG. 34 for a graphical illustration of a robot moving along an arc. In the limit $\alpha = 0$ the computation is identical to the motion on a straight line.

Re-Localization for Resuming Navigation

In large environments, there is an increased risk of the robot becoming stuck in tight areas or in situations with many obstacles. Furthermore, for a cleaning robot it is desirable for the user to have an option for pausing and resuming the robot, e.g. for emptying the dust bin or changing the cleaning pad. Once resumed, the robot should quickly find its position in the area already explored and continue with its navigation.

Figures 35A, 35B:
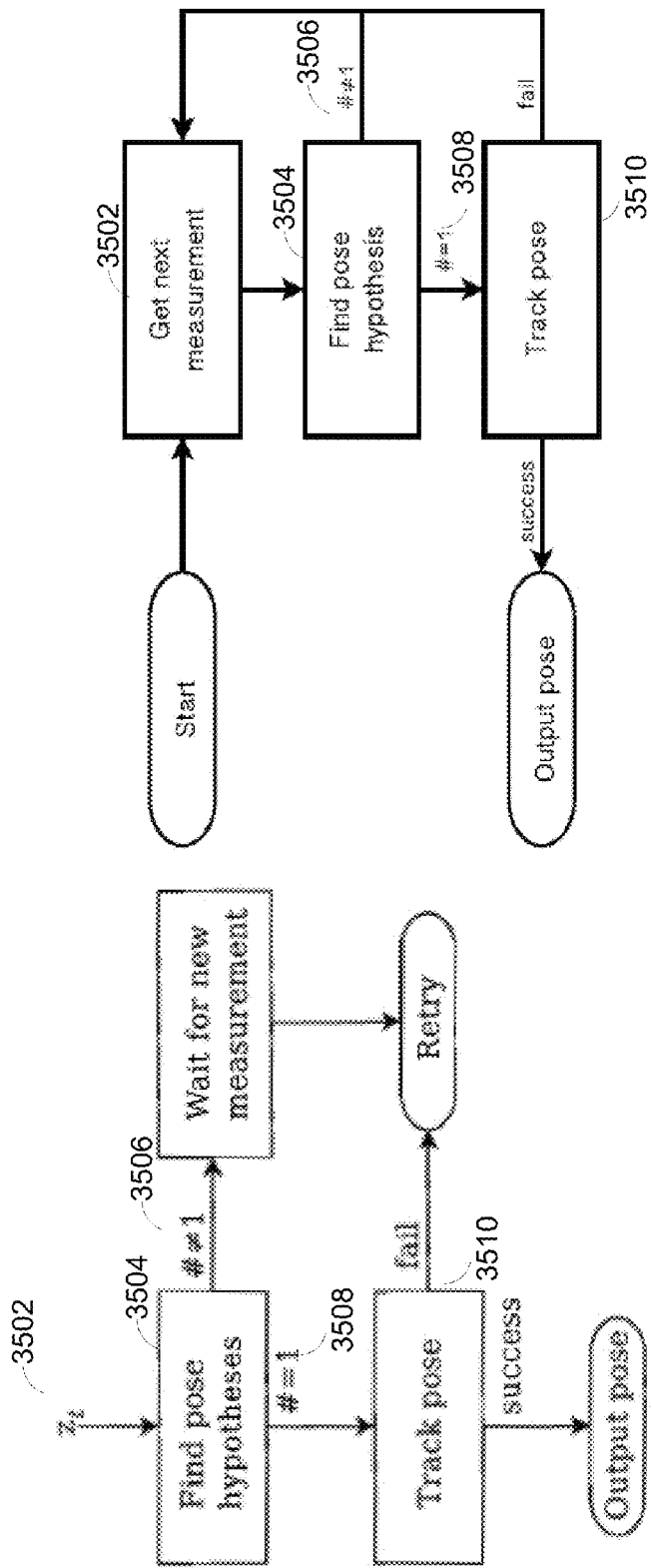
FIGS. 35A and 35B are flowcharts illustrating re-localization with one pose hypothesis.
Figure 36:
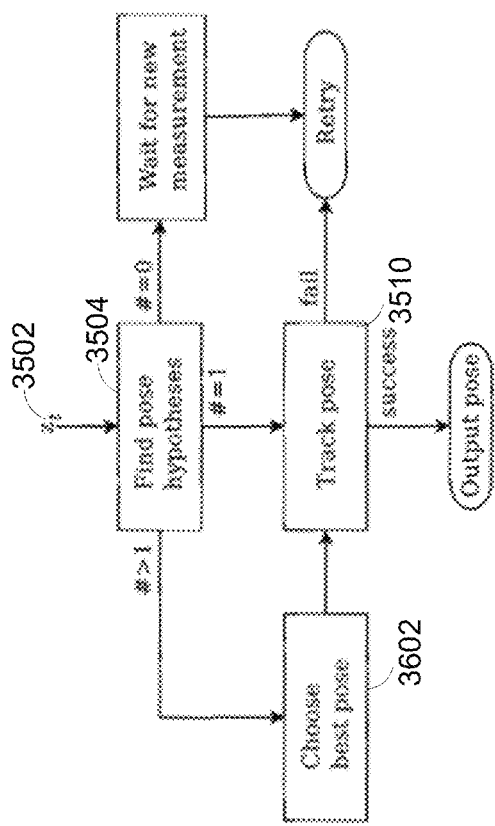
FIG. 36 is flowchart illustrating re-localization with multiple pose hypotheses.

For finding its position and orientation, the robot needs to solve a global localization problem, also known as the kidnapped robot problem. It can be stated as follows: "Using at least one sensor measurement $z_t$ 3502 find possible candidates of position and orientation where the measurement could have been taken." In general, the number of possible poses can be zero, one, or many. FIGS. 35A, 35B and 36 show flowcharts of possible systems for such a re-localization of the robot. FIGS. 35A and 35B illustrate different views of the same process for robot re-localization in which only one pose hypothesis is allowed. FIG. 36 illustrates a process for robot re-localization in which multiple pose hypotheses are allowed. The processes begin with a measurement $z_t$ 3502. The process attempts to find 3504 a pose hypothesis. Further details of process to find 3504 a pose hypothesis will be described later in connection with FIGS. 37 and 38.

In case no pose or multiple poses have been found 3506, the procedure of FIG. 35A or 35B can be repeated using a new measurement $z_t$. Usually, the robot should move before taking a new measurement as it is likely that the same or a similar measurement is obtained when stationary.

In case exactly one pose 3508 was determined, the robot has been re-localized and, in principle, could continue with its navigation. It is, however, beneficial to verify the found pose before deciding that the robot is fully re-localized. For this verification step the found pose candidate is tracked 3510 using further measurements and motion estimates. Such a tracking 3510 can be carried out, e.g. by using an extended Kalman filter (EKF). After the pose has been tracked over a sufficient long distance or for a sufficient long time, the robot is considered as being fully re-localized.

The situation becomes more challenging when multiple possible poses match to the received measurement $z_t$. One possible approach is to treat this case similar to the case when no pose hypothesis has been found, i.e. to wait for a new measurement and repeat the procedure (see FIGS. 35A and 35B). In case the environment and sensor readings are highly distinctive, i.e., there are only few ambiguous situations, this method can be very successful.

A different embodiment includes choosing one best pose 3602 among all found candidates as illustrated in FIG. 36. In the context of Vector Field SLAM, the map includes the signal values at pre-defined locations (nodes). The association of measurements to nodes is implicit by choosing a grid cell in which the observation could have been taken (recall that signals carry a unique ID for identifying to which signal source a measurement belongs to). Depending on the distribution of the signals over the environment there can be multiple locations and cells in which a measurement could have been received. Choosing a best candidate pose under these conditions is less obvious.

In yet another embodiment (not shown as a flowchart) the multiple hypotheses could be tracked individually using a multi-hypothesis tracking (MHT) system. An example of such an approach is the multi-hypothesis localization and tracking approach by Arras et al. [20]. Eventually the number of hypotheses decreases as individual tracks are either confirmed and kept, or rejected and removed.

In one embodiment, the tracking of a pose is started after exactly one pose candidate has been found. Otherwise, the method retries using the scheme described above and shown in FIGS. 35A and 35B.

Before searching for pose candidates, a measurement $z_t$ has to pass a significance test that evaluates how well the measurement is suited for the re-localization task. Basically, the measurement should contain rich enough information for giving a hint about where it could have been taken. The particular criteria employed depends on the sensor. It can be, for example, a minimum signal strength received in all measured signals. A measurement that fails the test is discarded and the system waits for the next one.

In order to obtain a pose hypothesis in the vector field, a cell i and a robot pose $x_t = (x, y, \theta)^T$ contained in the cell are searched for that match to the current measurement $z_t$. Substituting Eq. 48 and Eq. 49 into Eq. 47, Eq. 59 is obtained.

$$z_t = h_R\left(\sum_{j=0}^{3} w_j m_{i_j}, \theta, c\right) + e_z \quad \text{Eq. 59}$$

In Eq. 59, $w_j$ depends on the selected cell i and robot position $(x, y)^T$ and $m_{i_j}$ are the signal values at the four cell nodes according to FIG. 29.

The problem can be formulated as a constrained optimization problem. Let $v(i, x, y, \theta)$ be the difference between measurement and expected signal values:

$$v(i, x, y, \theta) = z_t - h_R\left(\sum_{j=0}^{3} w_j m_{i_j}, \theta, c\right).$$
Eq. 60

The optimal vector $(i, x, y, \theta)$ that minimizes the Mahalanobis distance is sought as expressed in Eq. 61.

$$(i, x, y, \theta) = \underset{(i,x,y,\theta)}{\operatorname{argmin}} v(i, x, y, \theta)^T Q_t^{-1} v(i, x, y, \theta)$$
Eq. 61

An additional constraint is that position $(x, y)^T$ falls into cell i as expressed in Eq. 62.

$$b_{i_0,x} \leq x < b_{i_1,x}, b_{i_0,y} \leq y < b_{i_2,y}.$$
Eq. 62

Note that the covariances of the nodes are ignored. It is assumed that nodes in the map have converged reasonably enough such that their weight can be ignored relative to the measurement covariance $Q_t$. In case there are nodes in the map with weak information, they should be discarded for the purpose of re-localization. An extension to our preferred embodiment would be to include the node covariances in the Mahalanobis distance (Eq. 61).

It is also possible to ignore the measurement covariance $Q_t$, e.g. if it is unknown or for simplicity. The Mahalanobis distance (Eq. 61) then changes to an unweighted least-squares problem:

$$(i, x, y, \theta) = \underset{(i,x,y,\theta)}{\operatorname{argmin}} \|v(i, x, y, \theta)\|$$
Eq. 63

An approximation to (Eq. 61), that often works well in practice, is to first search for a cell candidate i, locate a position $(x, y)^T$ inside the found cell, and finally compute the orientation $\theta$.

For finding cell candidates, we search the map of nodes $m_k$, k=1 . . . N for the node that best matches to the observation $z_t$. Recall that each $m_k$ holds the expected signal values at position $b_k$ with a fixed orientation $\theta_0=0$. Since it is unknown at which orientation $\theta$ the measurement $z_t$ has been taken, the signal values are transformed into an orientation independent space before comparing node and measurement.

Let l be a function that maps a vector of signal values $z \in \Re^M$ to a vector in the orientation independent space $\Re^L$:

$$l: \Re^M \to \Re^L$$
Eq. 64

The function l depends on the employed signals and sensors. In the (trivial) case where signal values do not depend on sensor orientation, l is the identity and L=M. In the case where signal values change with the orientation of the sensor, the function l typically maps signal vectors to a sub space, thus L<M. We will provide two explicit examples in our implementation using active beacons in Section 5.

The transformation l is applied to the nodes $m_k$, k=1 . . . N of the vector field and to the current observation $z_t$ corrected by the sensor calibration c. The difference $v_l(k)$ between a node k and the measurement is then defined as expressed in Eq. 65.

$$v_l(k) = l(h_c^{-1}(z_t, c)) - l(m_k)$$
Eq. 65

In Eq. 65, $h_c^{-1}$ corrects measurement $z_t$ using calibration c (see Section 5). The calibration c is assumed to be known. Since the robot is re-localizing in a vector field that was learned before, calibration c can be obtained from the last system state of Vector Field SLAM. It is also possible to use a nominal value ĉ or to ignore calibration in case its effects are negligible.

The best node k is then found as expressed in Eq. 66.

$$k = \underset{k}{\operatorname{argmin}}\, v_l(k)^T L H_c^{-1} Q_t^{-1} H_c^{-1,T} L^T v_l(k)$$
Eq. 66

In Eq. 66, L and $H_c^{-1}$, are the Jacobians of l and $h_c^{-1}$:

$$L = \frac{\partial l}{\partial z}(h_c^{-1}(z_t, c))$$
Eq. 67

$$H_c^{-1} = \frac{\partial h_c^{-1}}{\partial z}(z_t, c).$$
Eq. 68

As for the original optimization problem (Eq. 61), if the measurement covariance $Q_t$ is ignored, the problem simplifies to an unweighted least-squares formulation:

$$k = \underset{k}{\operatorname{argmin}} \|v_l(k)\|.$$
Eq. 69

The best node can be found by simply trying all nodes k=1 . . . N.

After the best node k has been determined, the cells connected to it are evaluated. There can be up to four cells that have node k as one of its corners. Let these four cells be referred to as $i^{k,j}$, j=1 . . . 4. For example for k=6 in FIG. 30 there are four cells $i^{6,1}$, $i^{6,2}$, $i^{6,3}$ and $i^{6,4}$ with node indices (6, 7, 10, 11), (5, 6, 9, 10), (2, 3, 6, 7) and (1, 2, 5, 6) that contain node 6.

Given a cell i we can define the difference $v_i(x, y)$ of the signal values at location $(x, y)^T$ to the measurement as expressed in Eq. 70.

$$v_i(x, y) = l(h_c^{-1}(z_t, c)) - \sum_{j=0}^{3} w_j l(m_{i_j})$$
Eq. 70

In Eq. 70, w, is defined as in Eq. 50 to Eq. 53. By expanding and rewriting terms, difference function $v_i$ can be written as:

$$v_i(x, y) = Axy + Bx + Cy + D$$
Eq. 71 where $$A = \frac{-l(m_{i_0}) + l(m_{i_1}) + l(m_{i_2}) - l(m_{i_3})}{(b_{i_1,x} - b_{i_0,x})(b_{i_2,y} - b_{i_0,y})}$$
Eq. 72

$$B = \frac{b_{i_2,y}(l(m_{i_0}) - l(m_{i_1})) - b_{i_0,y}(l(m_{i_2}) - l(m_{i_3}))}{(b_{i_1,x} - b_{i_0,x})(b_{i_2,y} - b_{i_0,y})}$$
Eq. 73

-continued $$C = \frac{b_{i_1,x}(l(m_{i_0}) - l(m_{i_2})) - b_{i_0,x}(l(m_{i_1}) - l(m_{i_3}))}{(b_{i_1,x} - b_{i_0,x})(b_{i_2,y} - b_{i_0,y})}$$ Eq. 74

$$D = l(h_c^{-1}(z_t, c)) - \frac{b_{i_1,x}(b_{i_2,y}l(m_{i_0}) - b_{i_0,y}l(m_{i_2})) -}{(b_{i_1,x} - b_{i_0,x})(b_{i_2,y} - b_{i_0,y})}$$ Eq. 75

A position $(x_i, y_i)^T$ can be obtained by minimizing the Mahalanobis distance as expressed in Eq. 76.

$$(x_i, y_i) = \underset{(x,y)}{\operatorname{argmin}}\, v_i(x,y)^T L H_c^{-1} Q_t^{-1} H_c^{-1,T} L^T v_i(x,y)$$ Eq. 76

Alternatively, a position $(x_i, y_i)^T$ can be obtained without using measurement covariance $Q_t$ as expressed in Eq. 77.

$$(x_i, y_i) = \underset{(x,y)}{\operatorname{argmin}} \|v_i(x,y)\|.$$ Eq. 77

Position $(x_i, y_i)^T$ can be found by non-linear optimization, e.g. using the Levenberg-Marquardt algorithm. In the following we focus on a particular case of the function l where the orientation independent space $\mathfrak{R}^L$ has dimension L=2. The minimum of Eq. 76 and Eq. 77 can then be found by setting $$v_i(x_i, y_i) = 0.$$ Eq. 78

Except for degenerated cases, there are two unique solutions which are obtained using the quadratic formula. Let these solutions be $(x_{i,1}, y_{i,1})$ and $(x_{i,2}, y_{i,2})$.

For each cell $i \in \{i^{k,j} | j=1 \ldots 4\}$ we obtain such a pair of positions. A test that a unique solution has been found can be performed by verifying Eq. 62 with each found position. In case there is one and only one position satisfying Eq. 62 it can be concluded that cell and robot position has been found. Otherwise, the measurement is rejected and the process is repeated with the next measurement according to FIG. 35A or 35B.

Having found cell and robot position, the last missing information is the orientation θ. We can find θ by solving the original optimization problem defined in Eq. 61 and Eq. 63 where i, x and y are given by the algorithms above. The particular solution depends on the rotational component $h_R$. We will provide an example in Section 5.

It should be noted that one embodiment might not find the global minimum defined in Eq. 61 and Eq. 63 since for example the best node found in Eq. 66 and Eq. 69 can be a local extremum. Furthermore, since in one embodiment, only the cells at the best node are evaluated, there is no guarantee that a found pose is unique and that there are no other pose candidates in the vector field matching to measurement $z_t$. It is therefore preferable to confirm the found pose by tracking it for some time.

Using the found pose $x_t=(x, y, \theta)^T$ we start a localization filter based on an EKF that tracks the robot pose from the found location. On robot motion $u_t$, the robot pose is updated using the motion model of Eq. 46 but ignoring uncertainties:

$$\bar{x}_t = g(x_{t-1}, u_t)$$ Eq. 79

When receiving a measurement $z_t$, we setup a constant pose covariance $\bar{\Sigma}_{xx}$ as a diagonal matrix. The elements of $\bar{\Sigma}_{xx}$ depend on the robot and sensor but are not critical. A typical choice is $\bar{\Sigma}_{xx}=\operatorname{diag}(0.1^2\, m^2, 0.1^2\, m^2, 0.1^2 \operatorname{rad}^2)$. The Mahalanobis distance of the measurement innovation is then computed as expressed in Eq. 80.

$$\bar{D}^2(z_t) = (z_t - h(\bar{y}_t))^T \Sigma_v^{-1}(z_t - h(\bar{y}_t))$$ Eq. 80

In Eq. 80, $\Sigma_v = H_\chi \Sigma_{\chi\chi} H_\chi^T + Q_t$ is the innovation covariance, $\bar{y}_t = (\bar{x}_t, c, m_1 \ldots m_N)$, h is defined as in Eq. 48 and $H_\chi$ is its Jacobian with respect to robot pose:

$$H_\chi = \frac{\partial h}{\partial x}(\bar{y}_t).$$ Eq. 81

If the Mahalanobis distance falls above a threshold, i.e. $\bar{D}(z_t) > D_{max}$, then the measurement $z_t$ is rejected. A typical threshold is $D_{max}=3$. Otherwise the measurement $z_t$ is accepted, and the robot pose is updated using the EKF equation:

$$x_t = \bar{x}_t + \Sigma_{\chi\chi} H_\chi^T \Sigma_v^{-1}(z_t - h(\bar{y}_t)).$$ Eq. 82

Rejected measurements are outliers either caused by excessive measurement noise or because they do not fit to the vector field around robot pose $\bar{x}_t$. By counting the number of outliers $C_{outlier}$ it can be verified that the pose hypothesis is correct. If the count reaches a maximum number $C_{max}$ then the tracking filter failed and we restart re-ocalization using the next measurement according to FIG. 35A or 35B.

On the other hand, if $C_{outlier} < C_{max}$ after traveling a certain minimum distance and integrating a certain minimum number of measurements, it can be concluded that the tracking filter succeeded. The process can then switch back to Vector Field SLAM by using the relocation procedure of the ESEIF with the found robot pose and a large pose covariance.

Note that the tracking filter ignores to covariances associated with the nodes in the map. We try to compensate for this somewhat by always using the same constant pose covariance $\bar{\Sigma}_{\chi\chi}$ when integrating measurements. Although this approach is not mathematically accurate, it is only used over a short distance of robot travel and only to verify our pose hypothesis. Thus, the consistency of this filter is not a primary concern. A property of the filter is that we only need to maintain the robot pose $x_t$. This can be advantageous if we were to track several different pose hypotheses.

Figure 37:
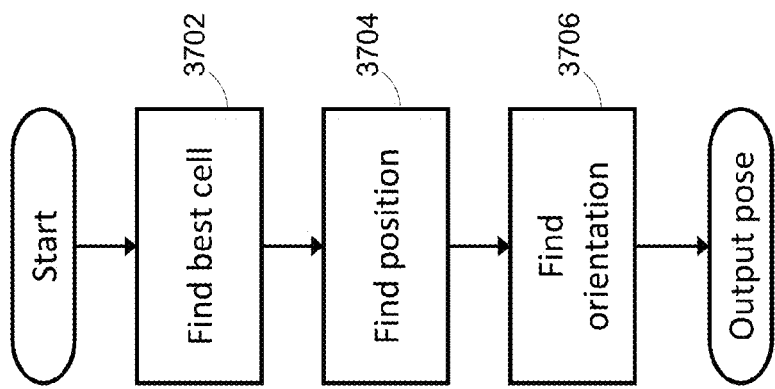
FIG. 37 is a flowchart illustrating a process for finding a pose hypothesis.

FIG. 37 is a flowchart illustrating a process for finding a pose hypothesis. In a state 3702, the process selects the cell in which the measurement $z_t$ fits the best. For example, the measurement $z_t$ can be compared to the mean of the four nodes of each of the cells. In a state 3704, the process computes the position within the cell found in the state 3702 where the measurement $z_t$ fits best. For example, the quadratic formula of Eq. 78 can be used.

Figure 38:
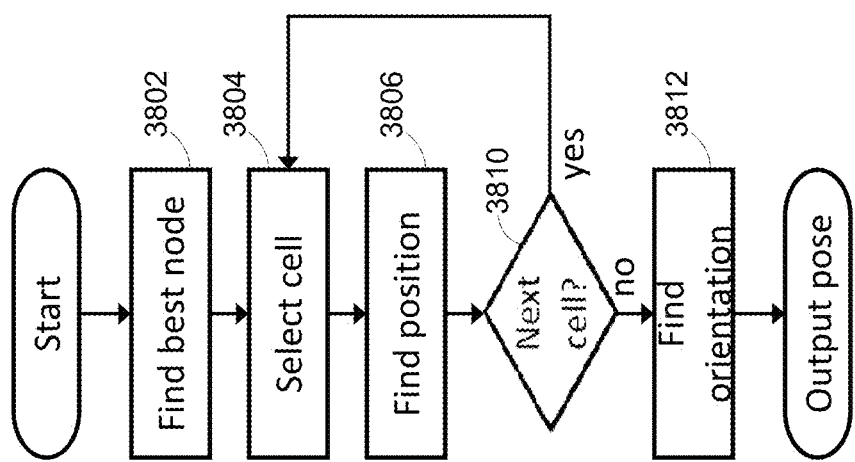
FIG. 38 is a flowchart illustrating an alternative process for finding a pose hypothesis.

FIG. 38 is a flowchart illustrating an alternative process for finding a pose hypothesis. In a state 3802, the process selects the node where the measurement $z_t$ fits best, via, for example, Eq. 66 and Eq. 69. In a state 3804, the process successively selects one of the four cells connected to the node. In a state 3806, the process computes the position inside the selected cell where the measurement fits best, for example, by using the quadratic formula of Eq. 78. The decision block 3810 checks if there are more cells to investigate. In the state 3812, the process obtains the orientation for the found position.

In case there is more than one position found, the following can be performed: (a) the best position is selected, (b) the measurement can be rejected, and (c) all the found pose hypotheses can be outputted.

Implementation with Active Beacons

We have experimented with Vector Field SLAM and the foregoing extensions for large environments on a system using Northstar, a low-cost optical sensing system for indoor localization [21]. A beacon projects a pair of unique infrared patterns on the ceiling (see FIG. 1). The beacon can be placed relatively freely in the room and adjusted such that it points towards the ceiling. The projected patterns carry a different frequency encoded in the signal to ease the data association on the robot. Different Northstar beacons also provide different frequencies. An optical sensor on the robot detects these patterns and measures the direction to both spots on the ceiling. The sensor then reports the coordinates of both direction vectors projected onto the sensor plane, thus the signal dimension is M=4 and $$z_t = (z_{x_1}, z_{y_1}, z_{x_2}, z_{y_2})^T. \qquad \text{Eq. 83}$$

The covariance $Q_t$ can be derived from $z_t$ along with two additional sensor outputs measuring the signal strength. The signal strengths are also used in the significance test in the re-localization procedure. In order to pass the test, the process requires that both spots are measured with a large enough intensity.

Under relatively good circumstances, the reported spot coordinates change linearly with the robot position. However, infrared light reaches the sensor not only by direct line-of-sight but also through multiple paths by reflecting off walls and other objects, so the spot coordinates change in a non-linear way as the robot approaches an obstructed area.

Due to tolerances in manufacturing and the mounting of the sensor on the robot, the sensor plane may not be perfectly horizontal. The result of such small angular errors is well-approximated by a coordinate offset for both spots. When rotating the sensor in place, this offset becomes apparent as rotational variability. Thus, the calibration parameters are:

$$c = (c_x, c_y)^T. \qquad \text{Eq. 84}$$

In the ideal case, the offset vanishes, thus the nominal calibration is $\hat{c}=(0, 0)^T$.

The function $h_c^{-1}$ for correcting measurements with respect to calibration is as expressed in Eq. 85.

$$h_c^{-1}(z_t, c) = \begin{pmatrix} z_{x1} \\ z_{y1} \\ z_{x2} \\ z_{y2} \end{pmatrix} - \begin{pmatrix} c_x \\ c_y \\ c_x \\ c_y \end{pmatrix} \qquad \text{Eq. 85}$$

The Jacobian of function $h_c^{-1}$ is the identity matrix $H_c^{-1} = I_{4 \times 4}$.

When turning the sensor, the spot coordinates change according to the rotation angle $\theta$ but in the opposite direction. The rotational component $h_R$ of our model then becomes as expressed in Eq. 86.

$$h_R(h_{x_1}, h_{y_1}, h_{x_2}, h_{y_2}, \theta, c_x, c_y) = \qquad \text{Eq. 86}$$
$$\begin{pmatrix} \cos\theta & \sin\theta & 0 & 0 \\ -\sin\theta & \cos\theta & 0 & 0 \\ 0 & 0 & \cos\theta & \sin\theta \\ 0 & 0 & -\sin\theta & \cos\theta \end{pmatrix} \begin{pmatrix} h_{x1} \\ h_{y1} \\ h_{x2} \\ h_{y2} \end{pmatrix} + \begin{pmatrix} c_x \\ c_y \\ c_x \\ c_y \end{pmatrix}$$

In Eq. 86, $(h_{x_1}, h_{y_1}, h_{x_2}, h_{y_2})^T$ is the output vector of Eq. 49.

For mapping signal values into the orientation independent space $\Re^L$, we experimented with two different variants $l_1$ and $l_2$ defined as expressed in Eq. 87 and Eq. 88.

$$l_1(m_{x1}, m_{y1}, m_{x2}, m_{y2}) = \begin{pmatrix} \sqrt{m_{x1}^2 + m_{y1}^2} \\ \sqrt{m_{x2}^2 + m_{y2}^2} \end{pmatrix} \qquad \text{Eq. 87}$$

$$l_1(m_{x1}, m_{y1}, m_{x2}, m_{y2}) = \begin{pmatrix} \cos\gamma & \sin\gamma \\ -\sin\gamma & \cos\gamma \end{pmatrix} \begin{pmatrix} \frac{m_{x1} + m_{x2}}{2} \\ \frac{m_{y1} + m_{y2}}{2} \end{pmatrix} \qquad \text{Eq. 88}$$

In Eq. 88, $\gamma$ is as expressed in Eq. 89.

$$\gamma = \tan^{-1} \frac{m_{y1} - m_{y2}}{m_{x1} - m_{x2}} \qquad \text{Eq. 89}$$

Function $l_1$ computes the distance to both spots, which does not depend on sensor orientation. The intuition behind $l_2$ is that the angle, between the measured spots does not depend on sensor orientation. The center between the spots rotated by $-\gamma$, is then independent of sensor orientation. Both functions map sensor values to $\Re^2$, i.e. L=2 which allows us to employ Eq. 78 when finding the robot position that best matches to measurement Zt in a given cell.

Pickup Detection

When a robot is picked up by the user during normal operation of the robot, a system for detecting this pickup situation is useful. Such a robot can be, for example, an automatic floor cleaner or other floor treatment device, or a robotic toy. For example, a user may pick up an autonomous floor cleaner to resupply the cleaner with cleaning fluid, to change a cloth or wiper, to empty out a receptable, etc. It would be desirable to have the autonomous floor cleaner restart where it had left off (resume) rather than start all over again. Some existing pickup detecting systems use for example switch sensors located at the wheels. As long as the robot is on the ground, the switch sensors at each wheel are closed due to the weight of the robot. When the robot is lifted, the switches trigger and detect that the robot is in mid air.

While existing systems like the one described above are working solutions, they require a sensor at one or more wheels which increases the cost of the product. One embodiment instead does not use a specific sensor but reuses other sensors on the robot and a logic that detects the pickup situation.

One embodiment evaluates the signals of cliff sensors and a gyroscope for detecting a pickup. Cliff sensors are installed in most robotic products in order to detect the edges of areas where the robot could fall down. For example when moving closer and partly over the edge of a staircase leading downwards, these sensors trigger and provide the robot control software an input for changing the direction of travel in order not to drive or fall down the stairs. A gyroscope can be used for measuring the angular velocity in a robotic system. By integrating the data provided by the gyroscope over time, the orientation (yaw) of the robot can be determined. The accuracy of this estimate is often much better than those provided by other means, e.g. angular velocity determined by wheel odometers. It is therefore preferable to use a gyroscope as part of the localization system of the robot.

Given a robotic system equipped with one or more cliff sensor and one gyroscope, one example of logic for detecting a pickup situation works as follows. As long as any of the cliff sensors do not trigger, the robot is assumed to be on the surface or ground, that is, not picked-up. This logic uses the fact that in general it is not possible to pick up the robot without triggering all cliff sensors. In the event where all cliff sensors trigger, further evaluation of sensor data is necessary. The robot either moved partly over the edge of a cliff or it might have been picked up. In order to detect in which of the two situations the robot is in, a specific pickup-detection procedure in the robot software is executed.

The pickup-detection procedure first stops the robot and then evaluates the angular velocity measurements of the gyroscope. If these measurements indicate that the robot has a rotational velocity close to zero then no pickup is detected. The rationale behind this logic is that when picking up the robot, a user usually causes rotations and other disturbances that result in rotational velocities either far from zero or where the variance of the measured rotational velocity is large.

Results

For evaluating our extensions to Vector Field SLAM, we conducted a series of experiments with a developer version of our Mint Cleaner robot [22]. All computations are performed on an ARM7 processor clocked at 44 MHz with 64 Kbyte of RAM. We set the number of nodes to N=96 which results in a memory size for the localization maps of about 26 kBytes. This is roughly the maximum size we could afford for localization under the tight memory constraints. The processing time for integrating a motion and a sensor measurement is about 50 ms. Localization updates are performed while other control routines are also running on the CPU.

We tested our extensions in three different home environments with one to four Northstar beacons. One of the maps obtained by the robot in one of the runs is shown in FIG. 28. The robot navigated in these homes by following a cleaning strategy based on systematically covering sectors of the environment. As long as at least one beacon is visible to the robot, the strategy moves the robot onto a neighboring region until no space is left to clean. At the end the robot follows along the perimeter of detected obstacles for a thorough cleaning around walls and furniture.

As the robot moves through the environment it creates an occupancy grid map using the position information from localization. This is mapping with known poses [1]. Each visited cell is classified into one of the following categories:
  obstacles the robot bumped into,
  floor changes, detected by two cliff sensors in the front of the robot,
  hazards, where the robot got stuck or had significant problems in driving, and
  free space the robot was able to traverse without a collision.

TABLE 1

Statistics of occupancy and visibility in environments

|  | Mean | Std | Min | Max |
| --- | --- | --- | --- | --- |
| Occupied (%) | 21.13 | 4.25 | 16.56 | 28.78 |
| NS visible (%) | 55.64 | 10.27 | 42.51 | 74.33 |
| NS not visible (%) | 23.21 | 9.71 | 6.63 | 37.83 |

We also encode the visibility to beacons in the free-space cells. FIG. 28 displays only the cells that were classified as obstacles.

We carried out a total of 25 runs in the three environments and we varied the number of beacons. Table 1 shows the statistics of the environments with respect to occupancy and visibility to beacons. On average about 21% of an environment is occupied by obstacles, floor changes or hazards. From roughly 56% of visited places at least one beacon was visible (2 brightest levels of blue). The cleaning program continued to navigate in areas not covered by Northstar in about 23% of the total environment explored.

As we do not have ground truth information of the robot poses during the runs, we use the following two metrics for evaluating the performance of our navigation system:
  Double walls: if the localization of the robot were perfect, the map obtained by the robot would show obstacles and walls exactly once at the correct places. While we do not know the exact positions of walls, we can still verify that each of them is mapped exactly once. Thus by measuring the percentage of walls mapped more than once, we obtain an indication of how well the robot was localized.
  Maximum angular error: similarly as we usually know the global orientation of walls, we can measure the angle of the wall in the map showing the largest deviation from the nominal one.

TABLE 2

Localization statistics of runs

|  | Mean | Std | Min | Max |
| --- | --- | --- | --- | --- |
| Double walls (%) | 4.15 | 3.12 | 0 | 10.17 |
| Max angular error (deg) | 9.48 | 5.23 | 1.91 | 23.19 |
| Number of pause/resume | 0.55 | 1.65 | 0 | 7 |

Table 2 shows our findings for the 25 runs. On average we obtain about 4% of wrongly placed walls. In some cases there were none, while in others there can be as much as 10% of additional obstacles. The robot was paused and resumed during some runs as well, because either the user wanted to change the cleaning cloth or the robot got stuck (in some cases as many as 7 times. In either case, the robot was not necessarily started near the location where it was paused.

The angular error is, on average, about 9.5° with outliers going as large as 23°. While this seems significant, it does not always lead to a catastrophic failure. Often the map of the environment is bent along its main direction. The robot is still able to successfully navigate from one side of the environment to the other one by changing its orientation along the path according to the learned localization map. Only when trying to close a loop over a longer trajectory with a larger error in rotation, the method is likely to fail.

Figure 39:
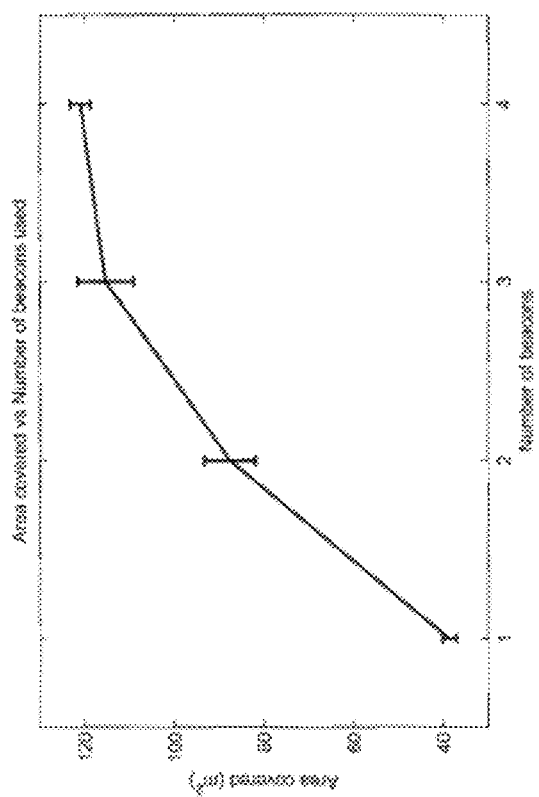
FIG. 39 illustrates an example of area coverage as a function of the number of beacons.

We also evaluated how much of the environment our cleaning algorithm will explore when varying the number of beacons in the environment for one of the testing environments. Recall that the cleaning strategy only moves on as long as any of the beacons stays visible. FIG. 39 shows the area covered as a function of the number of beacons used.

As expected, the more beacons there are, the larger the area the robot can explore. Note that when placing four beacons in the environment the robot hits the physical boundaries of the home. If the environment were larger then the robot is likely to move on and cover more space.

Figure 40A:
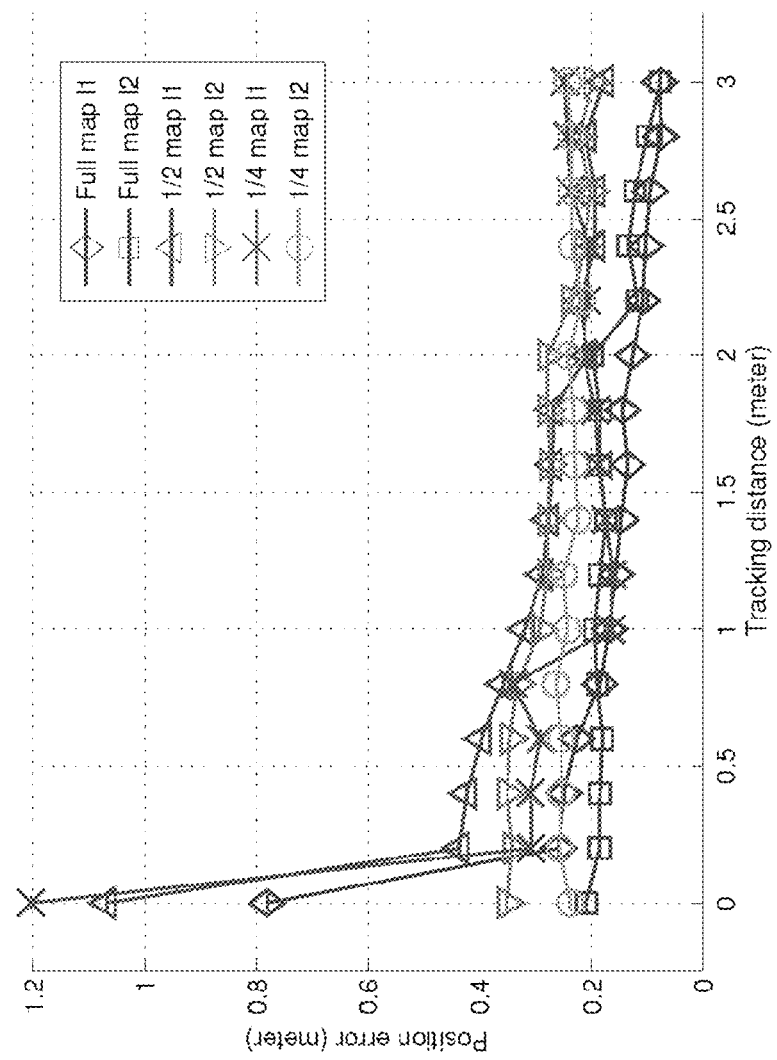
FIG. 40A illustrates experimental results for position error in meters.

FIG. 40A illustrates experimental results for position error in meters. FIG. 40A shows the mean position error of the localization approach on the three different map sizes and the two different functions $l_1$ and $l_2$ for mapping signal values to the orientation-invariant space, while also varying the tracking distance used for a successful localization. The zero tracking distance has a special meaning where as soon as a measurement generated a unique pose estimate no further verification via the EKF was performed. A minimum number of measurements is not enforced since in the experiment, the data contains a continuous stream of about 6 to 7 readings per second and the robot was traveling at an average speed of about 0.25 meter per second. Thus, a required minimum tracking distance also enforces an adequate minimum number of readings.

Our results show that when using the $l_1$ mapping function, the initial pose estimate without tracking can be quite off. As soon as we track the pose over a short distance, the accuracy improves. When using the $l_2$ function, the initial positions are much better. In general, the accuracy improves when tracking the pose over a longer distance, which is what we expected. The position error varies among the different map sizes which is also due to the different mean errors of the learned maps. For the $l_2$ orientation invariant mapping we achieve an accuracy between 10 and 35 cm depending on map size and required tracking distance.

Figure 40B:
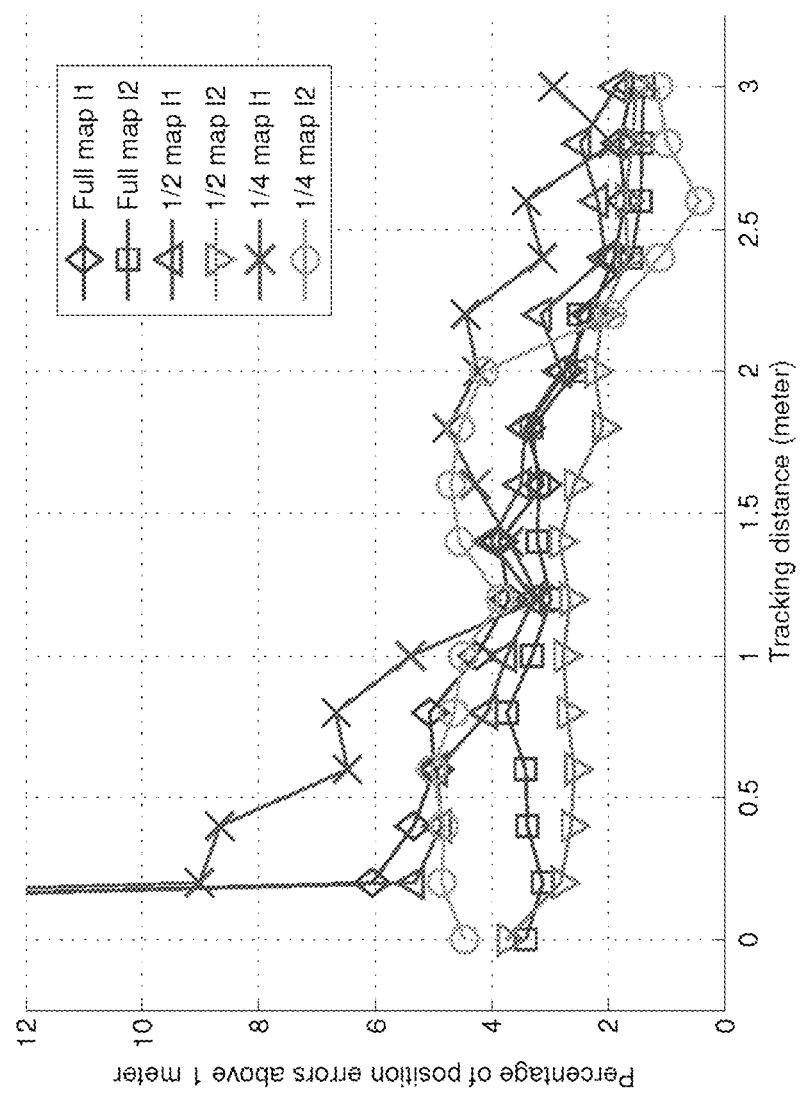
FIG. 40B illustrates experimental results for position errors in percentages of errors above 1 meter.

We can also look at the position errors by computing the percentage of position errors falling above a maximum error. As threshold we use 1 meter, the cell size of the vector fields. If the position is off by more than the threshold, a resume of the robot mission can cause a sub-optimal behavior. FIG. 40B illustrates experimental results for position errors in percentages of errors above 1 meter. Similar to the position errors, the percentages drop quickly when tracking the robot pose over a short distance. Independent of which mapping function is used, the rates converge to similar values after tracking over a longer distance. For the $l_2$ function the rate is between 1 and 4%.

Pose: A pose is a position and orientation in space. In three dimensions, pose can refer to a position (x, y, z) and an orientation ($\alpha$, $\beta$, $\theta$) with respect to the axes of the three-dimensional space. In two dimensions, pose can refer to a position (x, y) in a plane and an orientation $\theta$ relative to the normal to the plane.

Optical sensor: An optical sensor is a sensor that uses light to detect a condition and describe the condition quantitatively. In general, an optical sensor refers to a sensor that can measure one or more physical characteristics of a light source. Such physical characteristics can include the number of photons, the position of the light on the sensor, the color of the light, and the like.

Position-sensitive detector: A position-sensitive detector, also known as a position sensing detector or a PSD, is an optical sensor that can measure the centroid of an incident light source, typically in one or two dimensions. For example, a PSD can convert an incident light spot into relatively continuous position data.

Imager: An imager refers to an optical sensor that can measure light on an active area of the sensor and can measure optical signals along at least one axis or dimension. For example, a photo array can be defined as a one-dimensional imager, and a duo-lateral PSD can be defined as a two-dimensional imager.

Camera: A camera typically refers to a device including one or more imagers, one or more lenses, and associated support circuitry. Optionally, a camera can also include one or more optical filters and a housing or casing.

PSD camera: A PSD camera is a camera that uses a PSD.

Projector: A projector refers to an apparatus that projects light. A projector includes an emitter, a power source, and associated support circuitry. A projector can project one or more light spots on a surface.

Spot: A spot refers to a projection of light on a surface. A spot can correspond to an entire projection, or can correspond to only part of an entire projection.

Optical position sensor: An optical position sensor is a device that includes one or more cameras, a signal processing unit, a power supply, and support circuitry and can estimate its position, distance, angle, or pose relative to one or more spots.

Embodiments advantageously use active optical beacons in position estimation. Advantageously, disclosed techniques minimize or reduce the line-of-sight limitation of conventional active optical beacon-based localization by projecting the light sources onto a surface that is observable from a relatively large portion of the environment. It will be understood that the light sources can include sources of light that are not visible to the naked eye, such as, for example, infrared (IR) sources. For example, in an indoor environment, it can be advantageous to project the emitted light from the beacon onto the ceiling. In many indoor environments, the ceiling of a room is observable from most locations with the room.

As an illustration, one can consider an application of the method and apparatus for an autonomous mobile robot such as a robotic vacuum cleaner. A common approach to self-docking and self-charging is to place active infrared (IR) beacons on the charging station, which the robot can sense with photo detectors, and use the associated sensory information to find the docking station. This approach suffers from line-of-sight limitations. If the robot and the docking station do not have line-of-sight separation, the robot cannot find its position relative to the docking station.

In one embodiment, the IR emitter can advantageously be placed in such a way that it projects onto the ceiling above the docking station, and a robot can have a photo detector that generally faces the ceiling or is capable of observing the ceiling. The robot can advantageously observe the IR projection on the ceiling even in the absence of line-of-sight separation between the robot and the docking station. In relatively many situations, the robot has a line-of-sight view of the ceiling, which enables the robot to detect the IR projection and move to the docking station for self-charging.

The method and apparatus described herein include numerous variations that differ in the type and number of active beacons used, differ in the type and number of optical sensors used for detection of reflected light, and differ in the type of signal processing used to determine the pose of an object. Embodiments of the method and apparatus include systems for estimation of the distance of an object relative to another object, estimation of the bearing of an object relative to another object, estimation of the (x, y) position of an object in a two-dimensional plane, estimation of the (x, y, z) position of an object in three-dimensional space, estimation of the position and orientation of an object in two dimensions or in three dimensions, estimation of the linear or angular velocity of an object, and estimation of the linear or angular acceleration of an object.

Embodiments of the method and apparatus are related to estimation of the position and orientation of a device, such as a mobile robot, relative to a global or a local coordinate system. The apparatus includes one or more optical sensors, one or more optical emitters, and signal processing circuitry. The initial position and orientations of the sensors can be unknown, and the apparatus and methods can be used to measure or estimate the position and orientation of one or more of the sensors and the position of the emitter projections on a surface.

In one embodiment, an optical sensor measures the optical signals generated by the optical emitters that are within the sensor's field of view by measuring the light that is projected onto a surface. By contrast, in a conventional system, such optical devices for distance or position measurement disadvantageously require line-of-sight between the emitter and the sensor. Advantageously, embodiments described herein can detect optical signals projected onto a surface, such as a ceiling of an indoor environment. The optical emitters can be configured to project one or more spots of light onto a surface that is observable by a sensor from a relatively large portion of the environment. The sensor detects the spot and estimates the sensor's position relative to the spot. The sensor can measure quantities such as the position of the spot in the sensor's reference frame and the intensity of the signal generated by the spot, and can associate a unique identifier with each spot. Each such measurement or set of measurements defines a relationship between the position of the sensor and the position of the spot. Using multiple such relationships defined between one or more sensors and one or more spots, signal processing circuitry can estimate the pose of at least one of the sensors, and, optionally, the position of one or more spots.

Embodiments of the method and apparatus described herein can vary in the number and type of optical sensors used, can vary in the number and type of optical emitters used, can vary in the projection of the light onto the sensor via, optionally, one or more spots, and can vary in the methods used for estimation of the distance, heading, position, orientation, velocity, angular velocity, acceleration, and angular acceleration of the sensor or sensors. For example, a light spot can be generated by an IR sensor that emits IR light onto a surface, and a photo detector can be used to detect the light reflected from the surface. With one emitter and one sensor, the distance and relative heading to the projected light can be measured. With two emitters and one two-dimensional sensor, the position of the sensor in a plane and the rotation of the sensor around an axis normal to that plane can be measured.

Embodiments of the method and apparatus described herein can use a wide variety of optical sensors. Some embodiments use digital or analog imaging or video cameras, such as CMOS imagers, CCD imagers, and the like. Other embodiments use PSDs, such as one-dimensional PSDs, angular one-dimensional PSDs, two-dimensional PSDs, quad PSDs, duo-lateral PSDs, tetra-lateral PSDs, and the like. Other embodiments use photo detectors.

In one embodiment, the optical sensor is combined with a lens and one or more optical filters to form a camera. For example, a PSD sensor can be enclosed in a casing with an open side that fits the lens and optical filters to filter incoming light and reduce effects of ambient light.

Embodiments of the method and apparatus described herein can also use a wide variety of optical emitters, including visible light devices, invisible light devices, laser light devices, infrared light devices, polarized light devices, light-emitting diodes (LEDs), laser diodes, light bulbs, halogen lights, projectors, and the like.

One embodiment of the method and apparatus described herein uses one two-dimensional PSD camera and a plurality of infrared (IR) emitters. Each IR emitter projects a spot onto the ceiling in a room. Each emitter is modulated with a unique pattern or frequency. The PSD camera is mounted, on a robot, for example, and faces the ceiling in such a way that its field of view intersects at least a portion of the plane that defines the ceiling onto which the spots are projected. The PSD camera provides an indication of the projected position of each observable spot in the camera sensor coordinates. In the illustrated embodiment, the position of each observed spot is defined as its centroid.

A camera position of each observed spot can correspond to the projection of a spot's position onto the image plane of the camera as defined by a corresponding perspective transformation. The PSD camera can measure the camera position of each spot. Using the measured camera positions of the spot and information related to the distance between the spots, the position (x, y) of the PSD camera in one plane and the rotation ($\theta$) of the PSD camera around an axis normal to that plane can be determined. The position and orientation of the camera defined by (x, y, $\theta$) is known as the pose of the camera.

For example, the PSD camera can be coupled to a mobile device such as a robot, and the device's pose can advantageously be relatively accurately determined within a room with two or more spots. Pose estimation, also known as localization, is an important component in many applications, including automated vacuuming, automated floor cleaning, telepresence, security, and entertainment. Without accurate position estimates, it is relatively difficult or impossible for a conventional robot to execute a path or trajectory because the conventional robot's internal position estimate tends to drift, and the conventional robot is generally unable to measure or account for the drift. For systematic floor coverage in a robotic vacuum cleaner, for example, a conventional robot without the ability to localize generally cannot maintain knowledge of the areas it has cleaned and the areas it has not cleaned, and the robot is therefore relatively likely to clean the same areas repeatedly and inefficiently and is relatively unlikely to clean other areas with sufficient frequency. Accordingly, many conventional robotic vacuum cleaners execute a random trajectory. By contrast, a robotic vacuum cleaner according to an embodiment with the ability to localize in a relatively accurate manner can follow a relatively efficient planned path. A robotic vacuum cleaner according to an embodiment can clean a room in a relatively efficient manner because it can track its path and can execute a planned, traversable path. Similarly, a mobile robot with the ability to localize can navigate to a desirable location and maintain a history of paths that it has taken.

Another embodiment of the method and apparatus described herein uses one two-dimensional PSD camera and one IR emitter. The IR emitter projects a spot on the ceiling, and the PSD camera faces the ceiling such that its field of view intersects at least a portion of the plane that defines the ceiling onto which the spot is projected. The PSD camera can provide indications for a measurement of the distance from the camera to the spot and the heading from the camera to the spot relative to the tangent of the circle with radius defined by the distance measurement. The distance measurement defines a circle centered at the spot projected onto the plane of the camera. In one example, the illustrated embodiment can be used for an application in which it is desired to position a device relative to the spot. Advantageously, when the camera is underneath the spot on the ceiling, then the camera position is at the center of the PSD camera. For example, if the spot is projected over a charging station, a mobile device can approach the charging station and recharge autonomously. In a related embodiment that further comprises wheel encoders, a robotic vacuum cleaner can move along concentric circles or move along a spiral to implement a floor coverage strategy that is relatively efficient, compared to a random coverage strategy.

Figure 41:
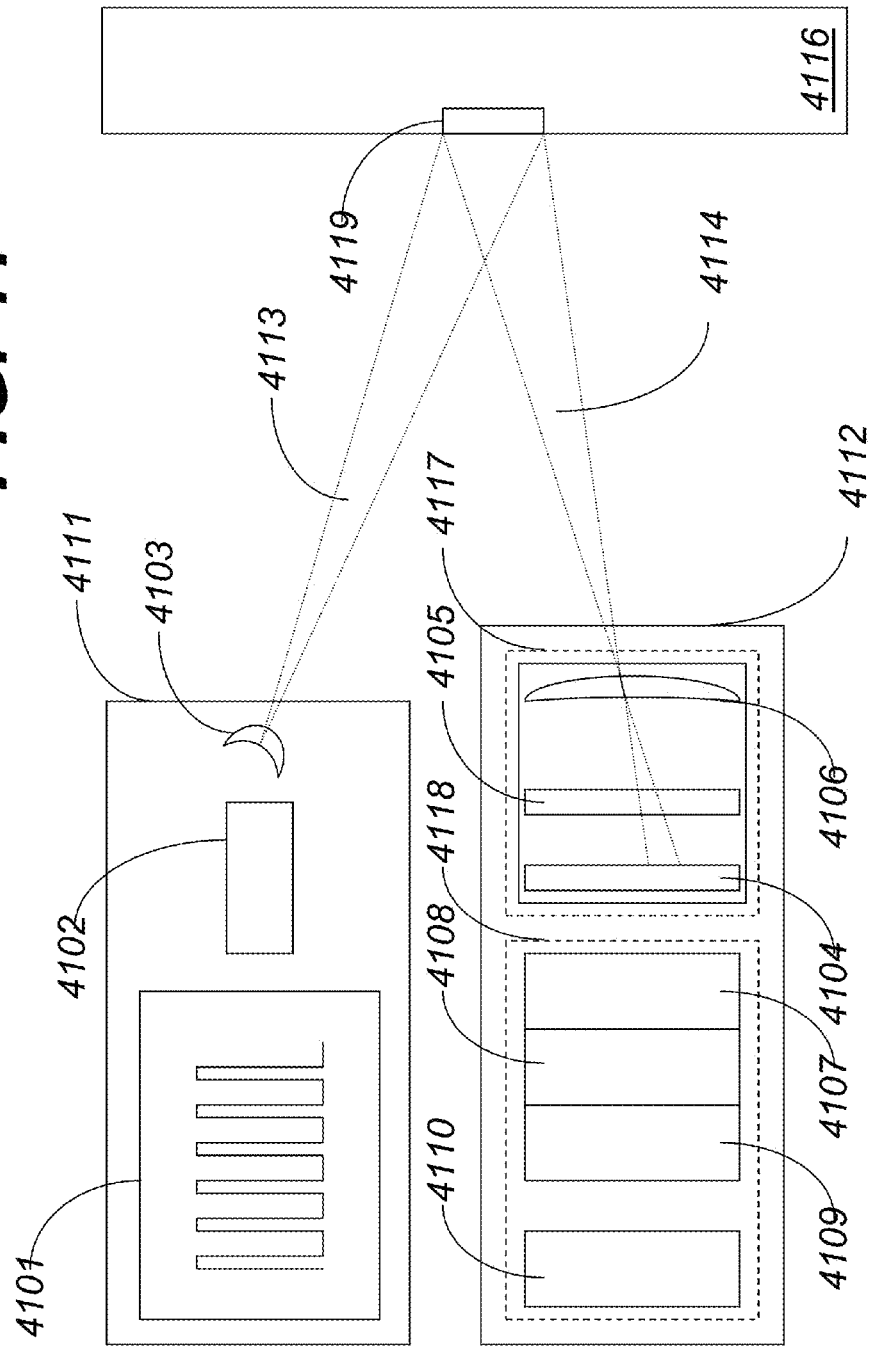
FIG. 41 is a block diagram illustrating one implementation of an apparatus for position estimation.

Examples of embodiments will now be described. FIG. 41 illustrates a block diagram of components of one embodiment of an apparatus. The apparatus includes a projector 4111 and an optical position sensor 4112. The projector 4111 emits a light pattern 4113 onto a surface 4116, which creates a projected light pattern 4119. In one embodiment, the light pattern 4113 is modulated. The reflection 4114 of the projected light pattern 4119 is projected onto the optical position sensor 4112.

The projector 4111 includes a light source 4102. By way of example, the light source 4102 can correspond to a device, such as a laser device, an infrared device, and the like, that can be modulated by a modulator 4101. Optionally, the light from the light source 4102 can pass through one or more lenses 4103 to project the light onto the surface 4116.

The optical position sensor 4112 includes a camera 4117 and a processing unit 4118. The camera 4117 can detect and measure the intensity and position of the light 4114 reflected from the surface 4116 and can generate corresponding signals that are processed by the signal processing unit 4118 to estimate the position of the optical position sensor 4112 relative to the projected light pattern 4119. It will be understood that the optical position sensor 4112 can include multiple cameras 4117 and/or multiple processing units 4118.

The camera 4117 includes an imager 4104. The imager 4104 can, for example, correspond to a CMOS imager, a CCD imager, an infrared imager, and the like. The camera can optionally include an optical filter 4105 and can optionally include a lens 4106. The lens 4106 can correspond to a normal lens or can correspond to a special lens, such as a wide-angle lens, a fish-eye lens, an omni-directional lens, and the like. Further, the lens 4106 can include reflective surfaces, such as planar, parabolic, or conical mirrors, which can be used to provide a relatively large field of view or multiple viewpoints. The lens 4106 collects the reflected light 4114 and projects it onto the imager 4104. The optical filter 4105 can constrain the wavelengths of light that pass from the lens 4106 to the imager 4104, which can advantageously be used to reduce the effect of ambient light, to narrow the range of light to match the wavelength of the light coming from the projector 4111, and/or to limit the amount of light projected onto the imager 4104, which can limit the effects of over-exposure or saturation. The filter 4105 can be placed in front of the lens 4106 or behind the lens 4106. It will be understood that the camera 4117 can include multiple imagers 4104, multiple optical filters 4105, and/or multiple lenses 4106.

The signal processing unit 4118 can include analog components and can include digital components for processing the signals generated by the camera 4117. The major components of the signal processing unit 4118 preferably include an amplifier 4107, a filter 4108, an analog-to-digital converter 4109, and a microprocessor 4110, such as a peripheral interface controller, also known as a PIC. It will be understood that the signal processing unit 4118 can include multiple filters 4108 and/or multiple microprocessors 4110.

Embodiments of the apparatus are not constrained to the specific implementations of the projector 4111 or the optical position sensor 4112 described herein. Other implementations, embodiments, and modifications of the apparatus that do not depart from the true spirit and scope of the apparatus will be readily apparent to one of ordinary skill in the art.

FIG. 42 illustrates an example of a use for the position estimation techniques. An environment includes a ceiling 4206, a floor 4207, and one or more walls 4208. In the illustrated environment, a projector 4203 is attached to a wall 4208. It will be understood that the projector 4203 can have an internal power source, can plug into a wall outlet or both. The projector 4203 projects a first spot 4204 and a second spot 4205 onto the ceiling 4206. An optical position sensor 4202 is attached to a robot 4201. The optical position sensor 202 can detect the spots 4204, 4205 on the ceiling 4206 and measure the position (x, y) of the robot 4201 on the floor plane and the orientation θ of the robot 4201 with respect to the normal to the floor plane. In one embodiment, the pose of the robot 4201 is measured relative to a global coordinate system.

FIG. 43 describes a geometrical model associated with one embodiment of the method and apparatus described earlier in connection with FIG. 42. The ceiling 4206 lies at a height h above the floor 4207. A point $w_1$ 4301 lies at the centroid of the first spot 4204, and a point $w_2$ 4302 lies at the centroid of the second spot 4205. In the illustrated embodiment, a global coordinate system with an X axis, a Y axis, and a Z axis is defined and is also referred to as the global reference frame.

In one embodiment, it is convenient to define the Y axis such that the Y axis is parallel to the vector originating at the point $w_1$ 4301 and passing through the point $w_2$ 4302. Additionally, it is convenient to define the X axis such that the X axis is perpendicular to the Y axis and lies in the plane defined by the floor. Further, it is convenient to define the Z axis such that the positive Z direction is specified by the cross product of the unit vector in the X direction with the unit vector in the Y direction; in standard vector calculus notation, this relationship is expressed as $\overline{Z}=\overline{X}\times\overline{Y}$. Thus, in the illustrated coordinate system, the Z axis is normal to the floor plane and is directed from the floor to the ceiling. In the global coordinate system, an origin O is defined as the point having coordinates (0, 0, 0). Also in the global coordinate system, the point $w_1$ 4301 is defined as having coordinates $(x_1, y_1, h)$, and the point $w_2$ 4302 is defined as having coordinates $(x_2, y_2, h)$. Further, it is convenient to assume that the origin O is located directly below the point $w_1$ 4301, so that $x_1=0$ and $y_1=0$. Additionally, the definition of the X axis implies that $x_2=0$ as well. Thus, the point $w_1$ 4301 has the coordinates (0, 0, h), and the point $w_2$ 4302 has the coordinates $(0, y_2, h)$. It will be understood that the aforementioned definitions can be made with no loss of generality.

A coordinate system relative to an imager is defined with a u axis, a v axis, and a z axis and can be referred to as the camera coordinate system or the camera reference frame. In the illustrated embodiment, the imager corresponds to a two-dimensional PSD sensor. In one embodiment, the height of the PSD sensor off the floor plane is relatively small compared to the ceiling height h, so the PSD sensor and the origin of the camera coordinate system use the coordinates (x, y, 0) and the orientation θ in the global coordinate system. The displacement from the origin of the global coordinate system to the origin of the camera coordinate system is denoted S; thus, $\|S\|=\sqrt{x^2+y^2}$, where $\|S\|$ denotes the norm, or magnitude, of the vector S. The point $c_1$ 4311 represents the projection of the point $w_1$ 4301 onto the imager, and the point $c_2$ 4312 represents the projection of the point $w_2$ 4302 onto the imager. The point $c_1$ 4311 has the coordinates $(u_1, v_1, 0)$ in the camera reference frame, and the point $c_2$ 4312 has the coordinates $(u_2, v_2, 0)$ in the camera reference frame. It will be understood that the aforementioned definitions can be made with no loss of generality.

In one embodiment, the spots 4204, 4205 can be identified using unique signals or unique signatures. For example, the emitters that produce the spots 4204, 4205 can be on-off modulated with different frequencies. The emitter that produces the first spot 4204 can be modulated with a first frequency $f_1$, and the emitter that produces the second spot 4205 can be modulated with a second frequency $f_2$, wherein the first frequency and the second frequency are different; that is $f_1 \neq f_2$.

At this point, it should be noted that the ceiling height h and the separation $y_2$ between the point $w_1$ 4301 and the point $w_2$ 4302 can be determined in a variety of ways. For example, if the mobile robot 4201 using the optical position sensor is capable of producing wheel odometry estimates, then the robot 4201 can estimate h and $y_2$ using measurements or observations of the points $w_1$ 4301 and $w_2$ 4302 from multiple positions. Other appropriate techniques will be readily determined by one of ordinary skill in the art.

Exemplary Position Estimation Using the Method and Apparatus

With reference to the coordinate systems, distances, angles, and points described earlier in connection with FIG. 43, the PSD camera can measure $c_1$ and $c_2$, which correspond to the projections of $w_1$ and $w_2$ onto the PSD sensor. In one embodiment, a goal of the method is to determine S, the position of the PSD camera in the global reference frame.

In one embodiment, the PSD measures the coordinates of the centroid of the light projected onto the PSD by generating electrical current proportional to the position and intensity of the light centroid. The associated processing can be accomplished in a wide variety of ways, including analog circuitry, digital circuits, hardware, software, firmware, and combinations thereof. For example, a microcontroller, a microprocessor, a CPU, a general-purpose digital signal processor, dedicated hardware, and the like can be used.

To measure the centroids of multiple spots, a number of conditions are preferable. First, the sensor preferably does not become saturated with light, ambient or otherwise. In one embodiment, this is accomplished by using optical filters to reduce or minimize unwanted light sources that project onto the active area of the PSD sensor and by biasing the PSD to increase the light level at which it becomes saturated. Second, to measure the position of a particular light source reliably, it is preferable to isolate the light source from other light sources by reducing or eliminating the effect of other light sources, which can include ambient light and light generated by other spots. One approach is to isolate one light source is to modulate the light source with a unique pattern such that it is distinguished from other light sources. If the i-th emitter on-off modulates the projected light with a frequency f, the PSD sensor can extract the signal generated by filtering a signal using a band-pass filter with lower and upper frequencies of $f_i$−w and $f_i$+w, respectively, where 2w corresponds to the width of the corresponding band-pass filter. The signal processing unit of the PSD can use the filter to suppress signals with frequencies outside the frequency range defined by the band-pass filter. The filtering of the PSD signal can occur either before or after the PSD currents are converted into associated centroid positions. In one embodiment, where the first emitter is modulated at a frequency $f_1$ and the second emitter is modulated at a frequency $f_2$, and wherein $f_1 \neq f_2$, the signal processing unit filters the signal specified by $f_1$ to measure $c_1$, the centroid of the first spot, and filters the signal specified by $f_2$ to measure $c_2$, the centroid of the second spot.

Exemplary Method for Pose Estimation

In one embodiment, the apparatus includes N emitters, which project N light spots, and M cameras. The position of the i-th camera in the global reference frame is denoted herein by $S_i = (x_i, y_i, z)$, and the rotational orientation of the i-th camera in the global reference frame is denoted herein by $R_i = (\alpha_i, \beta_i, \theta_i)$. The position of the j-th light spot is denoted herein by $w_j$, and the position of the projection of the j-th spot onto the i-th camera is denoted herein by $c_{i,j}$. Then, the following relationship relates $S_i$, $w_j$, and $c_{i,j}$.

$$c_{i,j} = P_i R_i (w_j - S_i) \quad \text{Eq. 90}$$

In Eq. 90, $R_i$ represents the three-degree-of-freedom rotation transformation, which, in one embodiment, results from the composition of three mutually orthogonal one-degree-of-freedom rotation transformations, such as $R_i = R_\alpha R_\beta R_\theta$. Also in Eq. 90, $P_i$ represents the perspective transformation associated with the i-th camera. Thus, Eq. 90 defines three equations for six unknowns, in which the unknowns are $x_i$, $y_i$, $z_i$, $\alpha_i$, $\beta_i$, and $\theta_i$. In a system with N spots and M cameras, N×M such matrix equations can be formulated, but not all such equations are necessarily unique, independent, and non-degenerate. Thus, with two spots and one camera, values for x, y, and θ can be determined. To determine all six degrees of freedom, it is preferable to have a configuration of spots and cameras that generates at least six independent, non-degenerate equations analogous to Eq. 90.

Exemplary System with Two Emitters and One Camera

In one embodiment, the system includes two spots projected onto the ceiling and one optical position sensor with one PSD camera. The relationship between a spot $w_j$ and its projection $c_j$ in the PSD camera reference frame is given by the following equation.

$$c_j = P R_\theta (w_j - S) \quad \text{Eq. 91}$$

In Eq. 91, S represents the position of the PSD camera in the global reference frame, and P represents the transformation from a point (X, Y, Z) in the global coordinate system to a point (u, v, z) in the PSD camera reference frame. Also, for the purposes of this example, the z axis of the camera coordinate system is aligned with the Z axis of the global coordinate system in the vertical direction. This implies that $R_\alpha$ and $R_\beta$ correspond to identity matrices; accordingly, $R_\alpha$ and $R_\beta$ have been omitted from Eq. 91. In the case of a pinhole camera model, P corresponds to the scalar value $\lambda/(\lambda-Z)$, where $\lambda$ represents the focal length of the camera. It will be understood that multiplication by a scalar value can also be achieved by multiplication by the corresponding multiple of the appropriately-dimensioned identity matrix. Also in Eq. 91, $R_\theta$ can be represented by the following unitary matrix.

$$R_\theta = \begin{pmatrix} \cos\theta & \sin\theta & 0 \\ -\sin\theta & \cos\theta & 0 \\ 0 & 0 & 1 \end{pmatrix} \quad \text{Eq. 92}$$

Eq. 91 can be re-written as follows.

$$w_j - S = R_\theta^{-1} P^{-1} c_j \quad \text{Eq. 93}$$

In Eq. 93, $P^{-1}$ represents the inverse perspective transformation, and $R_\theta^{-1}$ represents the inverse rotation transformation. When the position of the i-th spot is associated with appropriate camera parameters, such as the camera focal length in a pinhole camera model, then Eq. 93 defines two non-degenerate equations in three unknowns x, y, and θ for each measurement $c_j$. Thus, the three variables, x, y, and θ, together determine the pose of the PSD camera.

Because two equations in three unknowns do not define a unique solution for the pose of the PSD camera, it is preferable to use more independent equations than unknowns. With two spots and one PSD camera, it is possible to generate four equations in three unknowns as follows.

$$w_1 - S = R_\theta^{-1} P^{-1} c_1 \qquad \text{Eq. 94}$$

$$w_2 - S = R_\theta^{-1} P^{-1} c_2 \qquad \text{Eq. 95}$$

Eq. 94 relates the spot $w_1$ with its associated PSD camera position $c_1$, and Eq. 95 relates the spot $w_2$ with its associated PSD camera position $c_2$. Subtracting Eq. 94 from Eq. 95 generates the following matrix equation expressed in Eq. 96.

$$w_2 - w_1 = R_\theta^{-1} P^{-1} (c_2 - c_1) \qquad \text{Eq. 96}$$

Eq. 96 can be expanded as follows.

$$\begin{pmatrix} 0 \\ \Delta y \\ 0 \end{pmatrix} = R_\theta^{-1} P^{-1} \begin{pmatrix} \Delta u \\ \Delta v \\ 0 \end{pmatrix} \qquad \text{Eq. 97}$$

The matrix equation given in Eq. 97 expresses two non-degenerate linear equations. In Eq. 97, $\Delta y = d = y_2 - y_1$, $\Delta u = u_2 - u_1$, and $\Delta v = v_2 - v_1$. As discussed earlier in connection with FIG. 43, d represents the distance that separates the two spots. Accordingly, the first of the two non-degenerate linear equation defined by Eq. 97 is given by the following.

$$0 = P^{-1} (\Delta u \cos \theta - \Delta v \sin \theta) \qquad \text{Eq. 98}$$

Solving for θ in Eq. 98 gives $\theta = \tan^{-1}(\Delta u / \Delta v)$, and substituting this result into Eq. 94 provides the following solution for S, the position of the PSD camera in the global reference frame.

$$S = w_1 - R_\theta^{-1} P^{-1} c_1 |_{\theta = \tan^{-1}(\Delta u / \Delta v)} \qquad \text{Eq. 99}$$

Accordingly, the pose (x, y, θ) of the PSD camera as a function of the measurements $C_1$ and $c_2$ can be determined using Eq. 98 and Eq. 99.

An Example of Using One Emitter and One Camera

In one embodiment, the system includes one spot projected onto the ceiling and one optical position sensor with one PSD camera. Similar to the relationship discussed earlier in connection with Eq. 91, the relationship between the spot w and its projection c in the PSD camera reference frame is given by the following equation.

$$c = P R_\theta (w - S) \qquad \text{Eq. 100}$$

Because the origin of the global coordinate system can be chosen, without loss of generality, such that the spot w is located directly above the origin, rearranging Eq. 100 provides the following solution for S.

$$w - S = R_\theta^{-1} P^{-1} c \qquad \text{Eq. 101}$$

Eq. 101 can be rewritten in coordinate notation to give the following relationship.

$$\begin{pmatrix} -x \\ -y \\ z \end{pmatrix} = \begin{pmatrix} \cos\theta & -\sin\theta & 0 \\ \sin\theta & \cos\theta & 0 \\ 0 & 0 & 1 \end{pmatrix} P^{-1} \begin{pmatrix} u \\ v \\ 0 \end{pmatrix} \qquad \text{Eq. 102}$$

Thus, Eq. 102 specifies two non-degenerate linear equations. In the case that $P^{-1}$ corresponds to a scalar or to a scalar multiple of an identity matrix, squaring and summing the two non-degenerate linear equations and simplifying the result yields the following.

$$x^2 + y^2 = (P^{-1})^2 [(u \cos \theta - v \sin \theta)^2 + (u \sin \theta + v \cos \theta)^2] = (P^{-1})^2 (u^2 + v^2) \qquad \text{Eq. 103}$$

Because $x^2 + y^2$ is equal to $\lambda \|S\|^2$ and $u^2 + v^2$ is equal $\|c\|^2$, Eq. 103 can be simplified to $\|S\|^2 = (P^{-1})^2 \|c\|^2$, or $\|S\| = P^{-1} \|c\|$.

Thus, the distance measurement $\|c\|$, and the corresponding distance measurement $\|S\|$, can define a circle in an x-y plane centered at the origin (0, 0) with radius $\|S\|$. A tangent to the circle at the position of the sensor at the position of the sensor (that is, at S), is orthogonal to the vector $s = (x \ y)^T$, where the superscripted "T" denotes the vector or matrix transposition operation. The tangent $\hat{s}$ can therefore be expressed as $\hat{s} = (y - x)^T$. The rotational orientation, φ, of the robot of the robot with respect to $\hat{s}$ can then be estimated using a measurement of c as given in the following relationship.

$$\phi = \tan^{-1}(u/v) \qquad \text{Eq. 104}$$

Thus, in this embodiment, $\|S\|$ and φ can be determined, which can advantageously support applications for robotics, person tracking, object tracking, and the like. In one example, the spot is projected onto the ceiling directly above a docking station, and the optical position sensor with one PSD camera is attached to a robot. Using the estimation of $\|S\|$ and φ, the robot can guide itself to turn toward the spot and approach the spot. In this manner, the robot can approach the docking station and recharge itself. In an alternative example, the projector can correspond to a handheld projector and can be used to point above a user-selected object or location of interest to guide to the robot to the object or location. This alternative example provides a powerful interface for robot interaction.

Examples of Other Embodiments of the Invention

One embodiment of the method and apparatus includes a camera, such as a CCD camera, a CMOS camera, and the like, and a projector that generates a pattern on a projection surface, such as a ceiling. It will be understood that this embodiment can include multiple cameras and/or multiple projectors. By way of example, the projector can correspond to a slide projector, and the pattern can be encoded in a slide. In one embodiment, at least one pattern has the shape of a circle, and in another embodiment, at least one pattern has the shape of a square. Each camera generates grayscale or color images. A signal processing unit processes the camera images, extracts the unique patterns, and estimates a position of the pattern in camera sensor coordinates. The position of the pattern can be defined as the centroid of the pattern. The position of the j-th pattern in the global reference frame can be denoted herein by $w_j$, and the position of the j-th pattern in the reference frame of the i-th camera can be denoted herein by $c_{i,j}$. Then, the relationship between the j-th pattern and its projection onto the i-th camera is defined by Eq. 90. The signal processing unit captures the camera images and processes the images using one or more image analysis techniques to detect and extract the position of known patterns. The image analysis techniques can include, by way of example, line and corner detection (to detect a square pattern, for example), Hough transform (to detect a circle, for example), and the like. After the positions of the patterns in the camera reference frames are determined, the signal processing unit can estimate the positions of the cameras with respect to the global reference frame using the methods described previously. Optionally, one or more of the projectors can modulate on-off to reduce the effects of ambient light. The modulation frequencies can advantageously be used to associate a unique identifier with each pattern. In one embodiment, the identifier of a pattern is advantageously encoded within the pattern itself. As an example, the shape of the pattern can define a unique identifier, if distinct shapes are used for each pattern. For example, the system can distinguish between a square pattern and a circular pattern and associate different identifiers with each pattern.

In one embodiment, the modulation frequency of the projector can encode information, such as bit patterns to transmit a message that can be detected and extracted by the camera and the signal processing unit. The bit patterns can be modulated in the signal using any of a variety of common modulation techniques, such as pulse width modulation, space width modulation, and phase modulation.

In another embodiment, the bit patterns are modulated on top of the original "carrier" frequency of the spot. The projectors and optical position sensors can advantageously be used for optical wireless communication. In this embodiment, the projector projects the light pattern on a reflecting surface, and the optical sensor detects the signal by viewing the reflecting surface, which eliminates the need for line-of-sight between the emitter and the sensor. The signal modulated in the projected light can carry commands, such as commands for a robot, similar to the way in which light modulated by a remote control unit can carry commands to an appliance. In one example, the projection of the spot on the ceiling directly above a docking station enables the robot to find the docking station and perform self-charging. In addition, an interface with the docking station, such as a button on the docking station, can generate a command to the robot to return to the charging station.

Yet another embodiment of the method and apparatus includes a projector for one or more distinct regions of an environment, such as a projector for each distinct region. Advantageously, this embodiment expands the coverage of localization throughout relatively large areas or throughout multiple relatively confined areas, such as multiple rooms. The covered area associated with one projector can be constrained by the field of view of the camera, the distance from the projector to the reflection surface, and the presence of objects and walls that obstruct the camera's view of the spot. Increasing the number of light patterns can increase the coverage area. In one embodiment, for coverage across multiple rooms, one or more projectors are provided for each room in which coverage is desired, so that, for example, each room can have a dedicated projector. For example, each projector can project one or more spots that have an identifier that is unique within the room. It will be understood that the identifier associated with a spot can be based on the spot's modulation frequency, the spot's shape, the spot's color, or another appropriate characteristic that can be detected by the camera sensor.

In one implementation, the combination of the individual spot identifiers with a room can define a unique identifier for the room. By way of example, a first room can have two spots having associated unique identifiers "A" and "B," and a second room can have two spots having associated unique identifiers "A" and "C." The unique identifiers for each room can advantageously be used by a system, such as by a robot, to build a topological map of the rooms and the connectivity of the rooms. Without a unique identifier for each room or region, the system can disadvantageously generate ambiguous position information. As an illustration, without a unique identifier for each room, the position associated with an (x, y) coordinate of a first room can generally not be distinguished from the position associated with the (x, y) coordinate of a second room.

While certain embodiments may be illustrated or discussed as having certain example components, additional, fewer, or different components may be used. Further, with respect to the processes discussed herein, various states may be performed in a different order, not all states are required to be reached, and fewer, additional, or different states may be utilized.

Various embodiments have been described above. Although described with reference to these specific embodiments, the descriptions are intended to be illustrative and are not intended to be limiting. Various modifications and applications may occur to those skilled in the art.

The references below may be of assistance in understanding the described subject matter. Applicants do not concede that any of the following are prior art to the present application.

[1] S. Thrun, W. Burgard, and D. Fox, *Probabilistic Robotics*. Cambridge, Mass.: MIT Press, 2005.

[2] W. Burgard, A. Cremers, D. Fox, G. Lakemeyer, D. Hahnel, D. Schulz, W. Steiner, and S. Thrun, "The interactive museum tour-guide robot," in *Proc. 15th National Conference on Artificial Intelligence* (AAAI'98), 1998.

[3] W. Jeong and K. Lee, "CV-SLAM: A new ceiling vision-based SLAM technique," in *Int. Conference on Intelligent Robots and Systems* (IROS), 2005.

[4] K. Konolige, J. Augenbraun, N. Donaldson, C. Fiebig, and P. Shah, "A low-cost laser distance sensor," in *Int. Conference on Robotics and Automation (ICRA)*, 2008.

[5] K. Konolige, G. Grisetti, R. Kummerle, W. Burgard, B. Limketkai, and R. Vincent, "Sparse pose adjustment for 2D mapping," in *Int. Conference on Intelligent Robots and Systems (IROS)*, 2010.

[6] J. Borenstein, J. Everett, and L. Feng, *Navigating Mobile Robots: Systems and Techniques*. Wellesley, M A: A. K. Peters, Ltd., 1996.

[7] Y. Cui and S. Ge, "Autonomous vehicle positioning with GPS in urban canyon environments," *IEEE Transaction on Robotics and Automation*, vol. 19, no. 1, 2003.

[8] F. Gustafsson and F. Gunnarsson, "Mobile positioning using wireless networks," *IEEE Signal Processing Magazine*, pp. 41-53, July 2005.

[9] A. Varshaysky, E. de Lara, J. Hightower, A. LaMarca, and V. Otsason, "GSM indoor localization," Pervasive and Mobile Computing, vol. 3, 2007.

[10] M. Ocaña, L. Bergasa, M. Sotelo, R. Flores, D. Llorca, and D. Schleicher, "Automatic training method applied to WiFi+ultrasound POMDP navigation system," *Robotica*, vol. 27, pp. 1049-1061, 2009.

[11] B. Ferris, D. Fox, and N. Lawrence, "WiFi-SLAM using Gaussian process latent variable models," in *Int. Joint Conference on Artificial Intelligence (IJCAI)*,2007.

[12] J.-S. Gutmann, G. Brisson, E. Eade, P. Fong, and M. Munich, "Vector Field SLAM," in *Int. Con! on Robotics and Automation* (ICRA), 2010.

[13] J.-S. Gutmann, E. Eade, P. Fong, and M. Munich, "A constant-time algorithm for Vector Field SLAM using an exactly sparse extended information filter," in *Robotics: Science and Systems* (RSS), 2010.

[14] M. R. Walter, R. M. Eustice, and J. J. Leonard, "Exactly sparse extended information filters for feature-based SLAM," *International Journal of Robotics Research*, vol. 26, no. 4, pp. 335-359, 2007.

[15] M. Bosse, P. Newman, J. Leonard, and S. Teller, "SLAM in Large-scale Cyclic Environments using the Atlas Framework." *The International Journal of Robotics Research*, vol. 23, no. 12, pp. 1113-1139, 2004.

[16] J. Leonard and H. Feder, "Decoupled stochastic mapping," *Journal of Oceanic Engineering*, vol. 26, no. 4, pp. 561-571, 2001.

[17] T. Bailey, J. Nieto, J. Guivant, M. Stevens, and E. Nebot, "Consistency of the EKF-SLAM algorithm," in *Int. Conference on Intelligent Robots and Systems (IROS)*, 2006.

[18] S. Hyung, J. Kim, J. Lee, J. Park, H. Shim, and K. Lee, "Method and apparatus for detecting movement error in mobile robot," U.S. Patent Application US 2009/0 171 504 A1, Jul. 2, 2009.

[19] J. Neira, L. Tardós, and J. Castellanos, "Linear time vehicle relocation in SLAM," in Int. Conference on Robotics and Automation (ICRA), Taipei, Taiwan, 2003.

[20] K. Arras, J. Castellanos, M. Schilt, and R. Siegwart, "Feature-based multi-hypothesis localization and tracking using geometric constraints," *Robotics and Autonomous Systems*, vol. 44, pp. 41-53, 2003.

[21] Y. Yamamoto, P. Prijanian, J. Brown, M. Munich, E. D. Bernardo, L. Goncalves, J. Ostrowski, and N. Karlsson, "Optical sensing for robot perception and localization," in *Proc. Workshop on Advanced Robotics and its Social Impacts (ARSO)*, 2005.

[22] Evolution Robotics Inc. (2011) Introducing Mint—the evolution of floor care, www.mint-cleaner.com. [Online]. Available: http://www.mint-cleaner.com

What is claimed is:

1. A method of estimating a pose of a robot, the method comprising:
computing the pose of the robot through simultaneous localization and mapping as the robot moves along a surface to generate one or more maps, wherein the pose comprises position and orientation of the robot;
navigating the robot such that the robot cleans the surface in a methodical manner;
determining that navigation of the robot has been paused by a user-initiated pausing event, and after resuming navigation of the robot:
re-localizing the robot within a map of the one or more maps;
after re-localizing, returning the robot to a previous pose prior to resuming cleaning, wherein the previous prior pose is from a time prior to the user-initiated pausing event, wherein the prior pose comprises a prior position and a prior orientation; and
resuming cleaning of the surface in the methodical manner.

2. The method of claim 1, further comprising resuming cleaning of the surface substantially without re-cleaning areas of the surface already cleaned prior to the user-initiated pausing event.

3. The method of claim 1, wherein simultaneous localization and mapping is performed for learning the spatial distribution of one or more continuous signals in an environment in which the robot is navigating, and wherein each of the one or more maps is defined over a vector field of expected measurement values of the one or more continuous signals for various positions along the surface.

4. The method of claim 1, wherein simultaneous localization and mapping is performed via analysis of two or more light patterns projected onto a ceiling, and wherein each of the one or more maps is defined over a vector field of light sensor measurement values expected for various positions along the surface.

5. The method of claim 4, wherein re-localizing further comprises:
obtaining a current set of actually-observed light sensor measurements;
comparing the actually-observed light sensor measurements to a plurality of light sensor measurements of the one or more maps corresponding to different positions within the one or more maps; and
identifying a pose from among the plurality of positions of the one or more maps, wherein the pose comprises a position and orientation of the robot.

6. The method of claim 4, wherein re-localizing further comprises:
obtaining a current set of actually-observed light sensor measurements;
converting the current set of actually-observed light sensor measurements to converted light sensor measurements, wherein the converted light sensor measurements are independent of the orientation of the robot;
comparing the converted light sensor measurements to a plurality of light sensor measurements of the one or more maps corresponding to different positions within the one or more maps; and
identifying a pose from among the plurality of positions of the one or more maps, wherein the pose comprises a position and orientation of the robot.

7. The method of claim 6, wherein comparing further comprises:
calculating closeness between the converted light sensor measurements and the plurality of light sensor measurements for nodes of the map;
selecting a cell based on the closeness calculated for its nodes;
interpolating within the cell to generate the position of the pose; and
analyzing the current set of actually-observed light sensor measurements to generate an orientation of the pose.

8. The method of claim 7, wherein calculating closeness comprises calculating Mahalanobis distances.

9. The method of claim 7, wherein the identified cell corresponds to the cell with the lowest average closeness for its nodes.

10. The method of claim 7, further comprising performing a significance test associated with signal strength on the actually-observed light sensor measurements, and rejecting those measurements failing the significance test.

11. The method of claim 7, further comprising confirming the identified pose by further tracking of the pose of the robot and comparing a count of measurement outliers to a value to confirm or reject the identified pose.

12. The method of claim 7, wherein the actually-observed light sensor measurements and the plurality of light sensor measurements are based on photodiode current measurements.

13. The method of claim 6, wherein comparing further comprises:
calculating closeness between the converted light sensor measurements and the plurality of light sensor measurements for nodes of the map;
selecting a node based on the closeness;
for a cell adjacent to the selected node, interpolating with the cell to generate the position of the pose; and
analyzing the current set of actually-observed light sensor measurements to generate an orientation of the pose.

14. The method of claim 13, wherein for a cell adjacent to the selected node comprises for each cell adjacent to the selected node, and further comprising selecting a position from within one or more cells based on least squared error.

15. The method of claim 1, wherein the robot comprises an autonomous robotic cleaner, wherein cleaning comprises cleaning, the method further comprising cleaning the surface while performing SLAM.

16. The method of claim 1, wherein navigating further comprises navigating using an occupancy grid map to determine where the robot should go next.

17. The method of claim 1, wherein determining that navigation of the robot has been paused further comprises determining that the robot has been lifted off of the surface, controlling the robot so that it should not be moving, and detecting motion with a gyroscope.

18. The method of claim 1, wherein determining that operation of the robot has been paused further comprises detecting user interaction with a pause function of the robot.

19. The method of claim 1, wherein the user-initiated pausing event is associated with emptying a dust bin or changing a cleaning pad.

20. An apparatus comprising:
a robot; and
a controller of the robot configured to:
compute a pose of the robot through simultaneous localization and mapping as the robot moves along a surface to generate one or more maps, wherein the pose comprises a position and orientation of the robot;
navigate the robot such that the robot cleans the surface in a methodical manner;
determine that navigation of the robot has been paused by a user-initiated pausing event, and after resumption of navigation of the robot:
re-localize the robot within a map of the one or more maps;
return the robot to a previous pose prior to resumption of cleaning, wherein the previous prior pose is from a time prior to the user-initiated pausing event, wherein the prior pose comprises a prior position and a prior orientation; and
resume cleaning of the surface in the methodical manner.

21. The apparatus of claim 20, wherein the controller is further configured to resume cleaning of the surface substantially without re-cleaning areas of the surface already cleaned prior to the user-initiated pausing event.

22. The apparatus of claim 20, wherein the controller is further configured to perform simultaneous localization and mapping for learning the spatial distribution of one or more continuous signals in an environment in which the robot is navigating, and wherein each of the one or more maps is defined over a vector field of expected measurement values of the one or more continuous signals for various positions along the surface.

23. The apparatus of claim 20, wherein the controller is further configured to perform simultaneous localization and mapping via analysis of two or more light patterns projected onto a ceiling, and wherein each of the one or more maps is defined over a vector field of light sensor measurement values expected for various positions along the surface.

24. The apparatus of claim 23, wherein to re-localize the robot, the controller is further configured to:
obtain a current set of actually-observed light sensor measurements;
compare the actually-observed light sensor measurements to a plurality of light sensor measurements of the one or more maps corresponding to different positions within the one or more maps; and
identify a pose from among the plurality of positions of the one or more maps, wherein the pose comprises a position and orientation of the robot.

25. The apparatus of claim 23, wherein to re-localize the robot, the controller is further configured to:
obtain a current set of actually-observed light sensor measurements;
convert the current set of actually-observed light sensor measurements to converted light sensor measurements, wherein the converted light sensor measurements are independent of the orientation of the robot;
compare the converted light sensor measurements to a plurality of light sensor measurements of the one or more maps corresponding to different positions within the one or more maps; and
identify a pose from among the plurality of positions of the one or more maps, wherein the pose comprises a position and orientation of the robot.

26. The apparatus of claim 25, wherein to compare, the controller is further configured to:
calculate closeness between the converted light sensor measurements and the plurality of light sensor measurements for nodes of the map;
select a cell based on the closeness calculated for its nodes;
interpolate within the cell to generate the position of the pose; and
analyze the current set of actually-observed light sensor measurements to generate an orientation of the pose.

27. The apparatus of claim 26, wherein to calculate closeness, the controller is further configured to calculate Mahalanobis distances.

28. The apparatus of claim 26, wherein the identified cell corresponds to the cell with the lowest average closeness for its nodes.

29. The apparatus of claim 26, wherein the controller is further configured to perform a significance test associated with signal strength on the actually-observed light sensor measurements, and to reject those measurements failing the significance test.

30. The apparatus of claim 26, wherein the controller is further configured to confirm the identified pose by further tracking of the pose of the robot and to compare a count of measurement outliers to a value to confirm or reject the identified pose.

31. The apparatus of claim 26, wherein the actually-observed light sensor measurements and the plurality of light sensor measurements are based on photodiode current measurements.

32. The apparatus of claim 25, wherein to compare, the controller is further configured to:
calculate closeness between the converted light sensor measurements and the plurality of light sensor measurements for nodes of the map;
select a node based on the closeness;
for a cell adjacent to the selected node, interpolate with the cell to generate the position of the pose; and
analyze the current set of actually-observed light sensor measurements to generate an orientation of the pose.

33. The apparatus of claim 32, wherein for a cell adjacent to the selected node comprises for each cell adjacent to the selected node, and wherein the controller is further configured to select a position from within one or more cells based on least squared error.

34. The apparatus of claim 20, wherein the robot comprises an autonomous robotic cleaner, wherein the controller is further configured to have the robot clean a surface while the controller performs SLAM.

35. The apparatus of claim 20, wherein to navigate, the controller is further configured to navigate using an occupancy grid map to determine where the robot should go next.

36. The apparatus of claim 20, wherein to determine that navigation of the robot has been paused, the controller is further configured to determine that the robot has been lifted off of the surface, to control the robot so that it should not be moving, and to detect motion with a gyroscope.

37. The apparatus of claim 20, wherein to determine that navigation of the robot has been paused, the controller is further configured to detect user interaction with a pause function of the robot.

38. The apparatus of claim 20, wherein the user-initiated pausing event is associated with emptying a dust bin or changing a cleaning pad.

\* \* \* \* \*

UNITED STATES PATENT AND TRADEMARK OFFICE
CERTIFICATE OF CORRECTION

PATENT NO. : 9,534,899 B2
APPLICATION NO. : 13/673928
DATED : January 3, 2017
INVENTOR(S) : Gutmann et al.

Page 1 of 1

It is certified that error appears in the above-identified patent and that said Letters Patent is hereby corrected as shown below:

In the Specification

Column 23, Line 42: Please correct "M." to read -- $M_n$. --

Column 25, Line 1: Please correct "$T_{it}$" to read -- $\eta_t$ --

Colum 29, Line 16: Please correct "$drift_s$ and $drift_s$" to read -- $drift_x$ and $drift_y$ --

Column 37, Line 35: Please correct "α#0" to read -- $\alpha \neq 0$ --

Column 40, Line 54: Please correct "$w_i$" to read -- $w_j$ --

Column 52, Line 33: Please correct "$\overline{Z} = \overline{X} \times \overline{Y}$" to read -- $\hat{Z} = \hat{X} \times \hat{Y}$ --

Column 53, Line 53: Please correct "$f_i$," to read -- $f_i$, --

Column 55, Line 42: Please correct "$C_1$" to read -- $c_1$ --

Column 56, Line 9: Please correct "λS ||²" to read -- $\| S \|^2$ --

Signed and Sealed this
Second Day of January, 2018

Joseph Matal
*Performing the Functions and Duties of the*
*Under Secretary of Commerce for Intellectual Property and*
*Director of the United States Patent and Trademark Office*